(12) United States Patent
Marsic et al.

(10) Patent No.: US 8,360,045 B2
(45) Date of Patent: Jan. 29, 2013

(54) CONCRETE SAW

(75) Inventors: Martin D. Marsic, Highland Hts., OH (US); Kent A. Smith, Newbury, OH (US); Brian S. Edwards, Amherst, OH (US)

(73) Assignee: Diamond Products, Limited, Elyria, OH (US)

( * ) Notice: Subject to any disclaimer, the term of this patent is extended or adjusted under 35 U.S.C. 154(b) by 768 days.

(21) Appl. No.: 12/510,373

(22) Filed: Jul. 28, 2009

(65) Prior Publication Data
US 2010/0043767 A1 Feb. 25, 2010

Related U.S. Application Data

(60) Provisional application No. 61/084,058, filed on Jul. 28, 2008, provisional application No. 61/148,935, filed on Jan. 31, 2009.

(51) Int. Cl.
*B28D 1/04* (2006.01)
(52) U.S. Cl. .................................. 125/13.01; 451/350
(58) Field of Classification Search ............... 125/13.01, 125/38; 451/352, 353, 350
See application file for complete search history.

(56) References Cited

U.S. PATENT DOCUMENTS

| 2,244,742 | A | * | 6/1941 | Tyson ............................. 299/1.5 |
| 4,102,084 | A | | 7/1978 | Bloomquist |
| 4,216,630 | A | | 8/1980 | Smart et al. |
| 5,477,844 | A | | 12/1995 | Meister |
| 5,680,854 | A | | 10/1997 | Kingsley et al. |
| 5,690,391 | A | | 11/1997 | Kingsley et al. |
| 5,809,985 | A | * | 9/1998 | Kingsley et al. ........... 125/13.01 |
| 5,810,448 | A | | 9/1998 | Kingsley et al. |
| 6,318,353 | B1 | * | 11/2001 | Edwards et al. ........... 125/13.01 |
| 7,117,864 | B2 | * | 10/2006 | Marques et al. ........... 125/13.01 |
| 7,232,361 | B1 | | 6/2007 | Triplett et al. |
| 2007/0194617 | A1 | | 8/2007 | Moller et al. |

FOREIGN PATENT DOCUMENTS
CA 2135572 12/1995

* cited by examiner

*Primary Examiner* — Robert Rose
(74) *Attorney, Agent, or Firm* — Rankin, Hill & Clark LLP

(57) ABSTRACT

A concrete saw having a geared assembly for rotating a cutting blade is described. The saw utilizes a longitudinally oriented engine for rotating the blade. Various additional features and improvements are described including a particular belt tensioner assembly, an indicator and control system for cutting blade depth, a handle adjustment and locking system, and provisions for control of blade water are described.

20 Claims, 52 Drawing Sheets

CONCRETE SAW

CROSS REFERENCES TO RELATED APPLICATIONS

This application claims priority from U.S. provisional application Ser. No. 61/084,058 filed on Jul. 28, 2008 and U.S. provisional application Ser. No. 61/148,935 filed on Jan. 31, 2009.

FIELD OF INVENTION

The present invention relates to a saw for cutting concrete. More particularly, the present invention relates to a concrete saw having one or more features such as a gear driven drive shaft, a gear driven blade shaft, a particular gear configuration between the drive shaft and the blade shaft, selection and use of different gear ratios between the drive shaft and the blade shaft, provisions for drive belt tension adjustment and easy replacement, wheel height and/or cutting depth indicator and control, provisions for handle adjustment, and automatic control of blade water.

BACKGROUND OF THE INVENTION

Concrete saws are used in a variety of applications including, but not limited to, scoring and cutting concrete in buildings. In order to be used in a building, the concrete saw must be able to pass through an entry door. This places practical limitations on the width of the concrete saw.

The cutting blade of a concrete saw is driven by a rotating blade shaft. In some concrete saws, the motor is axially aligned, meaning that the motor shaft rotates on an axis that is parallel to the axis of rotation of the blade shaft. Power can be transferred from the motor shaft to the blade shaft using V-belts and sheaves. The speed at which the blade shaft rotates can be adjusted by changing the size of the V-belts and sheaves.

As noted, there are practical width limitations for concrete saws. This limits the size of the motor when the motor is axially aligned. In order to accommodate the use of larger motors, it is often necessary to align the motor longitudinally, meaning that the motor shaft rotates about an axis that is perpendicular to the axis of rotation of the blade shaft. Conventionally, a bevel gear is used to transfer power from the motor shaft to a transverse drive shaft, which is oriented such that the drive shaft rotates about an axis that is parallel to the axis of rotation of the blade shaft. Thus, V-belts and sheaves can be used to transfer power from the drive shaft to the blade shaft. This arrangement, while satisfactory, presents several undesirable problems.

First, in this configuration the V-belts and sheaves are exposed to debris from the concrete cutting operation. This tends to shorten the life of the V-belts. Second, the V-belts must be removed periodically in order to adjust the rotational speed of the blade. This takes time and requires that the motor drive shaft be incrementally rotated in order to align the V-belts into engagement with the sheaves. Third, because the sheaves are installed on the blade shaft, the size of the sheaves is somewhat limited. Accordingly, a need exists for a concrete saw drive configuration that avoids or remedies one or more of these problems.

Belts have long been used to transfer rotary power between components. As is well known, it is often necessary to adjust the tension of a belt to prevent slippage or loss of engagement between the belt and a sheave or other component. For concrete saws using axially oriented motors, a wide array of belt tensioning assemblies are known. However, for a longitudinally oriented motor or engine, adjusting the distance between the belt driven components is more difficult. Accordingly, it would be desirable to provide a drive configuration for a concrete saw utilizing a longitudinally oriented motor in which the tension of the V-belts could be readily adjusted. As the size of a concrete saw increases, it becomes extremely heavy and difficult to manually maneuver. This is particularly so for assemblies that raise or lower the saw to effect a change in blade cutting depth. Thus, extendable hydraulic cylinders are typically used to facilitate such raising or lowering.

It is difficult to repeatedly and consistently achieve a desired blade cutting depth, particularly for large saws using hydraulically operated or assisted lifting or lowering assemblies. Current practice involves an operator selectively starting and stopping a control circuit for the hydraulic assembly until a desired blade depth is reached. Although this practice may be satisfactory, if the saw is repeatedly raised or the cutting depth is changed, this practice becomes burdensome. Accordingly, it would be desirable to provide a system for readily adjusting blade depth, and also returning to a preselected blade depth.

Walk-behind concrete saws include a pair of pivotally adjustable handles extending from their rear. The handles can be pivoted about a mounting assembly such that the outwardly extending handle ends can be pivoted upwards. The handle configuration is often preferred by operators when the front end of the saw, i.e. carrying the blade, is raised and the saw tilted rearwardly. Numerous mechanical arrangements are known for locking the handles in a desired position. However, eventually the assemblies wear, become loose and/or susceptible to fracture. Accordingly, it would be desirable to provide a concrete saw with an improved handle adjusting and locking system.

Prior to and during cutting operations, a flow of water is typically provided alongside the blade and/or cutting area. The water serves to cool the blade, reduce dust, and provide lubrication along the cut interface. Although currently known concrete saws include a variety of valves for stopping the flow of water, usually an operator must attend to this. In many instances, it is not necessary to provide a water stream at the blade, such as when not cutting or when the blade is in a raised position. Forgetting to stop the flow of water when not needed results in waste and excessive wear on the components of the water circuit. Accordingly, a need exists for a system for controlling water supply to a concrete saw cutting blade.

SUMMARY OF THE INVENTION

The difficulties and drawbacks associated with previously known systems are overcome in the present apparatus for a concrete saw as described herein.

In one aspect, the present invention provides a concrete saw drive system comprising a blade shaft gear assembly including a rotatable blade shaft having provisions for driving a cutting blade, a rotatable jack shaft oriented parallel to the blade shaft, and a plurality of gears operably engaging the blade shaft and the jack shaft. The jack shaft includes at least one jack shaft sheave engaged with the jack shaft. The drive system also comprises a drive shaft gear assembly including a rotatable drive shaft, a motor shaft oriented transversely to the drive shaft, and a plurality of gears operably engaging the drive shaft and the motor shaft. The drive shaft includes at least one drive shaft sheave engaged with the drive shaft. In this system, the drive shaft sheave is aligned with the jack shaft sheave.

In another aspect, the present invention provides a concrete saw belt tensioning assembly for a concrete saw including a frame and an engine. The assembly comprises a blade shaft drive assembly including at least one lower rotatable sheave in operable engagement with a cutting blade. The assembly also comprises a positionable drive shaft assembly including at least one upper rotatable sheave in operable engagement with the engine. The assembly further comprises a belt extending between and in operable engagement with the lower sheave and the upper sheave such that rotation of the upper sheave imparts rotation to the lower sheave. And, the assembly comprises an adjusting assembly having provisions for selectively changing the position of the drive shaft assembly relative to the blade shaft drive assembly thereby changing the distance between the lower sheave and the upper sheave.

In another aspect, the present invention provides a concrete saw blade depth control system for a concrete saw including a frame, a wheel assembly mounted on a pivotable carriage, and a hydraulic ram extending between the frame and the carriage for selectively positioning the carriage and changing the blade depth. The blade depth control system comprises a linearly positionable actuator rod, an electric motor operably engaged with the rod for selectively positioning the rod relative to the frame, and a slide member carrying a proximity sensor in sensing range of the actuator rod. The slide member is mechanically coupled to the carriage such that changing the position of the carriage displaces the side member and proximity sensor. The system is configured such that a change in the relative position of the slide member and the proximity sensor to the actuator rod enables the proximity sensor to provide a signal indicative of such position change.

In yet another aspect, the present invention provides a concrete saw with a selectively adjustable and locking handle assembly, the saw including an upper frame assembly. The handle assembly comprises a pair of handles spaced apart from one another, a handle cross member extending between and secured to the pair of handles, a pair of shoulder members affixed to the upper frame assembly, each shoulder member including a collar for rotatably receiving and supporting the handle cross member, and a hydraulic handle adjusting system engaged to an end of at least one of the handles. The hydraulic adjusting system includes a cylinder secured to the upper frame and a ram receivably engaged with the cylinder. The ram is coupled to at least one of the handles, and a selectively operable valve is in fluid communication with the ram for controlling positioning of the ram and the pair of handles.

In still a further aspect, the present invention provides a concrete saw blade depth indicator and control system for a concrete saw including a frame, and a wheel assembly mounted on a pivotable carriage, wherein the position of the carriage governing the blade depth. The blade depth indicator and control system comprises a controller including a rotatable indicator knob, a rotatable drive member in engagement with the indicator knob, a rotatable cam member in operable association with the drive member, and a switch actuatable according to the rotary position of the claim member. The system also comprises a cable in engagement with the drive member such that movement of the cable along its longitudinal axis induces rotary movement of the drive member. The cable defines a first end affixed to the frame, and a second end affixed to the carriage. The system is configured such that a change in the position of the carriage causes movement of the cable and rotation of the drive member, which actuates the switch by action of the cam member.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
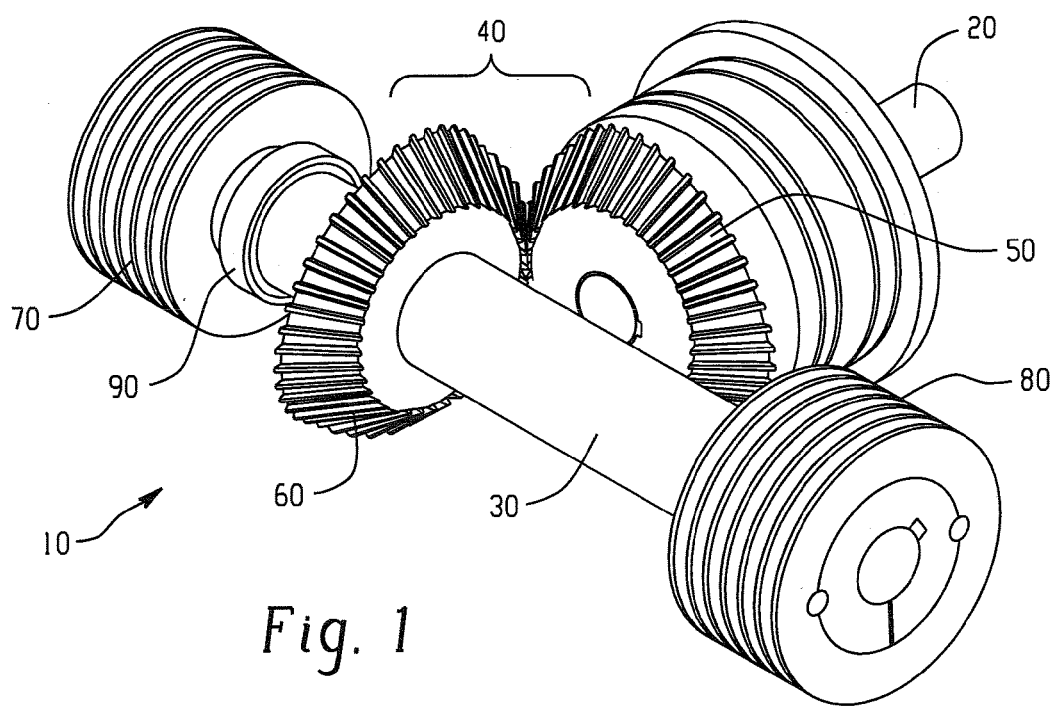
FIG. 1 is a perspective view of an exemplary drive shaft assembly according to the invention.

The present invention relates to several aspects of a concrete saw such as various geared shaft assemblies, a particular gear configuration for a blade shaft, provisions for changing gear ratios, a drive belt tension adjustment assembly, wheel height and/or cutting depth indicator and control, handle adjustment, and automatic blade water control. Each of these aspects is described in greater detail. The term "concrete saw" as used herein refers to nearly any saw for cutting concrete, asphalt, stone and other hardened surfaces. The saw is typically a self-propelled saw, however, it is contemplated that the saw could be a push-type saw. Concrete saws include an onboard rotary power source such as an internal combustion engine. Such engines may be gas powered, diesel, or use other fuels. It is also contemplated that the rotary power source could be in the form of one or more electrically powered motors. The present invention and its various aspects can be utilized in other concrete saw types and configurations. Various aspects of the present invention are described in greater detail as follows.

Gear Configuration

The present invention is directed to a concrete saw having a longitudinally aligned motor and a gear driven blade shaft. A motor shaft transfers power to a drive shaft through a bevel gear. The drive shaft rotates about an axis that is parallel to a blade shaft. A set of sheaves are mounted on the drive shaft, but not on the blade shaft. Instead, a set of sheaves is mounted to an intermediate shaft, hereinafter referred to as a "jack shaft". V-belts are used to transfer power from the drive shaft to the jack shaft. Although V-belts are preferred, in no way is the present invention limited to such. Instead, nearly any type of belt having sufficient size and durability characteristics can be used. A gear is operatively associated with the jack shaft. A pair of spur gears mesh with the jack shaft gear and with a gear operatively associated with the blade shaft. Thus, the blade shaft is gear driven, rather than belt driven.

This configuration prevents V-belts and associated sheaves from being exposed to the harsh environment adjacent to the saw blade, and allows for greater ground clearance as sheave diameter is no longer a factor. The blade shaft bearings can have a relatively wide stance i.e., spacing, which improves mechanical loading. Furthermore, it is possible to accommodate various width saws simply through the use of blade shaft extensions. Furthermore, bearings for the blade shaft can be placed into an oil bath, which provides for less maintenance and greater durability.

Unlike conventional concrete saws, which use various sizes of V-belts and sheaves to adjust the rotational speed of the saw blade, a concrete saw according to the invention utilizes a fixed V-belt/sheave ratio. Adjustments to the rotational speed of the saw blade can be readily made by changing the pair of spur gears to obtain different gear ratios. The use of a fixed V-belt/sheave ratio allows for the use of a belt tensioner, which allows for easy and quick belt changes without having to turn the motor.

Optionally, the concrete saw according to the invention can include a multi-disk hydraulically actuated wet clutch within a transmission to disengage the gear operatively associated with the jack shaft from the jack shaft. A wet clutch provides superior performance as compared to a dry electromagnetic clutch system such as is sometimes used in the art.

Although the present invention is described in conjunction with a concrete saw using a longitudinally oriented motor or engine, it will be appreciated that the invention can be utilized in concrete saws using other engine orientations.

Drive Belt Tension Adjustment

This feature of the present invention relates to a provision that enables the tension of a drive belt to be easily adjusted by use of a jack bolt that adjusts the height of an engine foot. Belts running between a drive shaft assembly and a blade shaft assembly can be conveniently and easily changed, or their tension adjusted, by the jack bolt.

Wheel Height and/or Cutting Depth Indicator and Control

This feature of the invention provides an indication of wheel height and/or blade cutting depth to the operator. This feature also provides control of the position of the wheels and/or blade cutting depth. The position of the wheels is indicated by sensing relative position(s) of a magnetic sensor, connected to the wheels by linkage. The sensor assembly is preferably housed within a cylinder or other enclosure supported on the frame of the saw. An electric motor is used to adjust the position of the sensor assembly to "zero" the position indicator.

The wheel height indicator or blade depth control system is generally as follows. A hydraulic cylinder pivots a front wheel assembly up and down to raise and lower the saw. A magnetic proximity sensor moves back and forth inside a tube or other enclosure as the saw is raised and lowered since the sensor is connected by linkage to the front wheel assembly. On the opposing end of this same tube is an electric actuator that contains a small magnet on the end of an actuator rod. To set a specific cutting depth, the operator lowers the saw to the desired cutting depth and then actuates a switch which energizes the electric motor of the actuator thereby causing the actuator rod to extend. When the magnet on the end of the rod reaches the proximity sensor's switch range, typically about $3/16$ inches gap, the system switches power off to the actuator and a hydraulic valve that allows the hydraulic cylinder to lower the saw. Power is still available to raise the saw which then moves the proximity sensor away from the magnet. However, when re-lowering the saw, the system will again switch power off to the actuator and the hydraulic valve when the sensor nears the magnet thereby achieving the same depth. In order to cut deeper than the set depth, the operator retracts the actuator rod/magnet. When fully retracted, the saw can then fully lower.

Handle Adjustment and Locking Assembly

In this feature of the invention, the position of the handles is governed by a hydraulic circuit. If a valve is opened allowing fluid to flow through a closed loop, the handles may be raised or lowered. If however, the valve is closed, movement of the handles is prevented since fluid flow is prevented.

This hydraulic cylinder preferably includes a valve within a closed fluid loop that traps fluid on each side of a piston residing in a hydraulic cylinder. The cylinder rod is prevented from moving in or out with respect to the cylinder when the valve is closed thereby locking the handle bar position without any additional mechanical components.

The hydraulic cylinder is preferably a double rod cylinder, i.e. a rod on each end of the piston. The purpose of this style cylinder is to provide an equal amount of fluid to be displaced on each face of the piston.

Automatic Water Control

In this feature of the invention, a cutting depth indicator, preferably in the style of an analog clock face, is provided. A rotary knob is provided in the center of the depth indicator. The knob indicates the desired depth at which blade water turns on or off. For example, if the knob is rotated to 12 inches, then water to the cutting blade will be turned on once the blade is lowered to 12 inches. Water supply to the blade will remain on as long as the blade is at 12 inches depth or greater. Once the blade is retracted to less than 12 inches, water supply is turned off. Rotation of the knob turns a gear assembly which in turn rotates a cam surface against an electrical push switch. That switch controls operation of a solenoid valve located in a water supply line. That supply line supplies water for the blade.

In operation, the saw blade is lowered until the blade is just clear of the pavement. The rotary knob is manually turned by the operator to the zero ("0") position. As the saw lowers the blade into the cut, the water turns on and the knob points to the number of inches of blade cutting depth 1 inch, 2 inches, 3 inches and so on. As explained herein, a knob rotation results from a cable that attaches to the front wheel assembly. Raising the saw blade reverses the knob rotation and upon reaching the zero point turns the water off and remains off if the blade is raised even further beyond the zero point, i.e. −1 inch, −2 inches, −3 inches etc.

Details of Preferred Aspects

Figure 3:
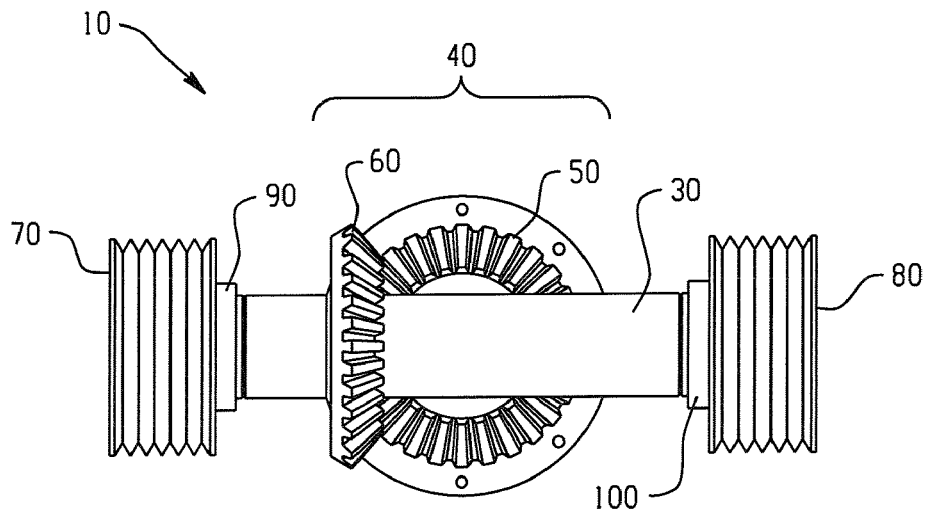
FIG. 3 is a front view of the exemplary drive shaft assembly as shown in FIG. 1.
Figure 5:
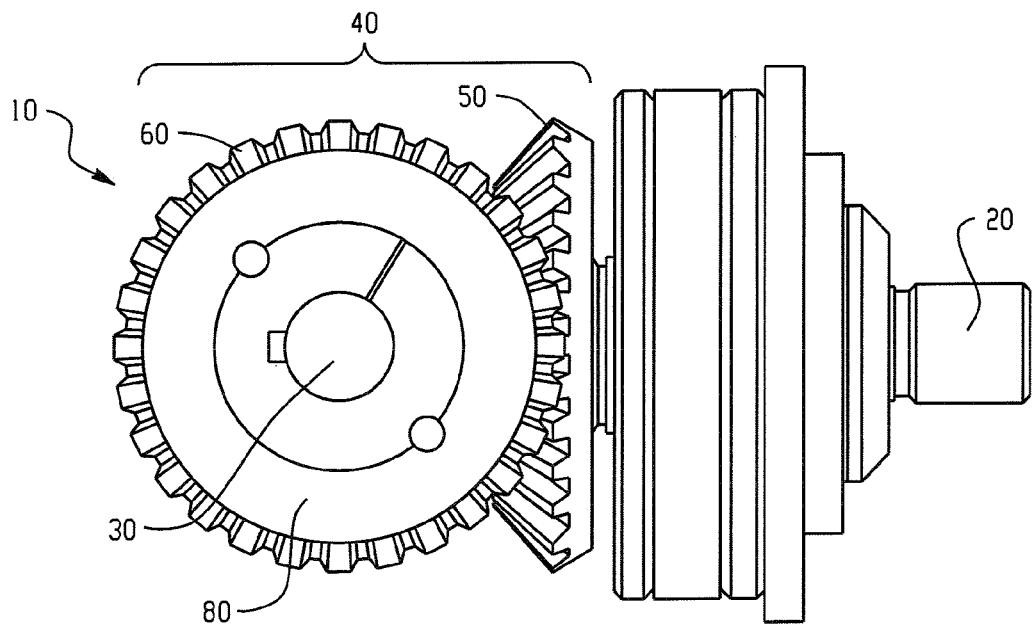
FIG. 5 is a side view of the exemplary drive shaft assembly shown in FIG. 1.

A concrete saw according to the present invention comprises a longitudinally aligned motor that supplies rotary power to a drive shaft assembly. The drive shaft assembly in turn, provides power to a blade shaft assembly which rotates a cutting blade. With reference to FIGS. 1, 3, and 5, a preferred embodiment drive shaft assembly 10 is illustrated which comprises a motor shaft 20, which extends from the longitudinally aligned motor (not shown). The motor shaft 20 drives a drive shaft 30 via a bevel gear assembly 40. The bevel gear assembly 40 comprises a pinion gear 50, which is mounted to the motor shaft 20, and a complimentary bevel gear 60, which is mounted to the drive shaft 30. The bevel gear assembly 40 may be, but need not be, a miter bevel gear, as depicted in FIG. 1. Sheaves 70, 80 are mounted and engaged to the drive shaft 30 on opposite sides of the bevel gear assembly 40. The drive shaft 30 is supported by bearings 90, 100.

Figure 2:
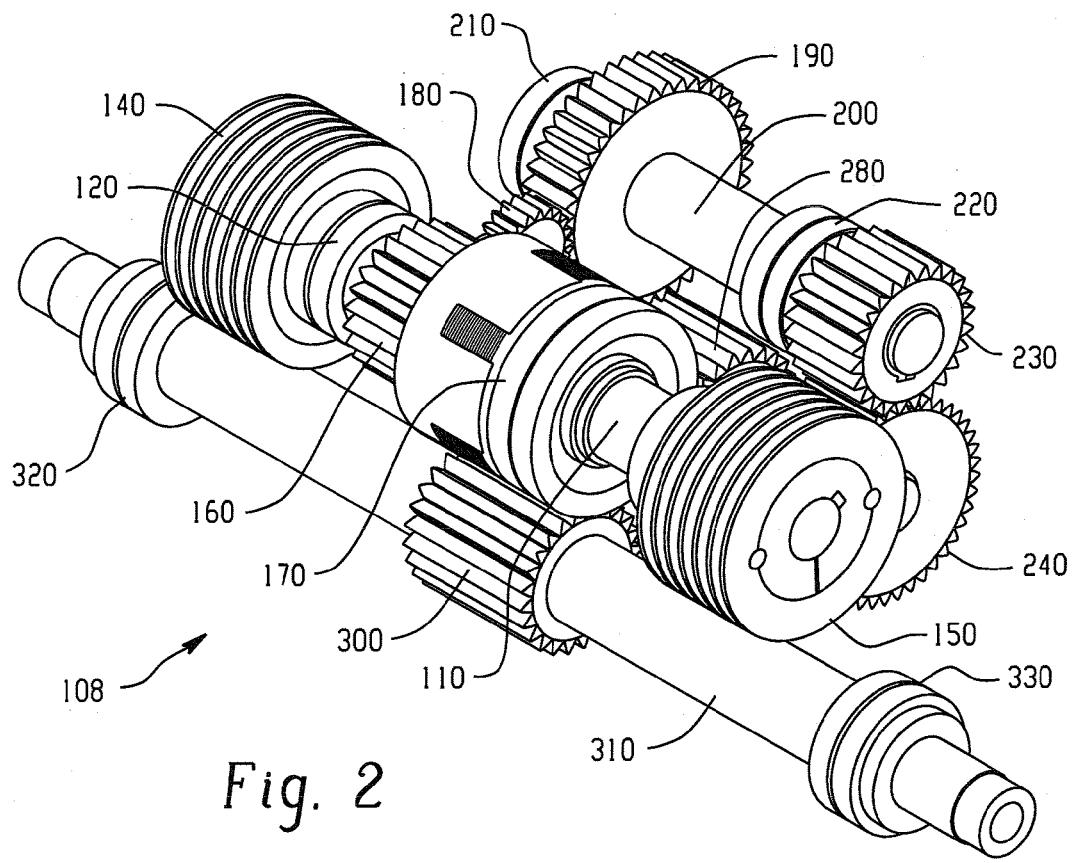
FIG. 2 is a perspective view of an exemplary blade shaft assembly according to the invention.
Figure 4:
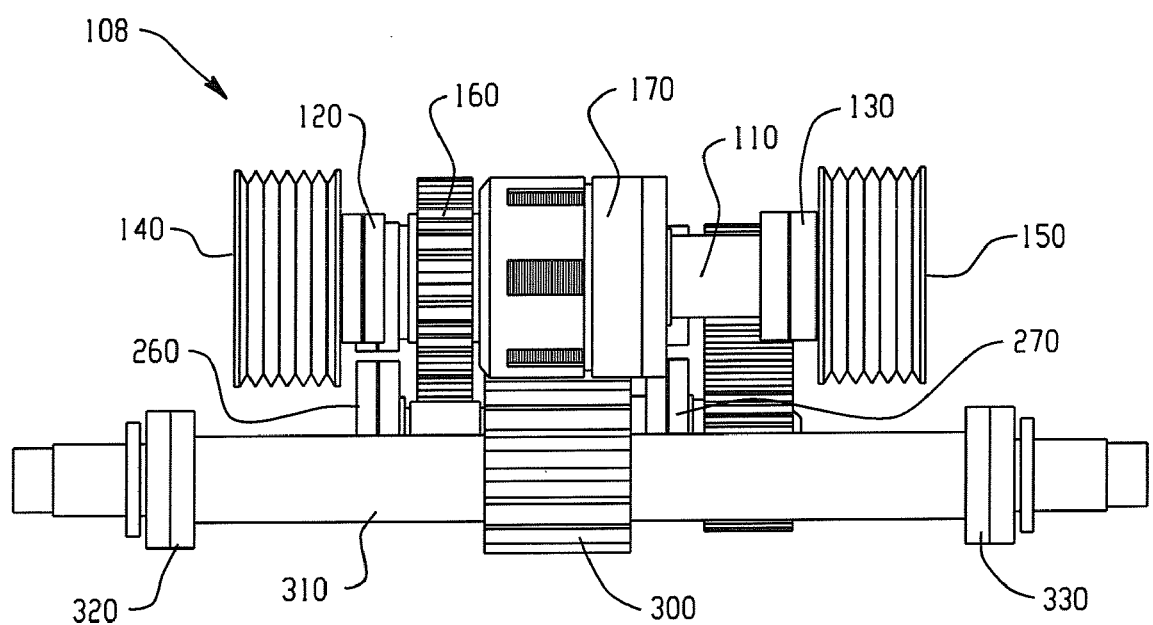
FIG. 4 is a front view of the exemplary blade shaft assembly shown in FIG. 2.
Figure 6:
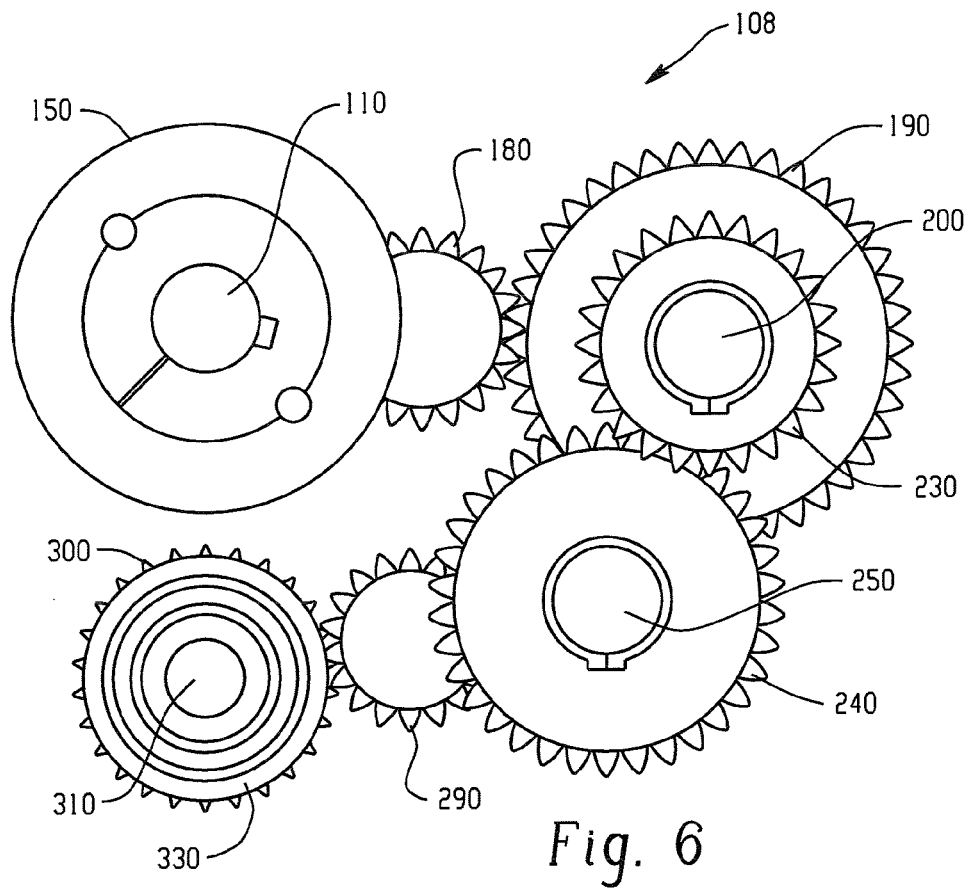
FIG. 6 is a side view of the exemplary blade shaft assembly shown in FIG. 2.

FIGS. 2, 4, and 6 illustrate a blade shaft assembly 108 which comprises a jack shaft 110, an upper transmission shaft 200, a lower transmission shaft 250, a blade shaft 310, and associated gears and sheaves as described in greater detail herein. In this version of the blade shaft assembly, the assembly 108 is a multi-speed assembly. The present invention also includes a single speed blade assembly described in greater detail herein. The jack shaft 110 is supported by jack shaft bearings 120, 130 and is oriented substantially parallel to the drive shaft 30 in FIG. 1. A pair of jack shaft sheaves 140, 150 are mounted to and engaged with the jack shaft 110 such that the grooves in the drive shaft sheaves 70, 80 (FIG. 1) mounted to the drive shaft 30 align with the grooves in the jack shaft sheaves 140, 150 mounted to the jack shaft 110. Thus, one or more V-belts (not shown) can be received within the grooves of the drive shaft sheave 70 mounted to the drive shaft 30 and sheave 140 mounted to the jack shaft 110. Similarly, one or more V-belts (not shown) can be received within the grooves of sheave 80 mounted to the drive shaft 30 and the jack shaft sheave 150 mounted to the jack shaft 110. Preferably, all of the V-belts are of the same length and are tensioned using a belt tensioner (not shown), described in greater detail herein. In accordance with the present invention, the blade shaft 310 is free of any sheave(s) or other belt-engaging components.

A jack shaft spur gear 160 is operatively associated with the jack shaft 110. Preferably, the jack shaft spur gear 160 is operatively associated with the jack shaft 110 through a multi-disk hydraulic clutch assembly 170. The use of a multi-disk hydraulic clutch assembly 170 allows an operator to selectively apply and remove rotational torque from the jack shaft 110 to the jack shaft spur gear 160.

An upper intermediate spur gear 180 meshes with and engages both the jack shaft spur gear 160 and an upper transmission spur gear 190. The upper transmission spur gear 190 is secured to the upper transmission shaft 200, which is supported by a pair of upper transmission shaft bearings 210, 220. An upper removable spur gear 230 is mounted on the upper transmission shaft 200. The end of the upper transmission shaft 200 is preferably keyed and/or indexed to match a bore in the upper removable spur gear 230.

The upper removable spur gear 230 meshes with and engages a lower removable spur gear 240, which is mounted on the lower transmission shaft 250. The end of the lower transmission shaft 250 is also preferably keyed and/or indexed to match a bore in the lower removable spur gear 240. The lower transmission shaft 250 is supported by a pair of lower transmission shaft bearings 260, 270. Preferably, the bore in the upper removable spur gear 230 is the same size and configuration as the bore in the lower removable spur gear 240. This allows the upper removable spur gear 230 to be placed onto the lower transmission shaft 250, and the lower removable spur gear 240 to be placed onto the upper transmission shaft 200 to effect a change in the gear ratio.

A lower transmission gear 280 is also mounted to the lower transmission shaft 250. A lower intermediate spur gear 290 meshes with both the lower transmission gear 280 and a blade shaft spur gear 300 mounted to the blade shaft 310. The blade shaft 310 is supported by a pair of blade shaft bearings 320, 330, which are positioned as far apart from each other as is practical to obtain the widest stance, i.e. separation or spacing. This provides improved mechanical loading for the blade shaft 310.

A concrete saw blade (not shown) can be mounted to or otherwise engaged with an end of the blade shaft 310. Blade shaft extensions (not shown) can also be mounted or affixed to the blade shaft 310 to extend the blade shaft 310, as desired.

In a preferred embodiment of the invention, the entire drive shaft assembly 10 and/or the entire blade shaft assembly 108, with the exception of the end portion(s) of the blade shaft 310 on which the concrete saw blade (not shown) is mounted, are substantially enclosed within one or more housing(s) (not shown). The housings protect the drive shaft assembly 10 and the blade shaft assembly 108 from the harsh working environment, and particularly debris generated from cutting, adjacent to the concrete saw blade during cutting operations. Accordingly, the V-belts and sheaves, which are protected by the housings, do not wear as rapidly as V-belts and sheaves in conventional concrete saws, which are exposed to the harsh environment adjacent to the concrete saw blade.

The shaft bearings are preferably encased within an oil bath. This also provides for less maintenance and greater durability.

Figure 7:
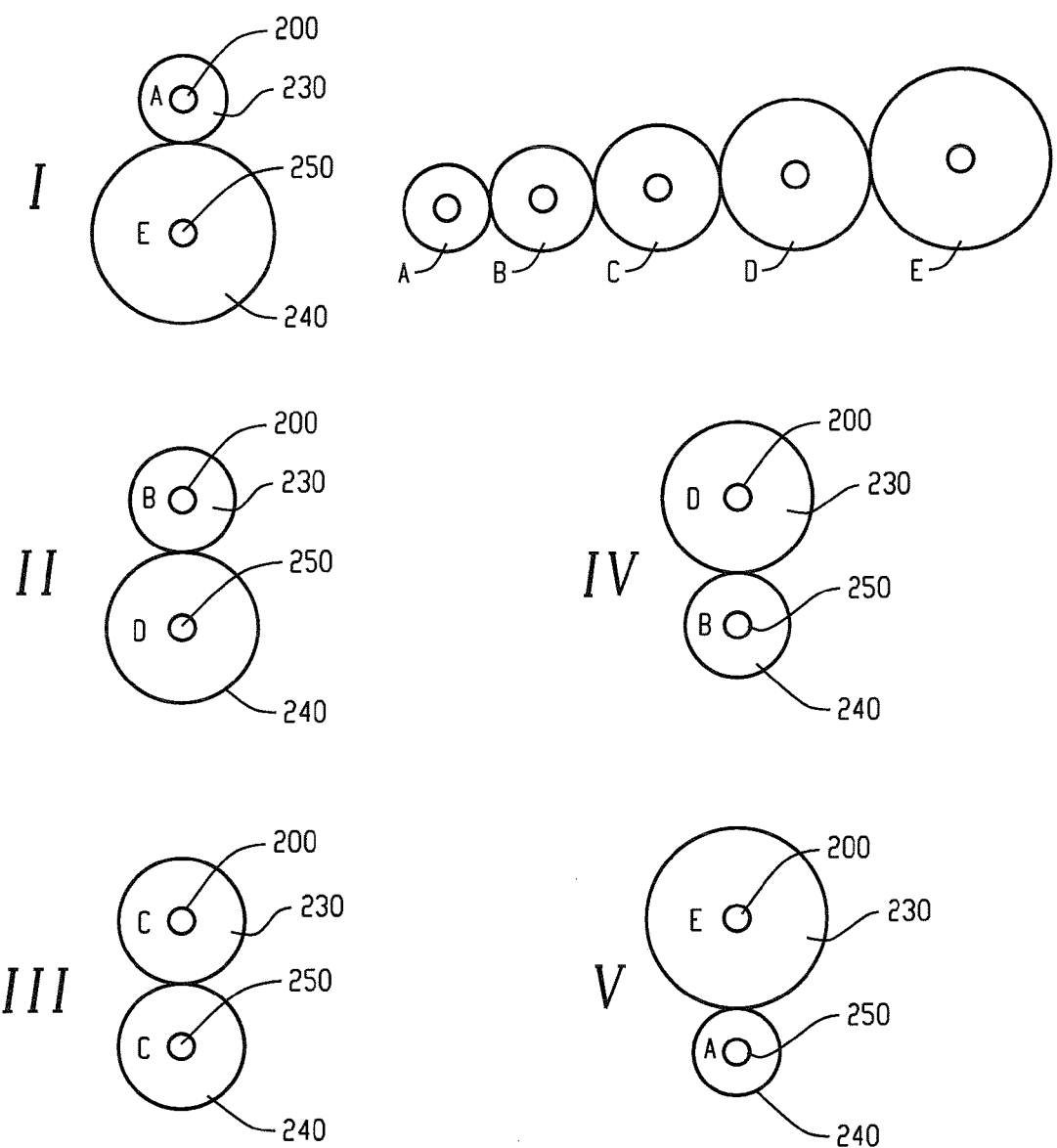
FIG. 7 schematically illustrates five exemplary spur gear ratio combinations.

As previously noted, the V-belts are preferably of the same fixed length. Adjustments in the rotational speed of the blade shaft 310 are thus made by removing and installing the upper removable spur gear 230 and the complimentary lower removable spur gear 240 to obtain a desired gear ratio suitable for the size of concrete saw blade and cutting operation. It will be appreciated that a variety of gear sizes can be utilized, provided the spacing between the bores of the complimentary gears is maintained. FIG. 7 schematically illustrates five sizes of removable spur gears (identified as "A" through "E" in ascending size), which can be arranged on the upper transmission shaft 200 and the lower transmission shaft 250 as indicated in FIG. 7 to obtain five different gear ratios, designated as "I", "II", "III", "IV" and "V".

Figure 8:
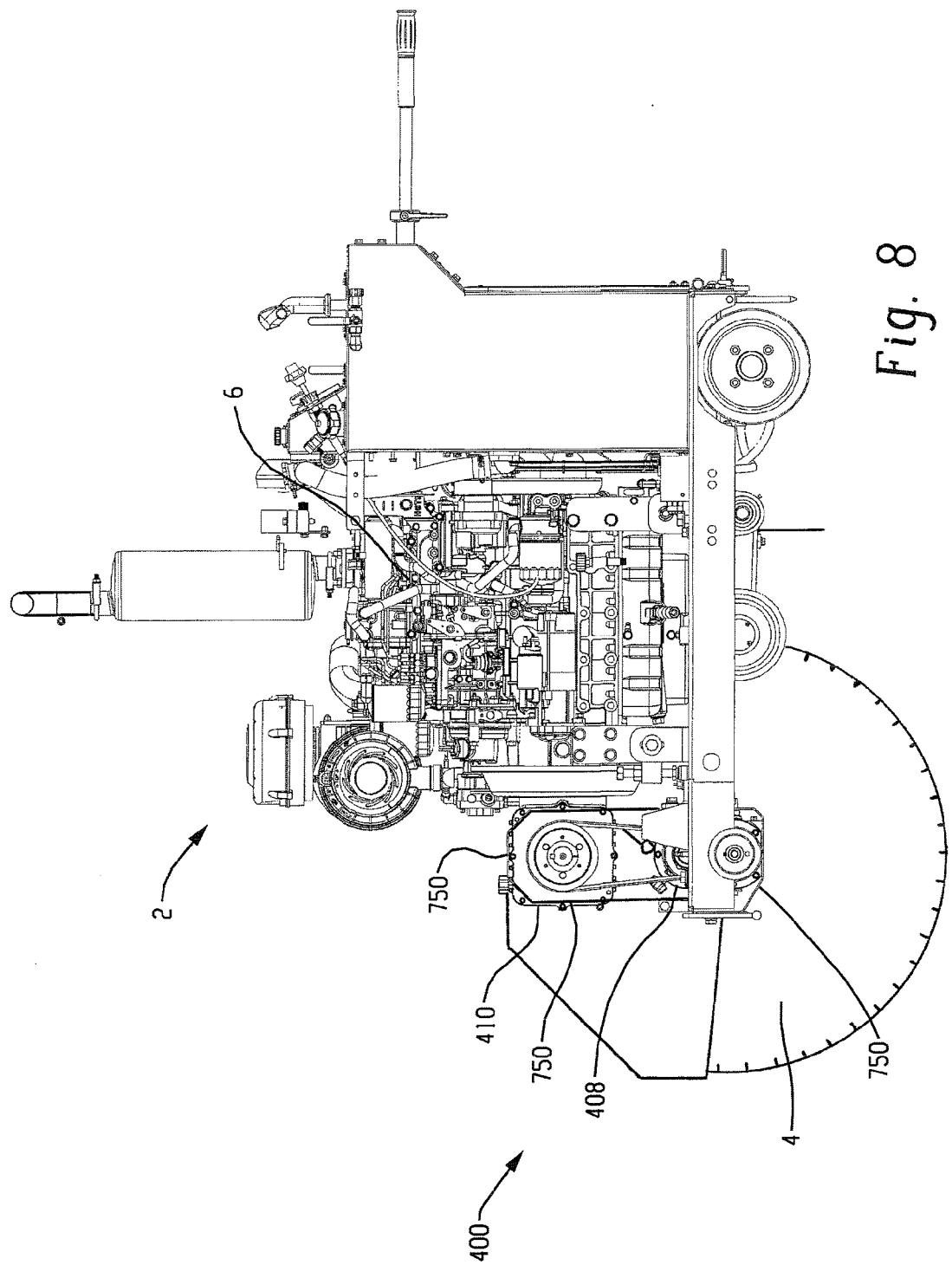
FIG. 8 is a side elevational view of a concrete saw comprising a preferred embodiment drive system including a drive shaft gear box and a blade shaft gear box in accordance with the invention.
Figure 9:
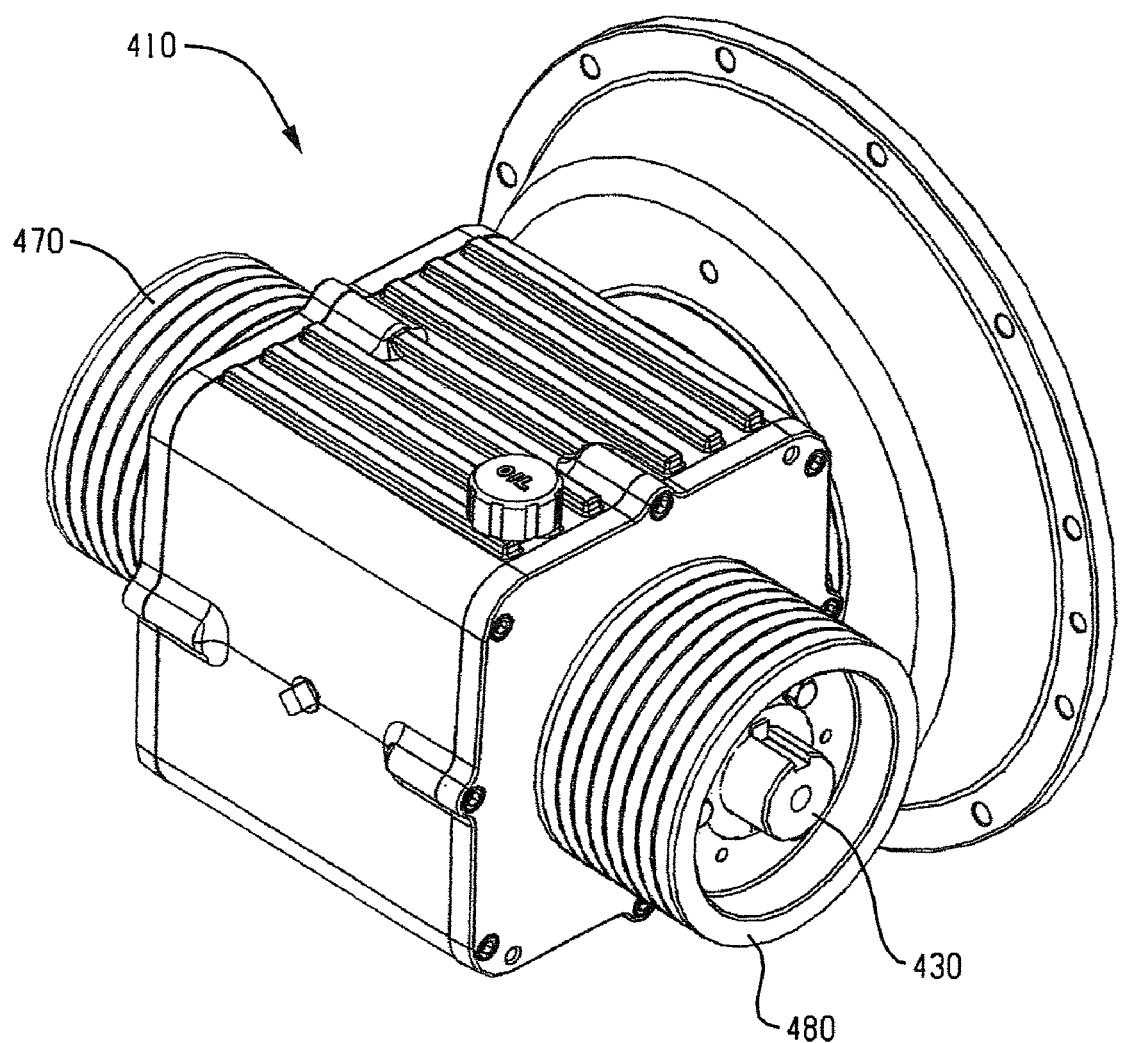
FIG. 9 is a perspective view of a drive shaft gear box and related assembly used in a preferred embodiment drive system in accordance with the invention.
Figure 10:
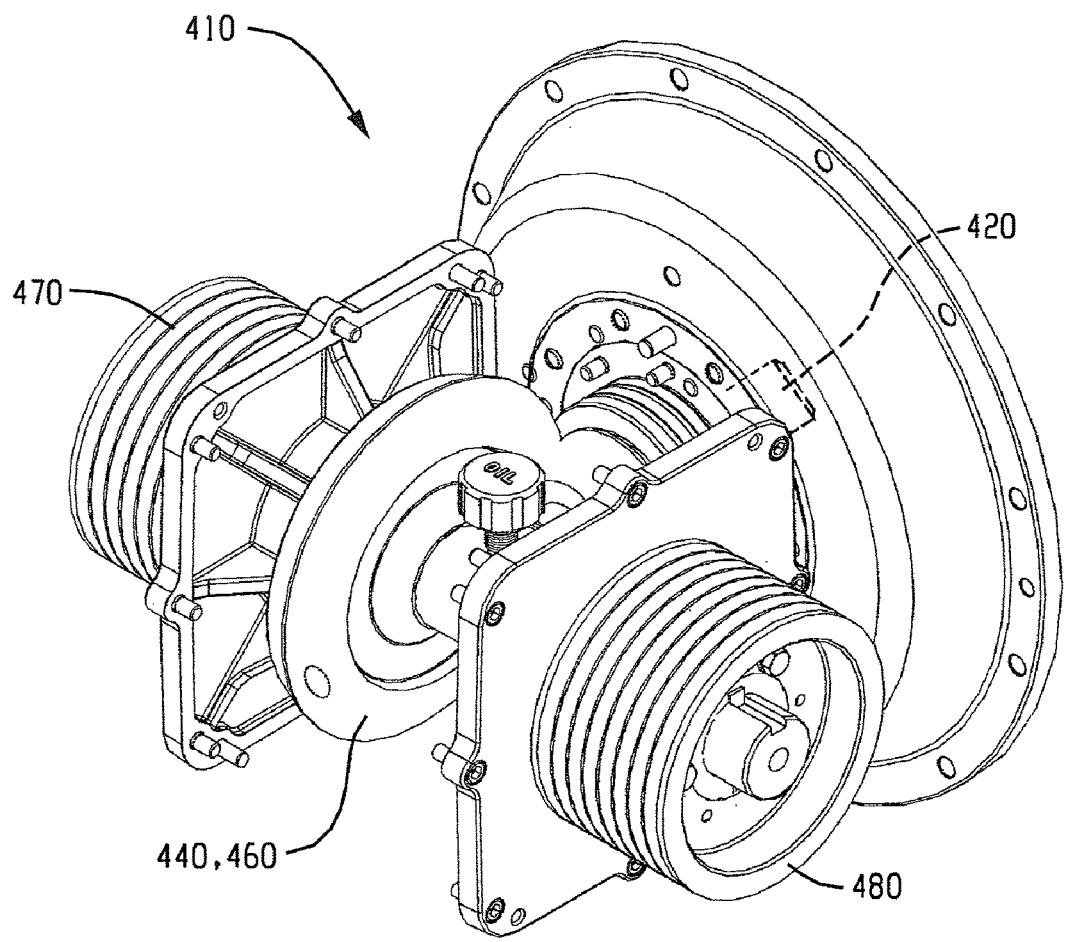
FIG. 10 is a partial cut away view of the drive shaft gear box of FIG. 9 revealing the interior of the gear box.
Figure 11:
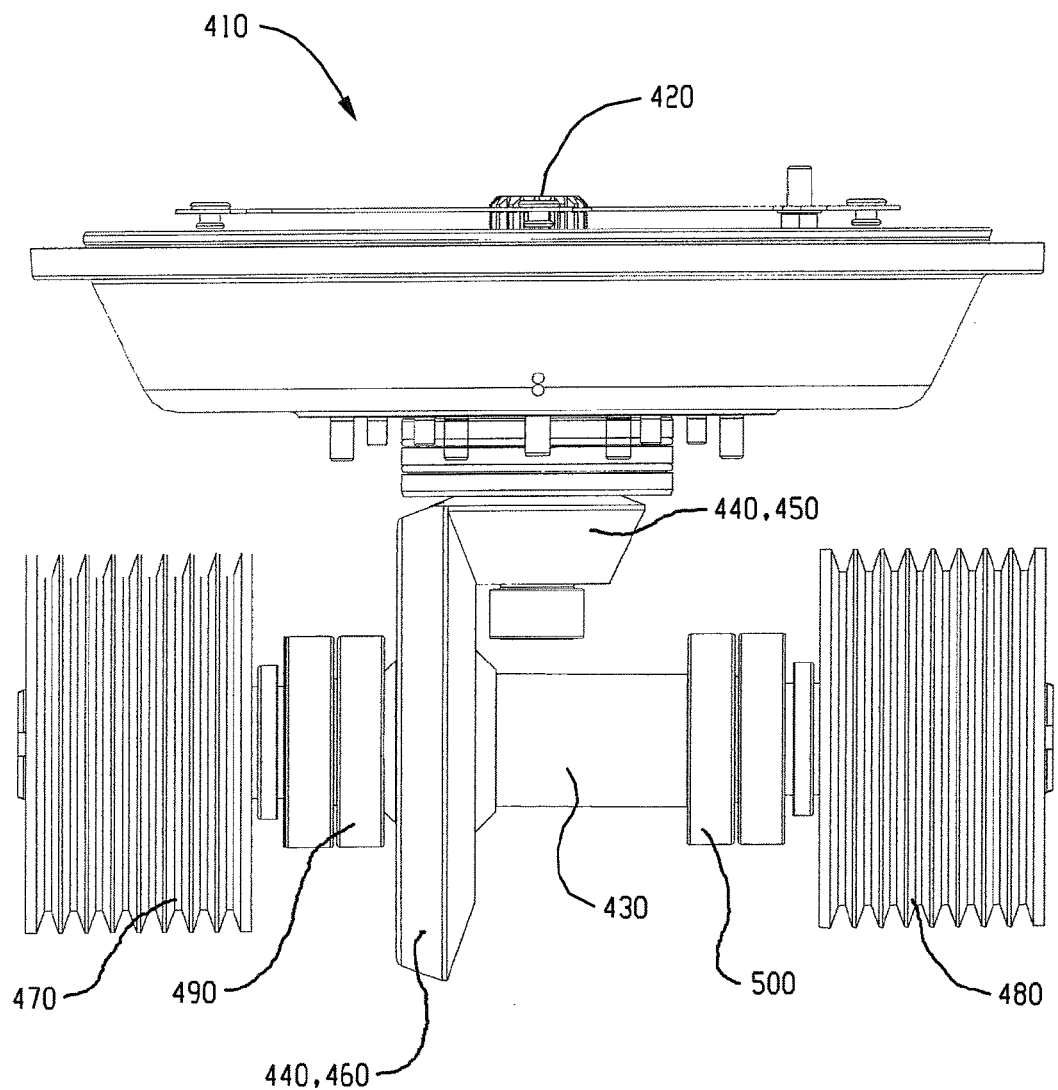
FIG. 11 is a top plan view of the gear box of FIG. 10.
Figure 12:
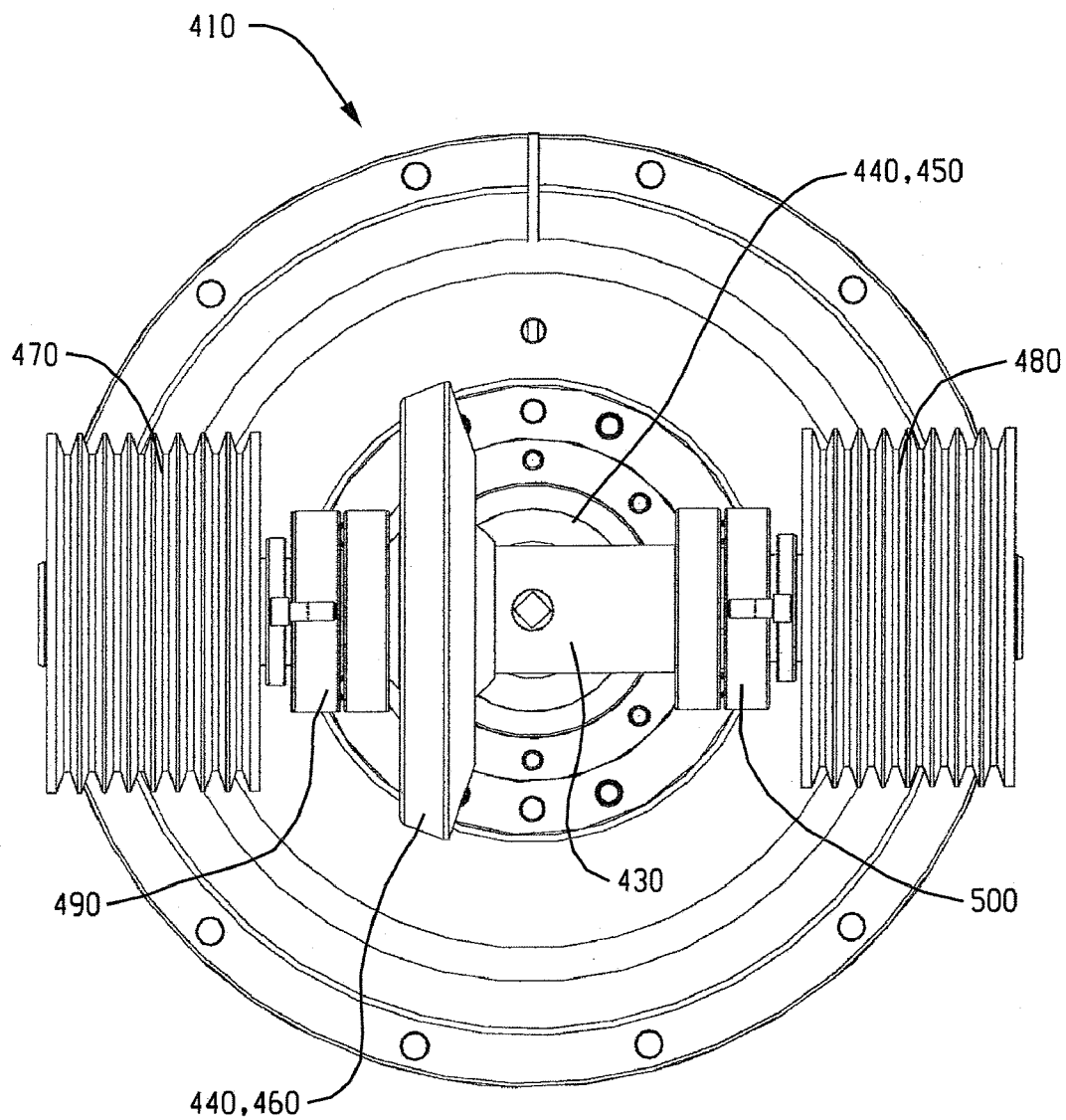
FIG. 12 is an end view of the gear box of FIG. 10.
Figure 13:
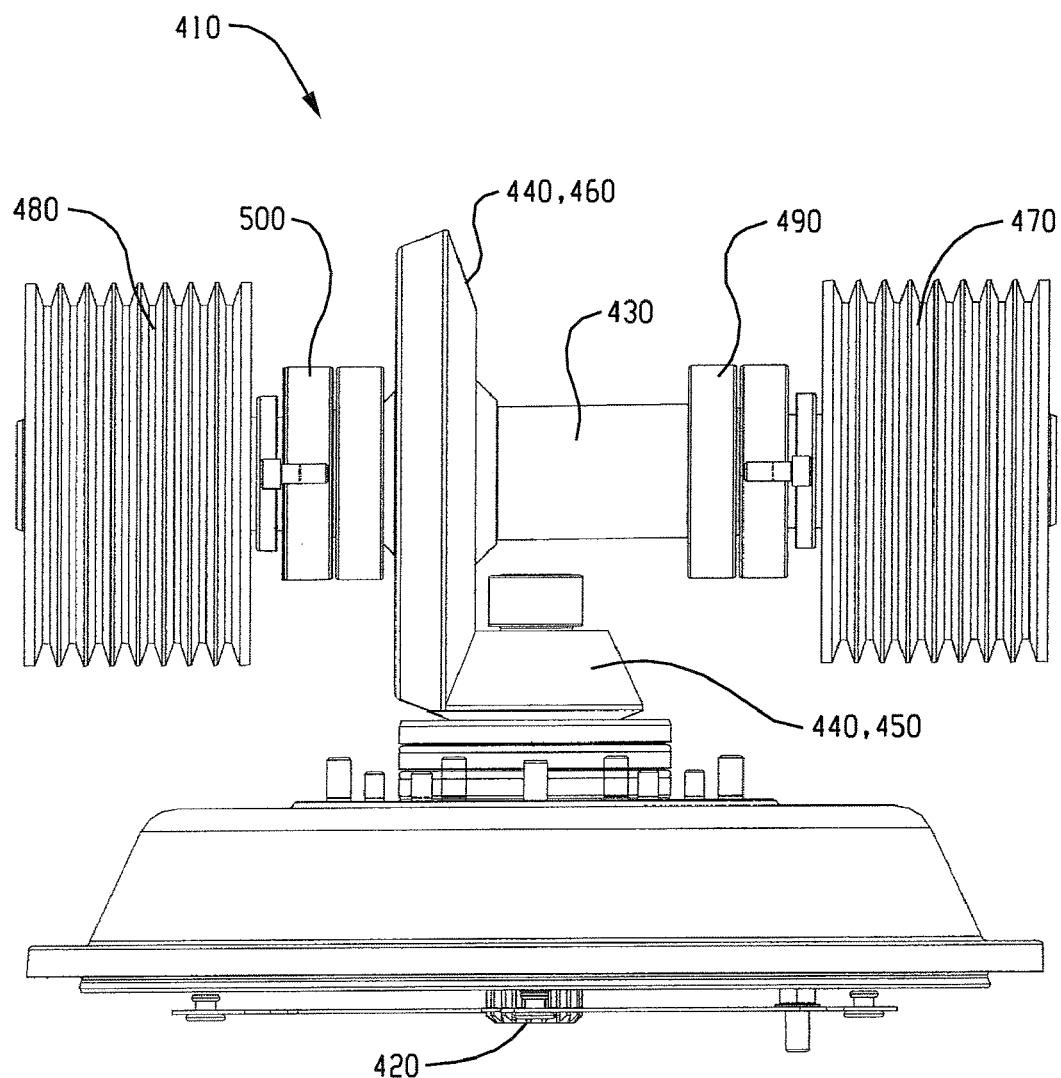
FIG. 13 is a bottom plan view of the gear box of FIG. 10.
Figure 14:
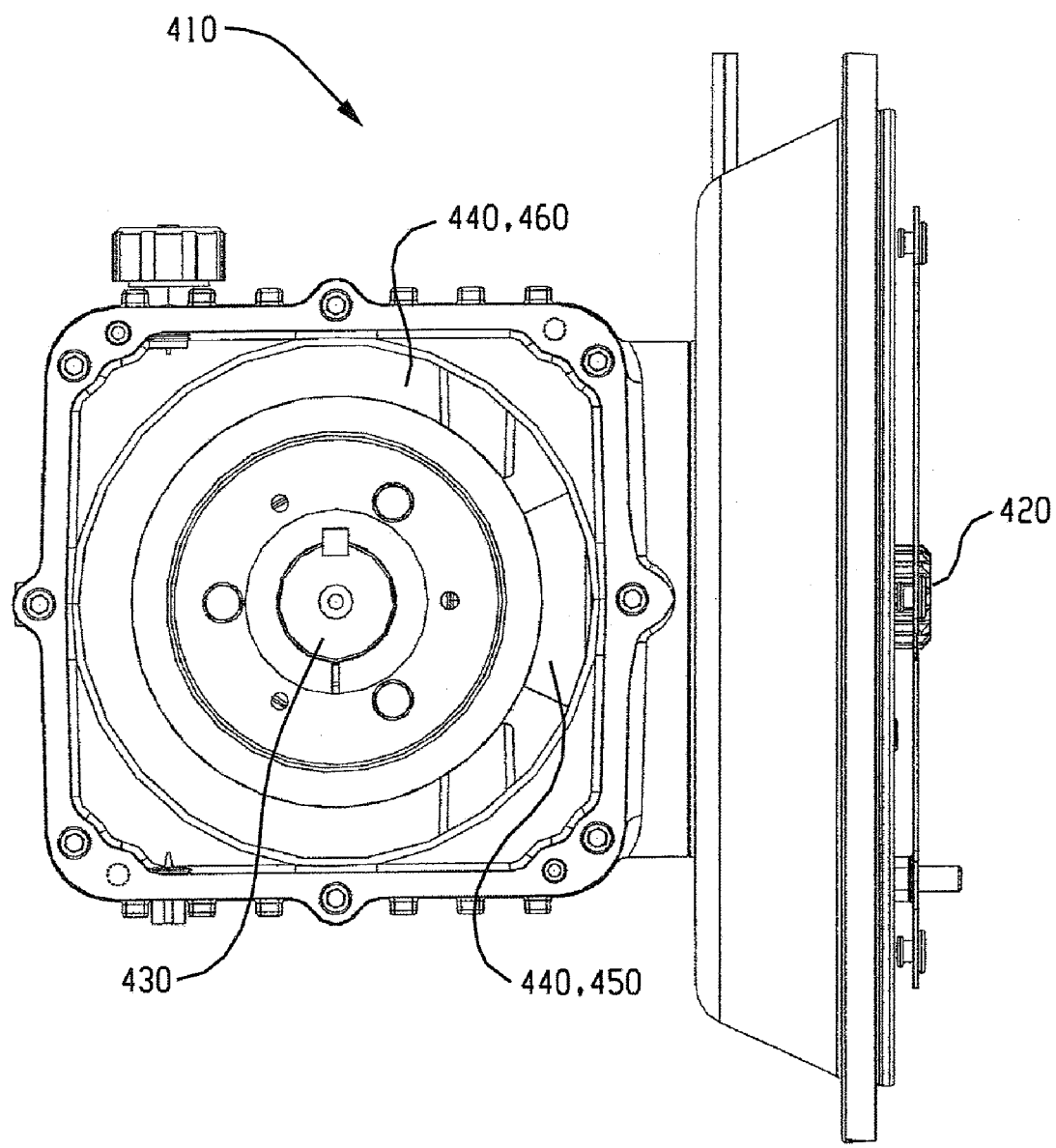
FIG. 14 is a side elevational view of the gear box of FIG. 10.
Figure 15:
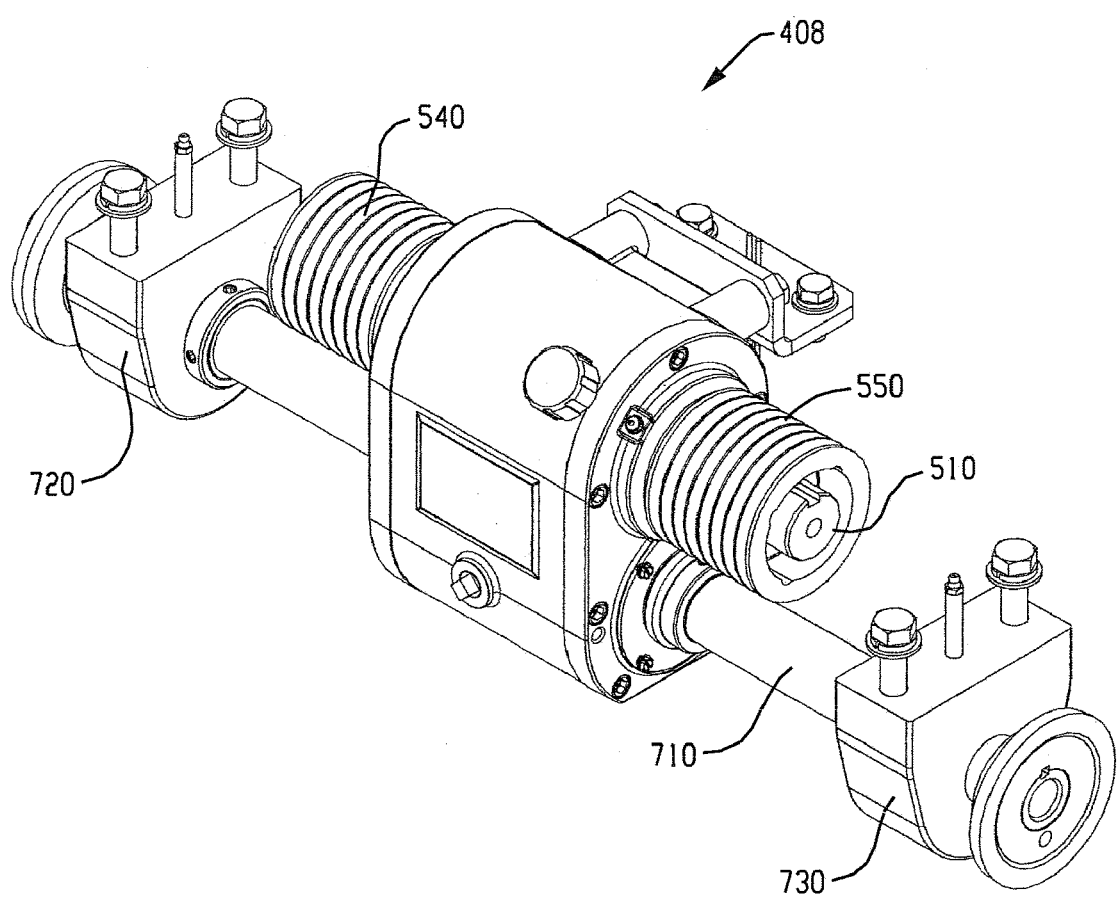
FIG. 15 is a perspective view of a blade shaft gear box and related assembly used in a preferred embodiment drive system in accordance with the invention.
Figure 16:
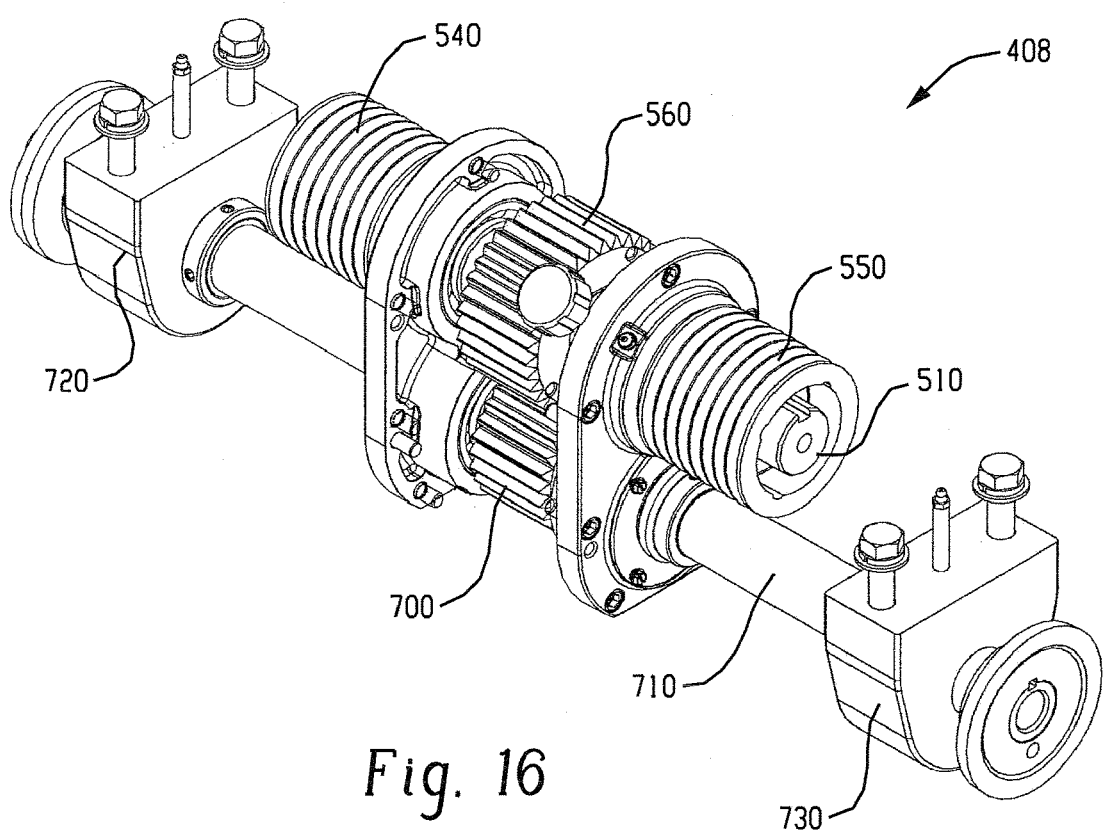
FIG. 16 is a partial cut away view of the blade shaft gear box and assembly of FIG. 15 revealing the interior of the gear box.
Figure 17:
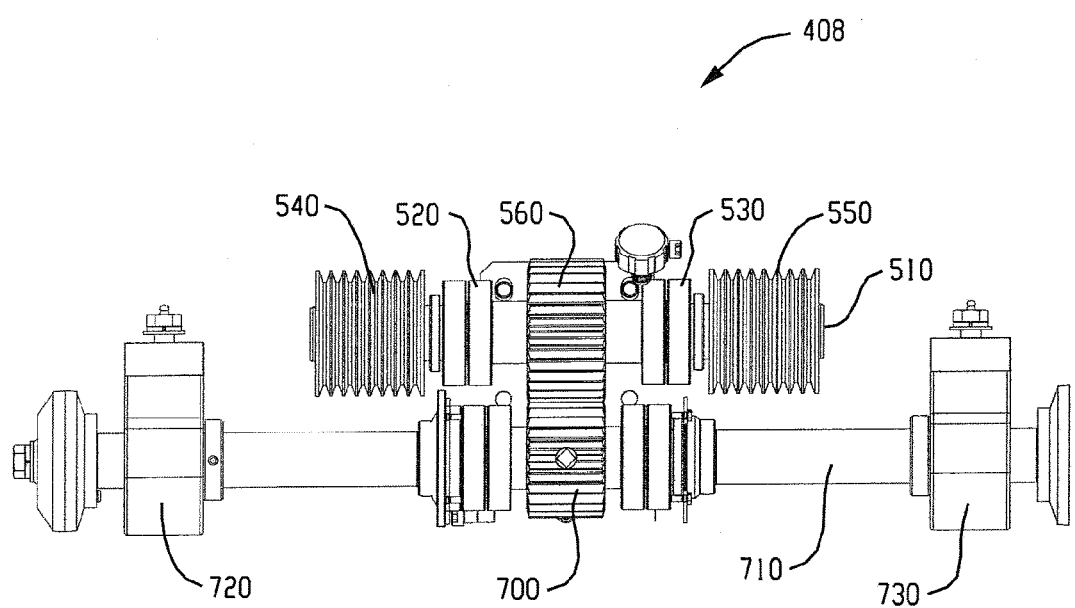
FIG. 17 is an end view of the gear box and assembly of FIG. 16.
Figure 18:
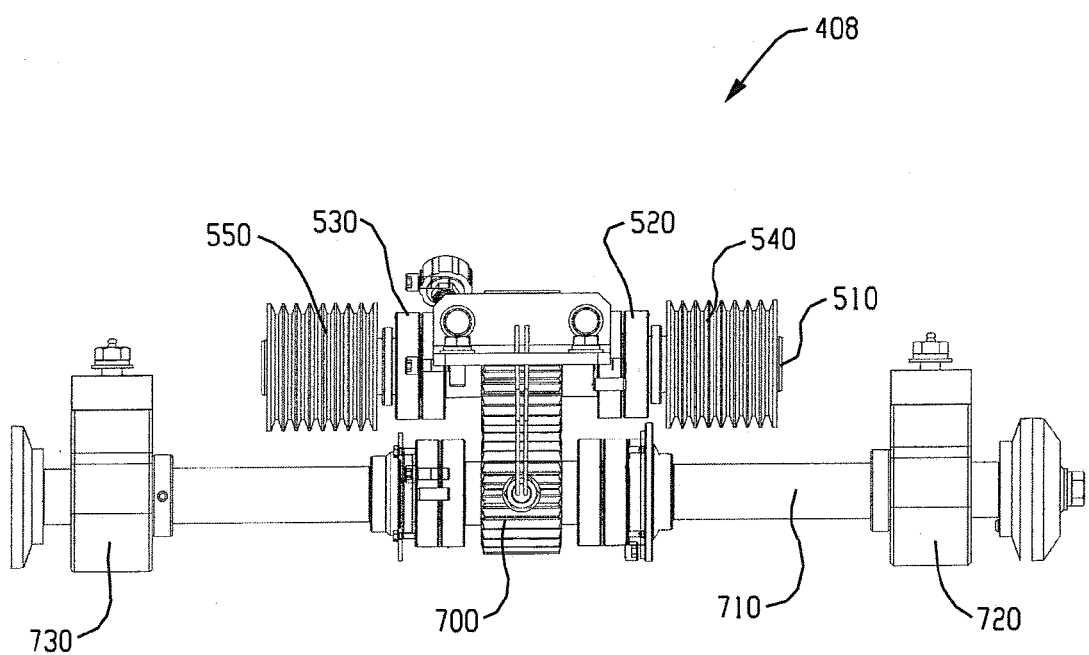
FIG. 18 is another end view of the opposite end of the gear box and assembly of FIG. 16.
Figure 19:
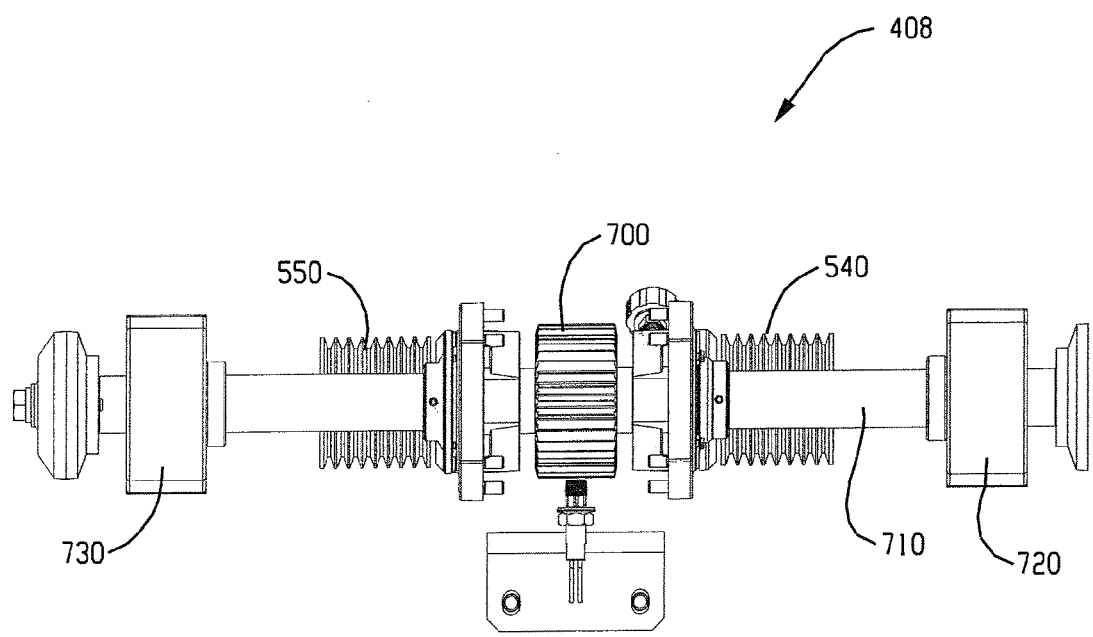
FIG. 19 is a bottom plan view of the gear box and assembly of FIG. 16.
Figure 20:
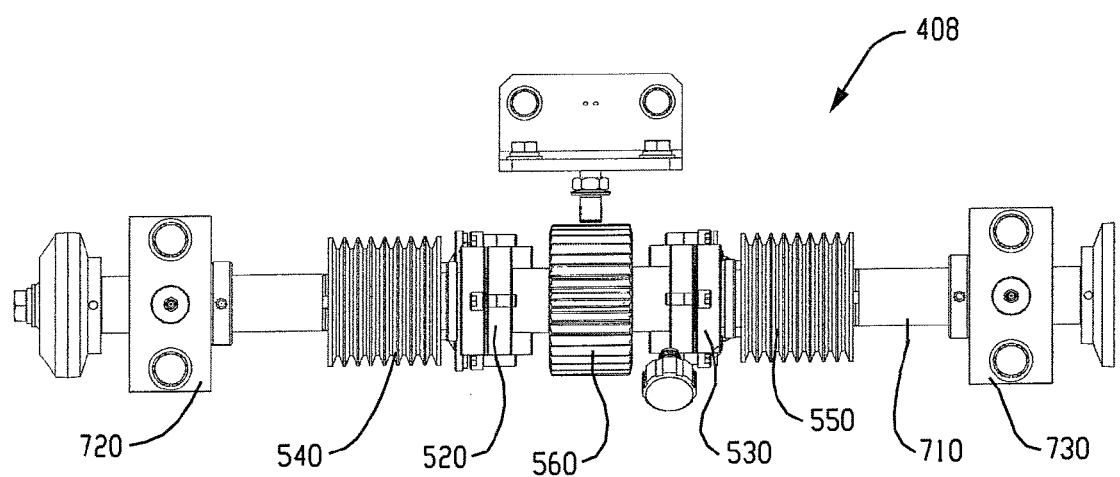
FIG. 20 is a top plan view of the gear box and assembly of FIG. 16.
Figure 21:
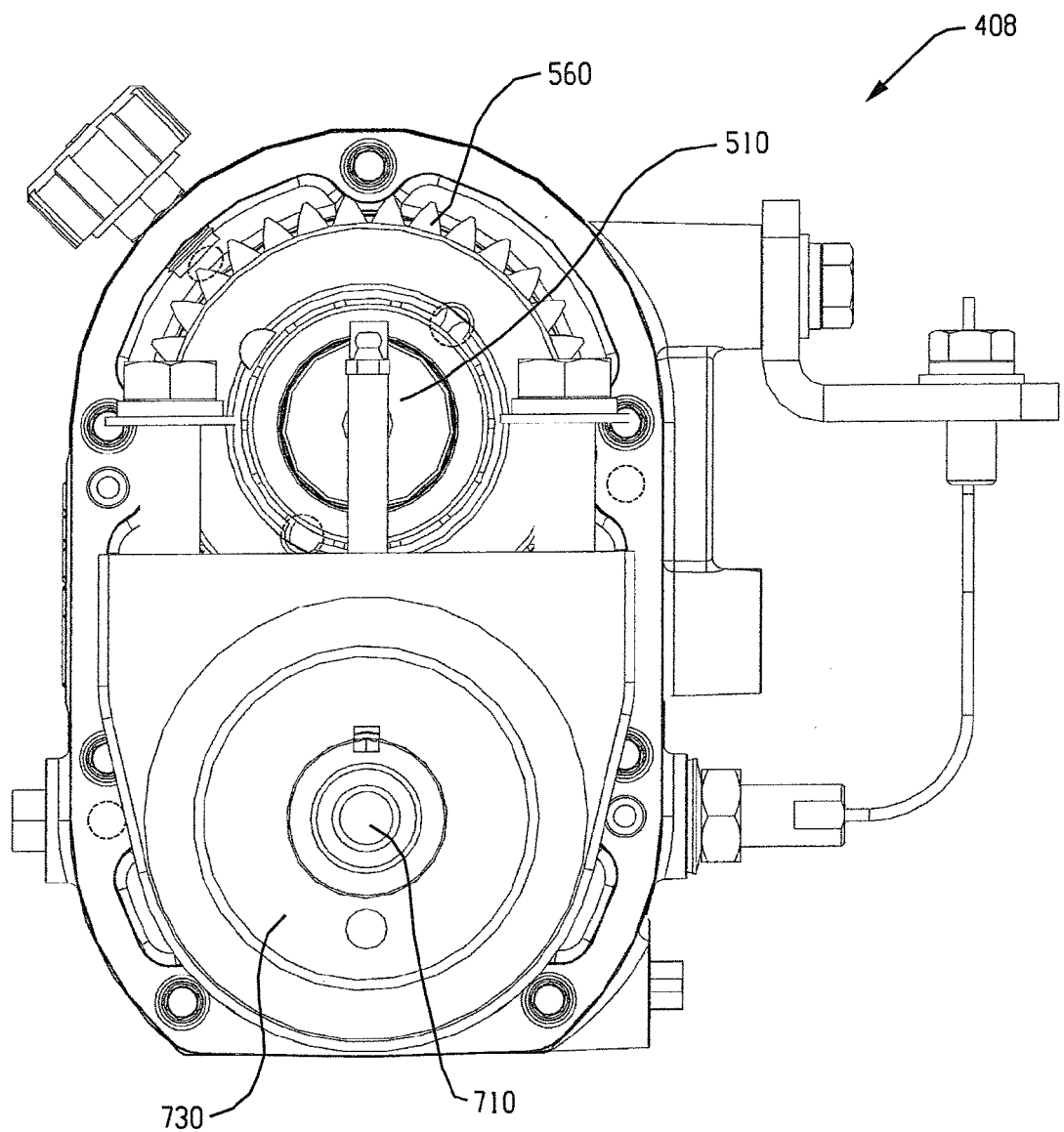
FIG. 21 is a side view of the gear box and assembly of FIG. 16.
Figure 22:
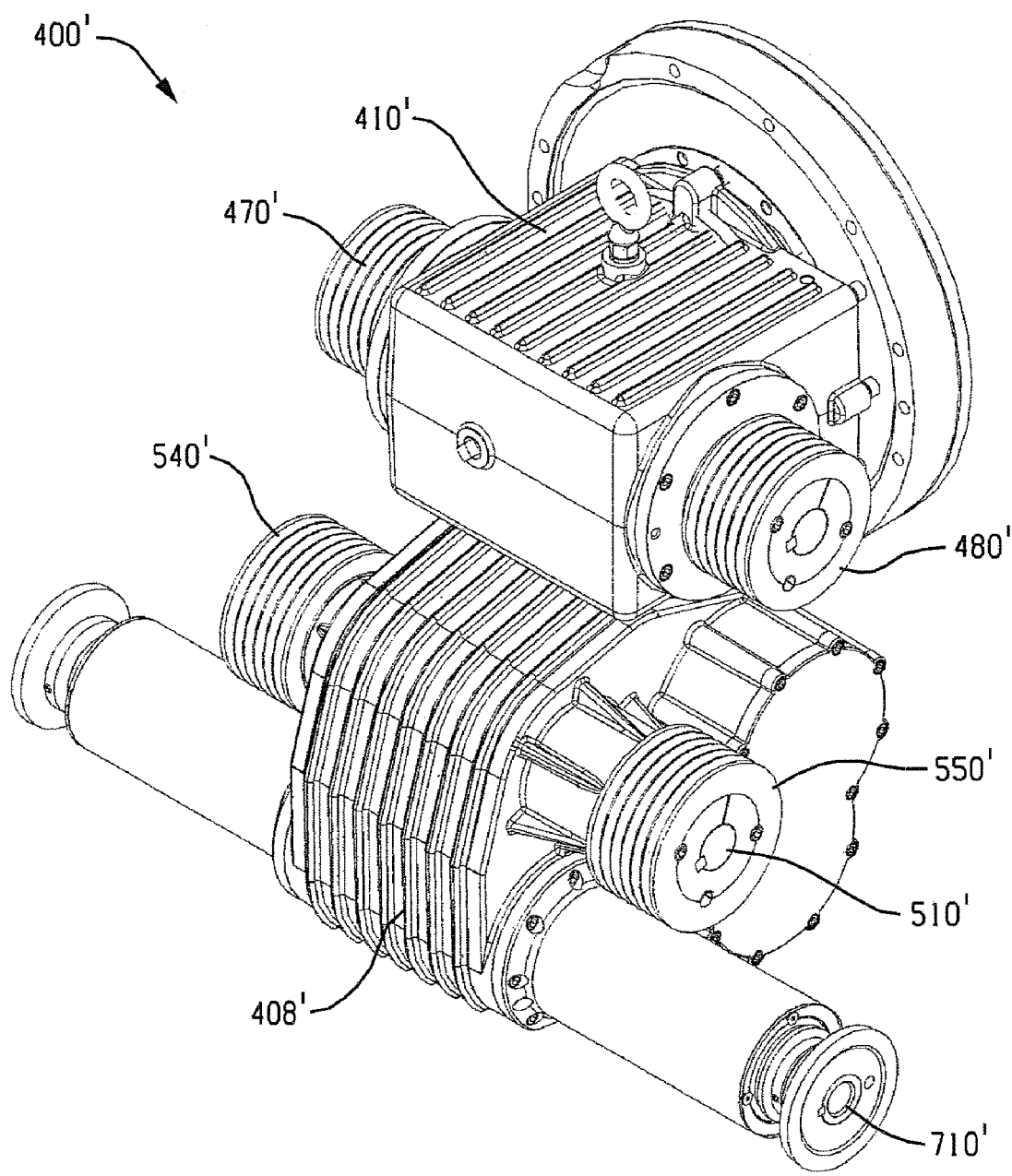
FIG. 22 is a perspective view of another preferred embodiment drive system including a drive shaft gear box and a blade shaft gear box with a transmission assembly in accordance with the invention.
Figure 23:
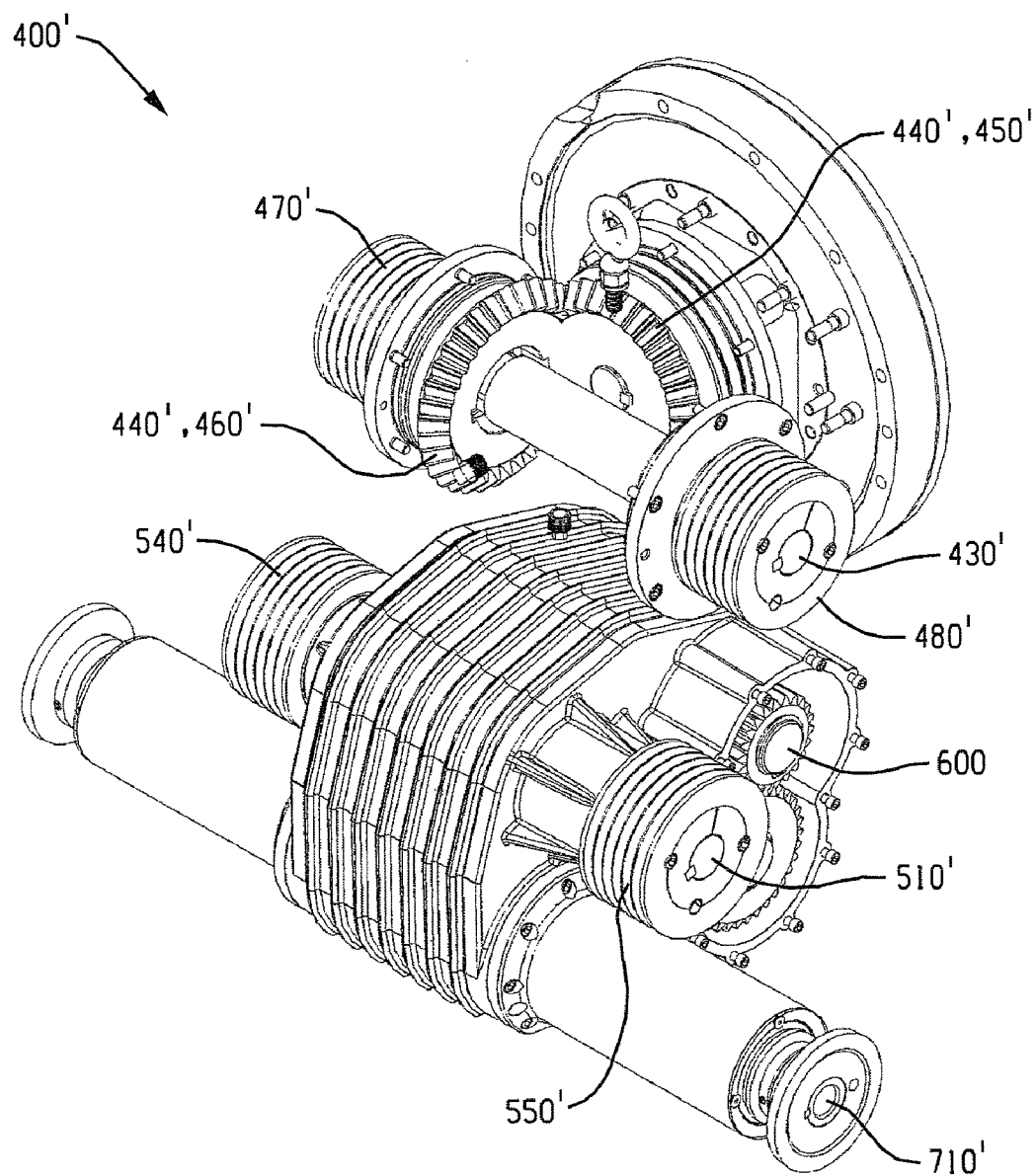
FIG. 23 is a partial cut away view of the drive system of FIG. 22 revealing the interior of the drive shaft gear box, the blade shaft gear box and transmission assembly.
Figure 24:
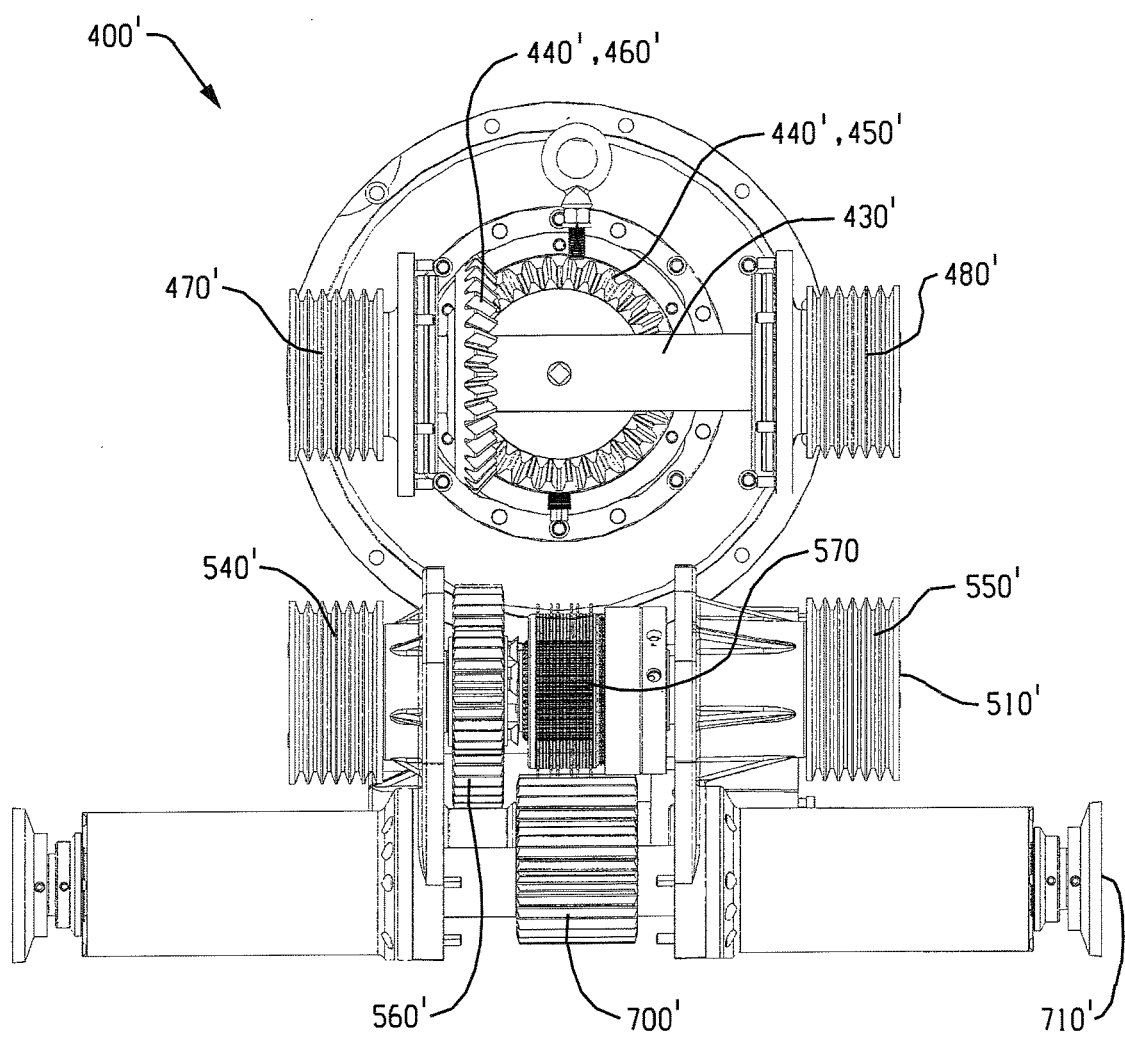
FIG. 24 is an end view of the drive system illustrated in FIG. 23.
Figure 25:
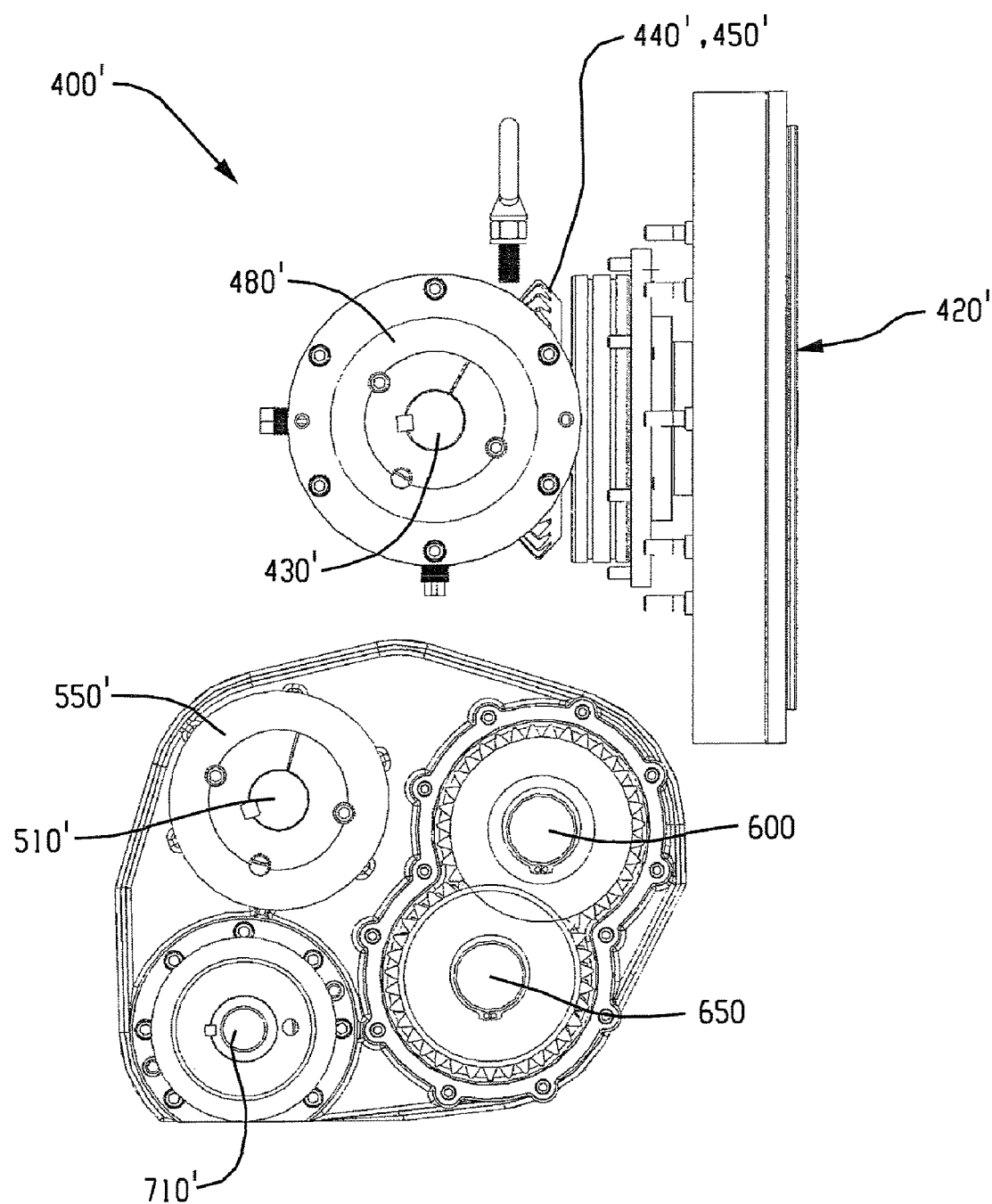
FIG. 25 is a side view of the drive system of FIG. 23.
Figure 26:
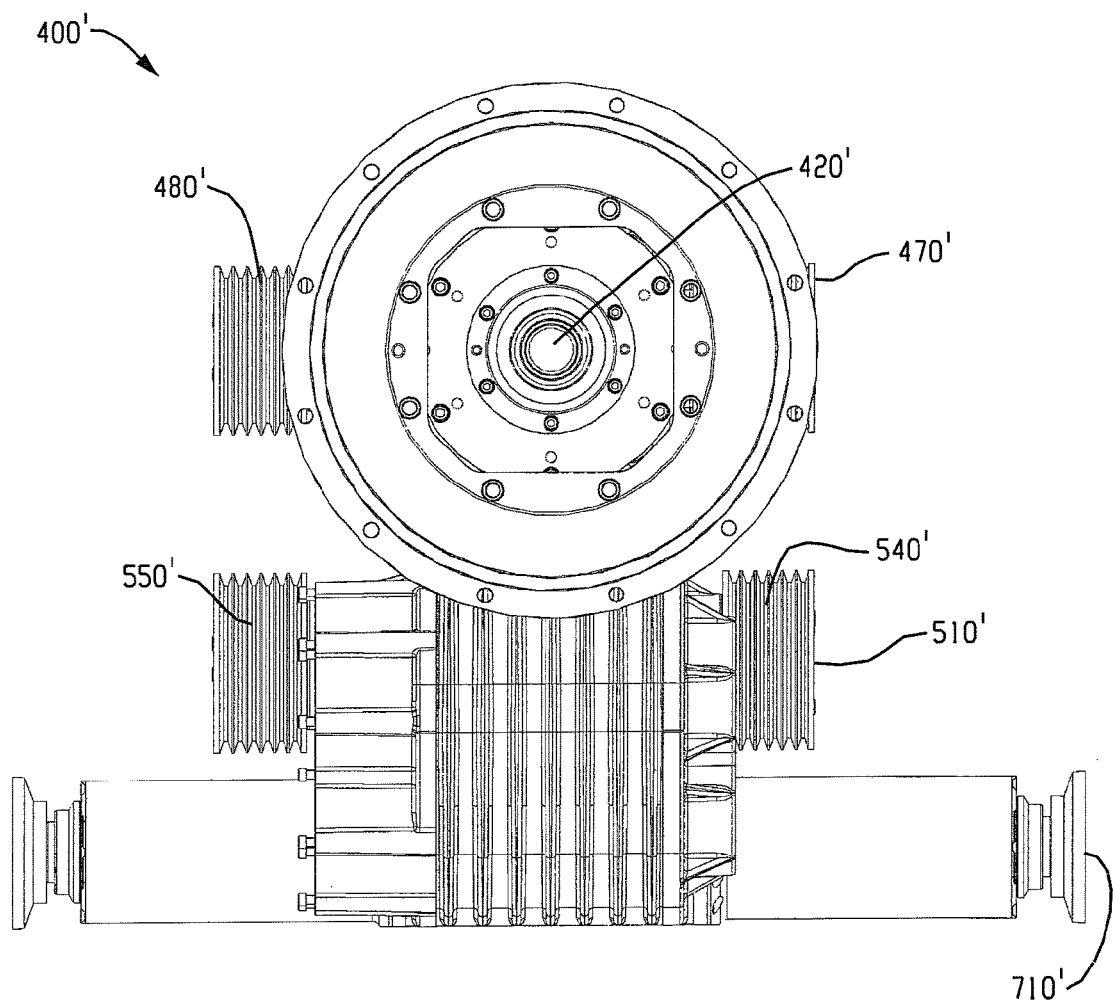
FIG. 26 is an end view, opposite the view of FIG. 24, of the drive system of FIG. 23.
Figure 27:
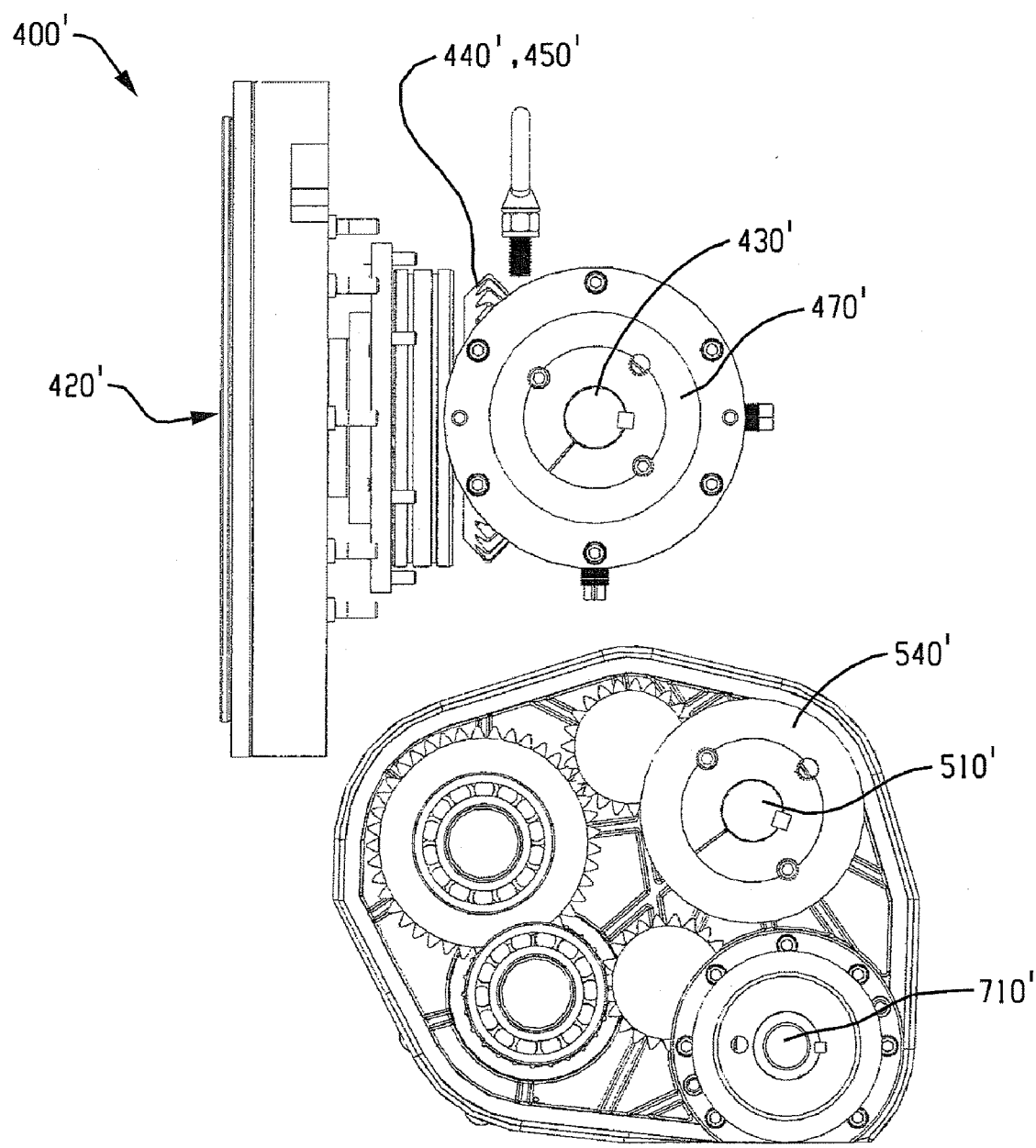
FIG. 27 is a side view, opposite the view of FIG. 25, of the drive system of FIG. 23.
Figure 28:
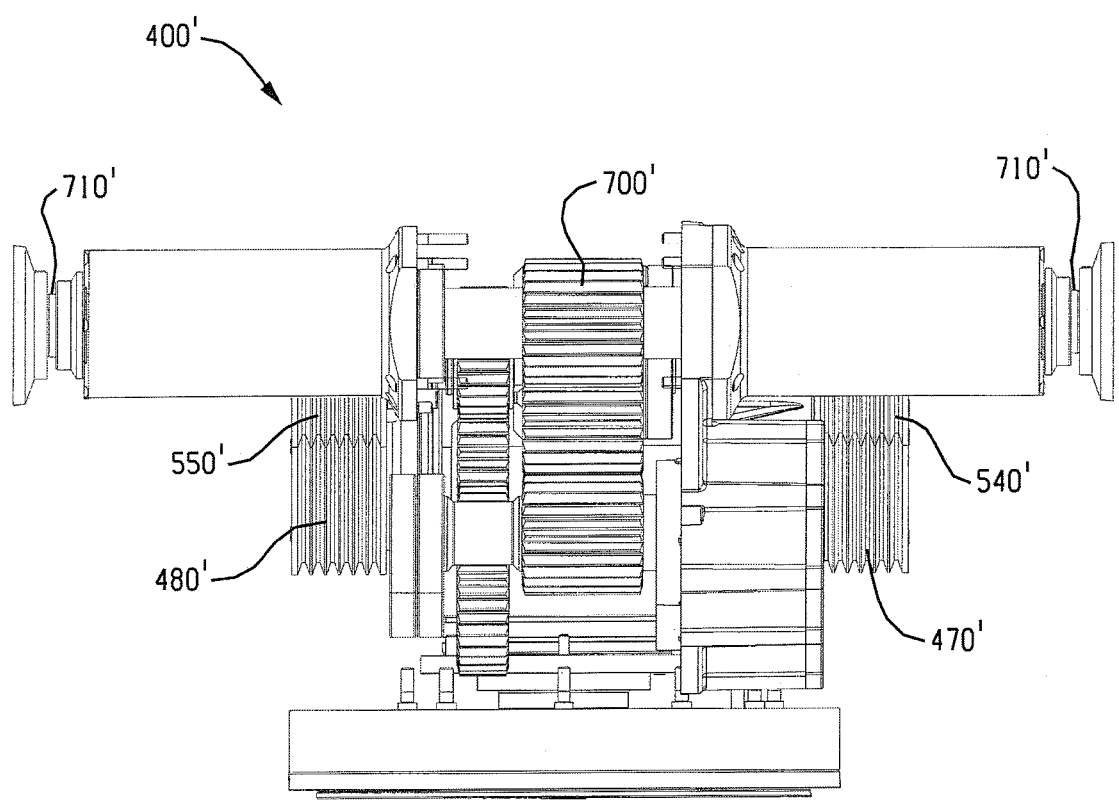
FIG. 28 is a bottom plan view of the drive system of FIG. 23.
Figure 29:
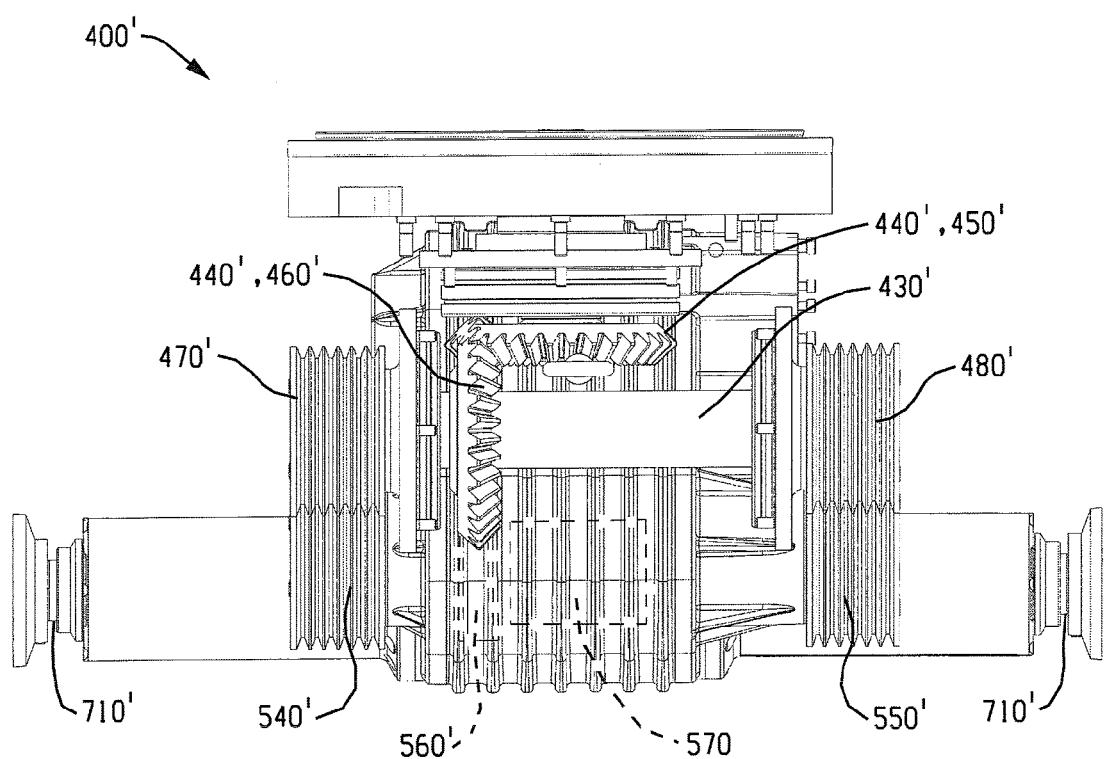
FIG. 29 is a top plan view of the drive system of FIG. 23.
Figure 30:
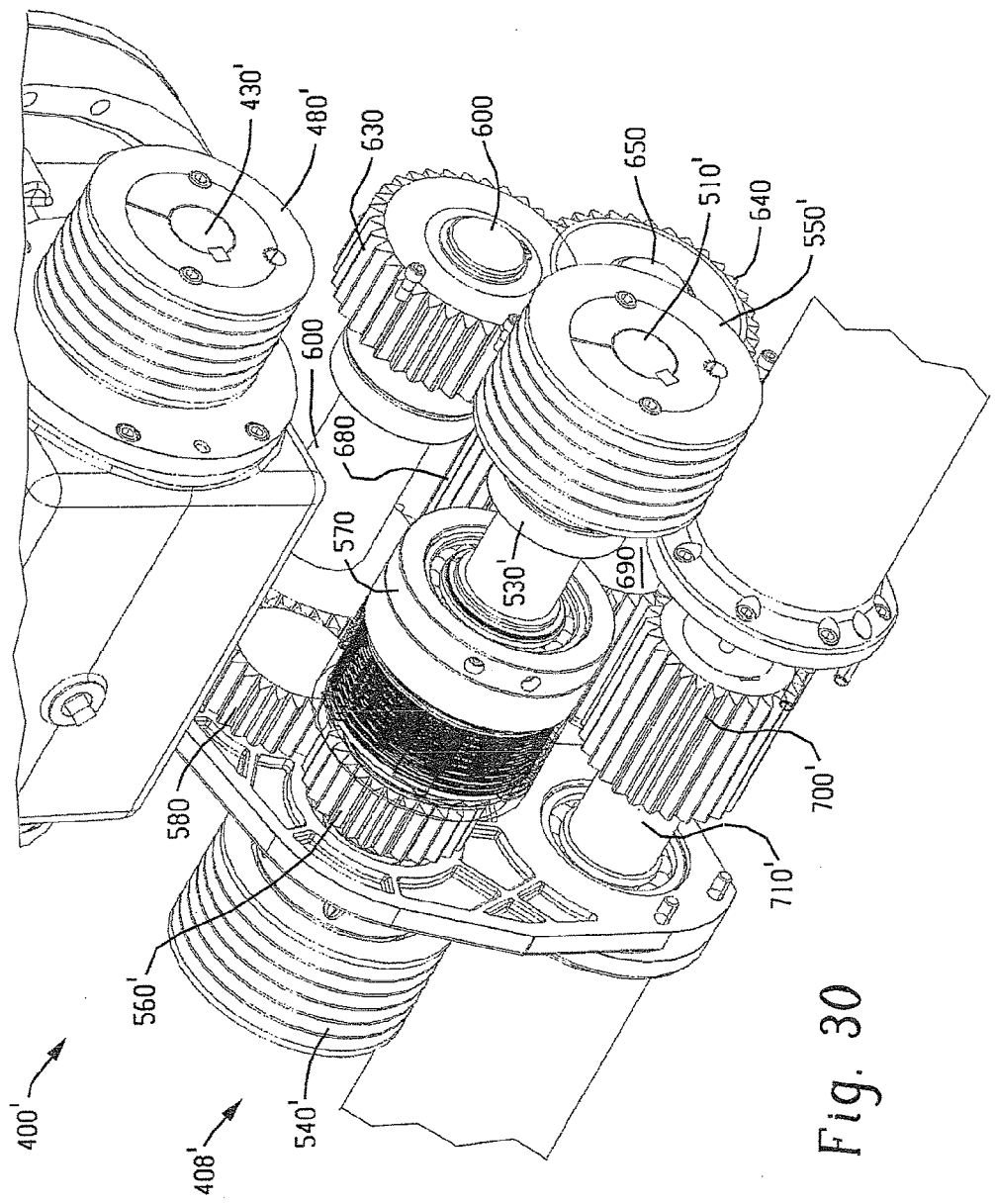
FIG. 30 is a detailed perspective view of various components the drive system of FIG. 23.

Referring to FIGS. 8-21, a preferred embodiment concrete saw 2 and drive system 400 is illustrated. The saw includes a longitudinally oriented engine 6, and a blade 8 rotated by the engine 6 via the drive system 400. FIG. 8 also illustrates a representative housing 750 generally surrounding or enclosing the drive system 400 and its components so as to protect such, and particularly the V-belts and sheaves, from debris associated with a cutting operation. Drive system 400 includes a blade shaft gear box 408 for mounting to the front end of the saw 2, and a drive shaft gear box 410 that is attached to and driven by the saw's engine 6. Generally, FIG. 8 illustrates locations and orientations of the blade shaft gear box 408 and the drive shaft gear box 410 relative to the concrete saw 2. FIGS. 9-14 illustrate in greater detail the drive shaft gear box 410 and its components. FIGS. 15-21 illustrate in greater detail the blade shaft gear box 408 and its components. And, FIGS. 22-30 illustrate in greater detail the combination and engagement between a drive shaft gear box 410' and a blade shaft gear box 408' in conjunction with an optional transmission unit. Drive system 400 is a single speed system, but like the previously described multi-speed drive system of FIGS. 1-7, in drive system 400 the sheaves are mounted on shafts and spaced from the harsh environment adjacent to where a blade is mounted on a blade shaft. Also, the drive system 400 allows for easy access to the sheaves, and ready replacement of the V-belts. The drive shaft gear box 410 comprises a right-angle gear drive arrangement that transfers the rotational power of an engine to the corresponding sheaves. Also, as described in greater detail herein, the drive shaft gear box 410 preferably includes a clutch assembly that allows the operator of the saw to disengage the engine's rotational energy from the drive system 400. The drive shaft 410 includes sheaves that are engaged with other sheaves by V-belts, and thus the gear system of the blade shaft gear box 408 drives a blade shaft. A cutting blade may be mounted to either end of the blade shaft. The arrangement and configuration of the gear boxes 408 and 410 is described in greater detail herein. It will be appreciated that instead of being a single-speed gear box, the blade shaft gear box 408 and/or the drive shaft gear box 410 could be multi-speed gear boxes, as described in greater detail herein in conjunction with a drive system 400' including gear boxes 408' and 410' of FIGS. 22-30.

More specifically, FIGS. 9-14 illustrate the preferred embodiment drive shaft gear box 410 in accordance with the present invention. The drive shaft gear box 410 comprises a motor shaft 420 and a drive shaft 430 extending transversely with respect to the motor shaft 420. A bevel gear assembly 440 in operable engagement with the shafts 420 and 430, transfers rotational power from the motor shaft 420 to the drive shaft 430. The bevel gear assembly 440 includes a pinion gear 450 mounted to the motor shaft 420, and a complimentary bevel gear 460 mounted to the drive shaft 430.

Drive shaft sheaves 470 and 480 are mounted on the drive shaft 430 on opposite sides of the bevel gear assembly 440. The drive shaft 430 is supported by drive shaft bearings 490 and 500.

FIGS. 15-21 illustrate the preferred embodiment blade shaft gear box 408 in accordance with the present invention. The blade shaft gear box 408 comprises a jack shaft 510, a blade shaft 710, and associated gears and sheaves as described in greater detail herein. The jack shaft 510 is supported by jack shaft bearings 520, 530. The jack shaft 510 is oriented substantially parallel to the blade shaft 710. A pair of jack shaft sheaves 540, 550 are mounted on the jack shaft 510. In accordance with the present invention, the blade shaft 710 is free of any sheave(s) or other belt-engaging components.

A jack shaft spur gear 560 is operatively associated with the jack shaft 510. A blade shaft spur gear 700 is operatively associated with the blade shaft 710. The jack shaft spur gear 560 and the blade shaft spur gear 700 are meshed with or engaged with one another such that rotary power from the jack shaft 510 is transferred to the blade shaft 710. The blade shaft 710 is supported by blade shaft bearings 720 and 730 which are preferably spaced apart from one another to obtain the widest stance realistically possible.

FIGS. 22-30 illustrate another preferred drive system 400' comprising a drive shaft gear box 410' and a multi-speed blade shaft gear box 408' in conjunction with an optional transmission unit. The drive shaft gear box 410' is similar to the previously described drive shaft gear box 410. And, the blade shaft gear box 408' is similar to the previously described blade shaft gear box 408. However, the blade shaft gear box 408' includes a transmission assembly within the enclosure of the gear box 408'. The gear box 410' includes a motor shaft 420' which extends from a longitudinally aligned motor of the concrete saw (not shown). The motor shaft 420' drives a drive shaft 430' via a bevel gear assembly 440'. The bevel gear assembly 440' includes a pinion gear 450' which is mounted to the motor shaft 420'. The bevel gear assembly 440' also includes a complimentary bevel gear 460' which is mounted to the drive shaft 430'. A pair of drive shaft sheaves 470' and 480' are mounted on distal ends of the drive shaft 430' and on opposite sides of the bevel gear assembly 440'. The drive shaft 430' is supported by bearings (not shown).

As noted, the drive system 400' further comprises a blade shaft gear box 408'. The blade shaft gear box 408' comprises a jack shaft 510', an upper transmission shaft 600, a lower transmission shaft 650, and a blade shaft 710' and associated gears and sheaves as described in greater detail herein. The jack shaft 510' is supported by jack shaft bearings 510', 530' and is oriented substantially parallel with the drive shaft 430'. A pair of jack shaft sheaves 540' and 550' are mounted to and engaged with the jack shaft 510' such that the grooves in the drive shaft sheaves 470', 480' mounted to the drive shaft 430' align with the grooves in the jack shaft sheaves 540', 550' mounted on the jack shaft 510'. It will be understood that one or more V-belts (not shown) are engaged with the sheave 470' mounted to the drive shaft 430' and the sheave 540' mounted to the jack shaft 510'. Similarly, one or more V-belts (not shown) are engaged with the sheave 480' mounted to the drive shaft 430' and the sheave 550' mounted to the jack shaft 510'. Preferably, all the V-belts are of the same length and are tensioned as described herein.

A jack shaft spur gear 560' is operatively associated with the jack shaft 510'. Preferably, the jack shaft spur gear 560' is operatively associated with the jack shaft 510' through a multi-disk hydraulic clutch assembly 570. The clutch assembly 570 allows an operator to selectively apply and remove rotational torque from the jack shaft 510' to the jack shaft spur gear 560'. The clutch assembly 570 is preferably similar or identical to the previously described clutch 170.

The drive system 400' and particularly, the blade shaft gear box 408' includes an upper intermediate spur gear 580 which meshes with and engages both the jack shaft spur gear 560' and an upper transmission spur gear 590. The upper transmission spur gear 590 is mounted on the upper transmission shaft 600, which is supported by a pair of upper transmission shaft bearings (not shown). An upper removable spur gear 630 is mounted on the upper transmission shaft 600. The end of the upper transmission shaft 600 is preferably keyed and/or indexed to match a corresponding configuration in the upper removable spur gear 630.

The upper removable spur gear 630 meshes with and engages a lower removable spur gear 640 which is mounted on the lower transmission shaft 650. The end of the lower transmission shaft 650 is also preferably keyed and/or indexed to match a corresponding configuration in the lower removable spur gear 640. The lower transmission shaft 650 is supported by a pair of lower transmission shaft bearings (not shown). Preferably, the bore in the upper removable spur gear 630 is the same size and configuration as the bore in the lower removable spur gear 640. This allows the upper removable spur gear 630 to be placed onto the lower transmission shaft 650, and the lower removable spur gear 640 to be mounted on the upper transmission shaft 600 to effect a change in the gear ratio. It will be understood that the invention includes the use of different pairs of upper and lower removable spur gears.

A lower transmission gear 680 is also mounted to the lower transmission shaft 650. A lower intermediate spur gear 690 meshes with both the lower transmission gear 680 and a blade shaft spur gear 700' mounted to the blade shaft 710'. The blade shaft 710' is supported by a pair of blade shaft bearings (not shown).

A concrete saw blade (not shown) can be mounted or otherwise engaged with an end of the blade shaft 710'. Blade shaft extensions (not shown) can also be mounted or otherwise affixed to the blade shaft 710' to extend the blade shaft 710' as desired.

Preferably, the entire drive system 400' except for the end portions of the blade shaft 710' on which the concrete saw blade (not shown) is mounted, are substantially enclosed within one or more housing(s) such as the housing 750 in FIG. 8. The housings protect the V-belts and sheaves from the harsh working environment near the concrete saw blade during cutting operations.

The enclosures of the gear boxes 408' and 410' are adapted for retaining oil or other lubricant. This provides for the various shaft bearings and gear assemblies to be continually exposed to an oil bath which provides for less maintenance and greater durability.

As previously noted, the V-belts are preferably of the same fixed length. Adjustments in the rotational speed of the blade shaft 710' are thus made by removing and installing an upper removable spur gear 630 and a complimentary lower removable spur gear 640 to obtain a desired gear ratio suitable for the size of concrete saw blade and cutting operation. It will be appreciated that a variety of gear sizes can be utilized, provided the spacing between the bores of the complimentary gears is maintained. This practice was previously described herein in conjunction with the assemblies of FIGS. 1-7.

Figure 31:
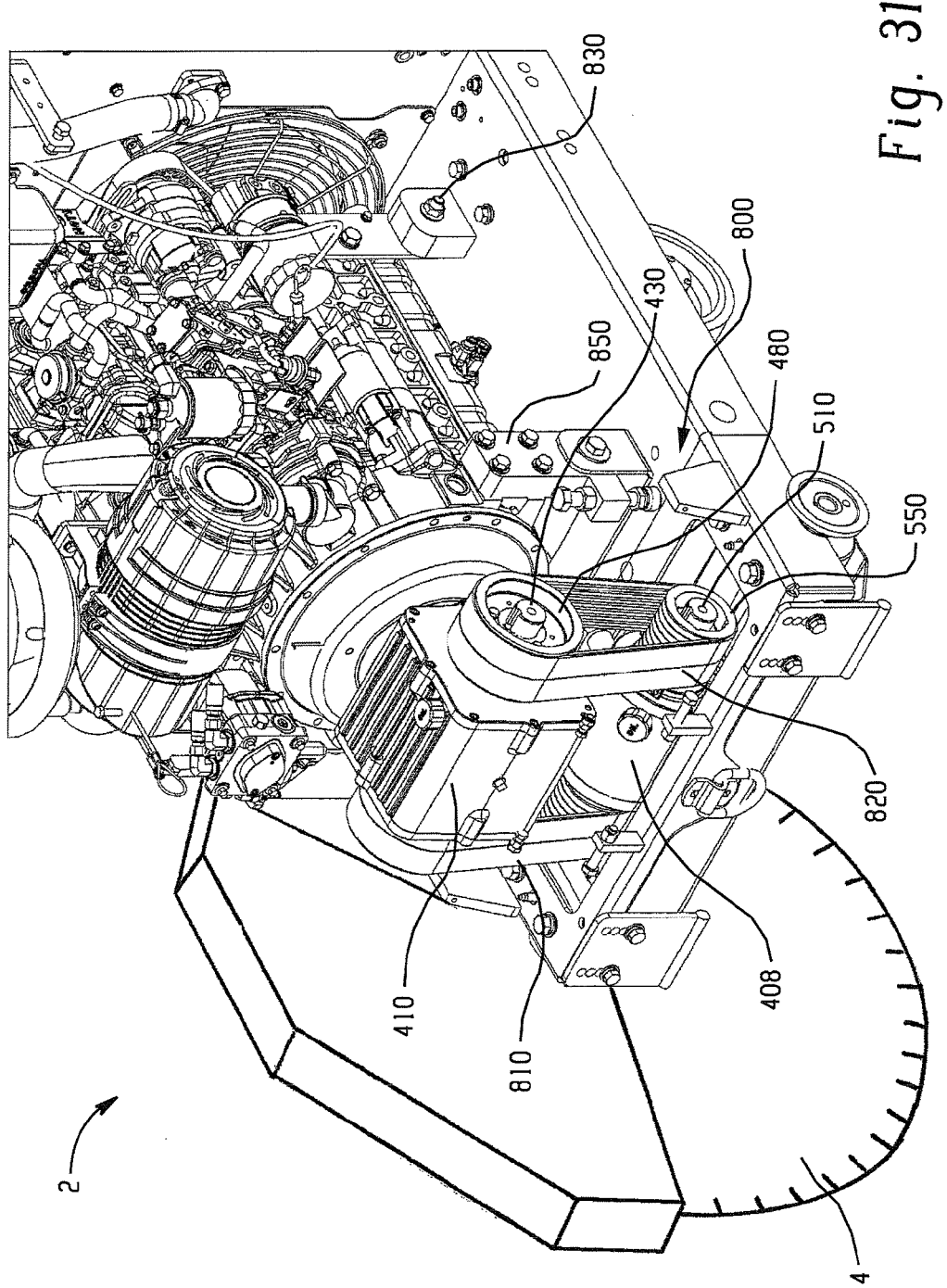
FIG. 31 is a perspective view of a concrete saw including a preferred embodiment V-belt tension adjustment assembly in accordance with the invention.
Figure 32:
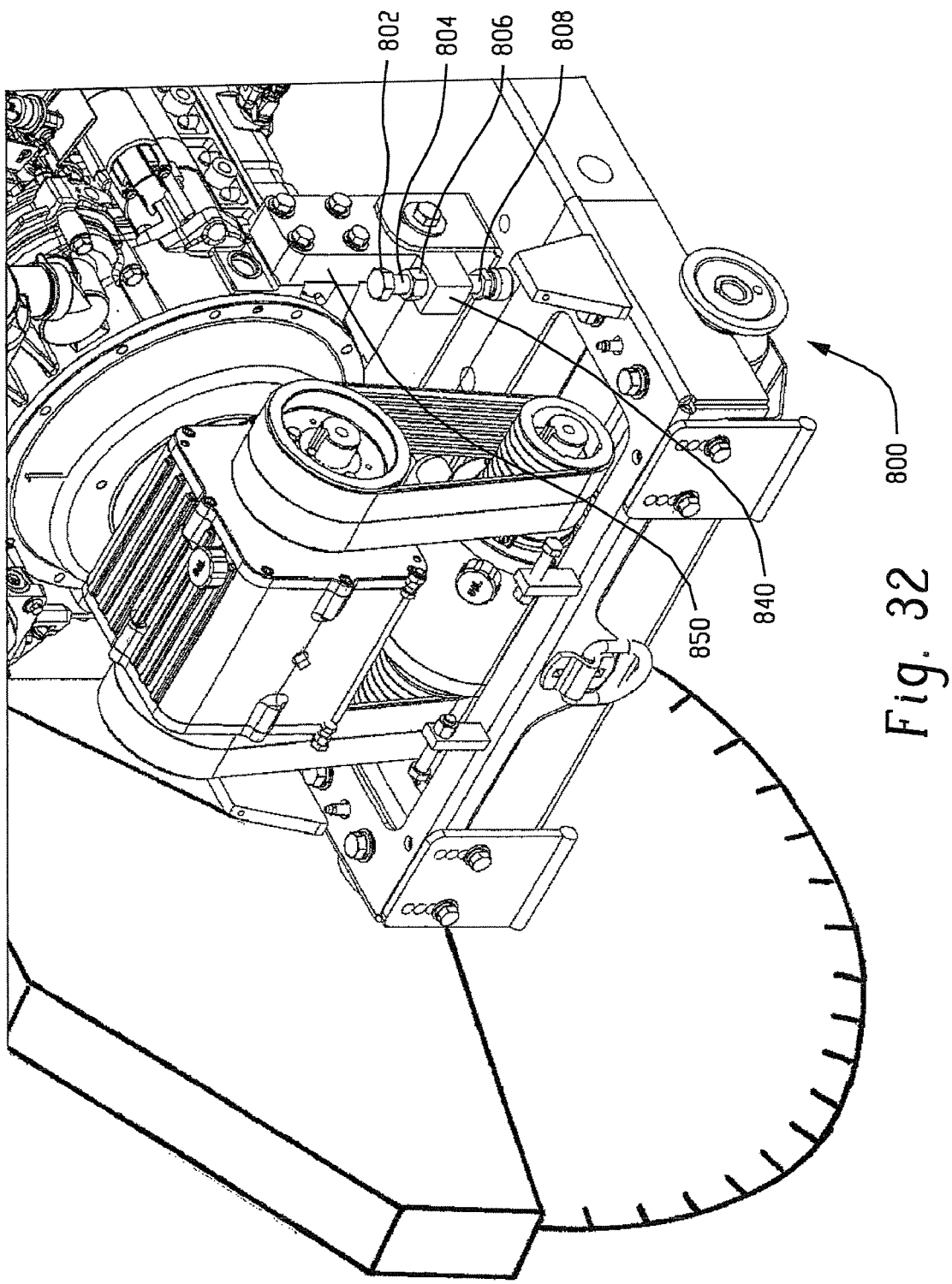
FIG. 32 is a detailed view of the saw and V-belt tension adjustment assembly illustrated in FIG. 31.
Figure 33:
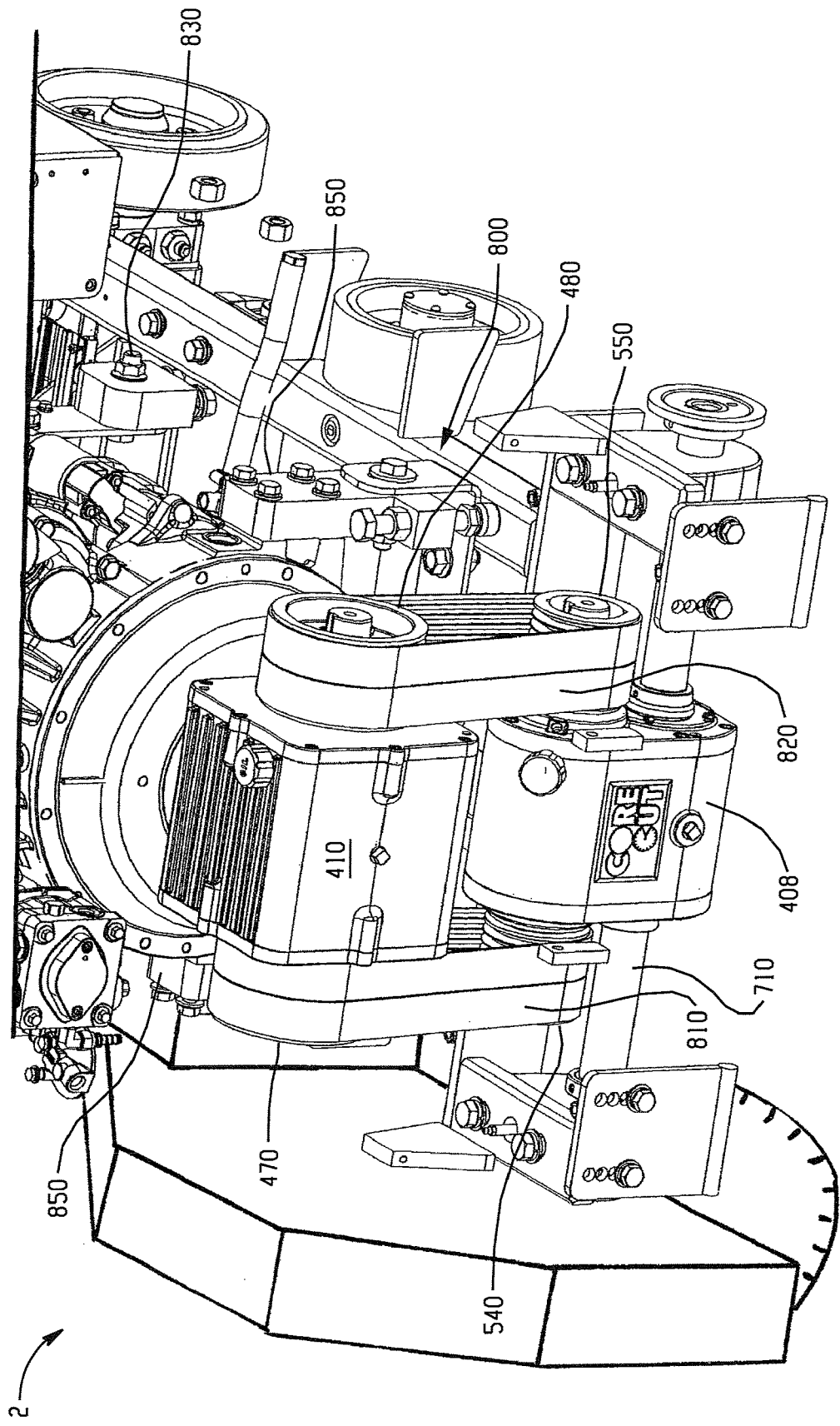
FIG. 33 is a front perspective view of the saw and V-belt tension adjustment assembly of FIG. 31.

FIGS. 31-33 illustrate a preferred V-belt tensioner assembly 800 in accordance with the present invention. The V-belt tensioner assembly 800 is located adjacent a pair of front engine mounts 850 closest to the drive shaft gear box 410 and the blade shaft gear box 408. The tensioner assembly 800 provides for positional adjustment, and preferably vertical adjustment, between the drive shaft 430 of the drive shaft gear box 410 and the jack shaft 510 of the blade shaft gear box 408. This enables positional adjustment, i.e. the spacing, between the drive shaft sheave 480 and the jack shaft sheave 550, and between the drive shaft sheave 470 and the jack shaft sheave 540. Adjustment of the spacing between sheaves 480 and 550 provides for tension adjustment of the V-belt 820 extending between the sheaves 480 and 550. Similarly, adjustment of the spacing between sheaves 470 and 540 provides for tension adjustment of the V-belt 810 extending between the sheaves 470 and 540.

The V-belt tensioner assembly 800 may be in a variety of different forms and configurations. However, a preferred configuration is as follows. Laterally extending from an engine mount 850, and preferably a front engine mount, is a lift member 840. The lift member defines a vertically oriented bore or passage (not shown), through which extends a jack bolt shaft 804. The jack bolt shaft 804 is threadedly engaged with the interior bore or passage by one or more threads formed along the engaging surfaces. Provided along an uppermost region of the jack bolt shaft 804 is a jack bolt head 802 configured for engagement by a socket or wrench for example. The distal end 808 of the shaft 804 extends beyond a lower face of the lift member 840, and preferably rests upon and is supported by a base member 860. It will be appreciated that a pair of the V-belt tensioner assemblies 800 are provided, and preferably one along each frontward corner of the engine and proximate to a corresponding V-belt, e.g. belts 810, 820. A corresponding rear set of pivotable engine mounts 830 are provided along an opposite end of the engine, i.e. the rear end.

Figure 34:
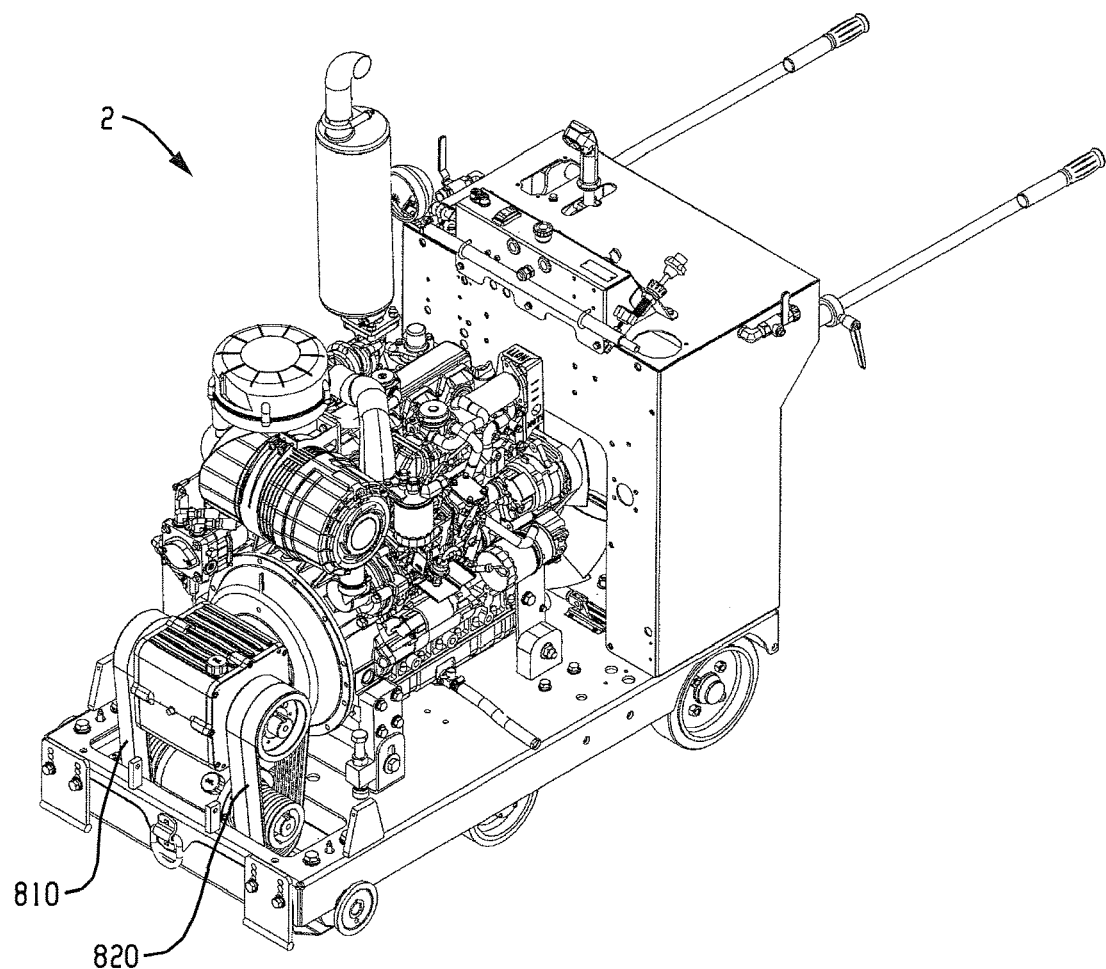
FIG. 34 is a perspective view of the saw of FIG. 31 in a state in which the V-belts are untensioned.
Figure 35:
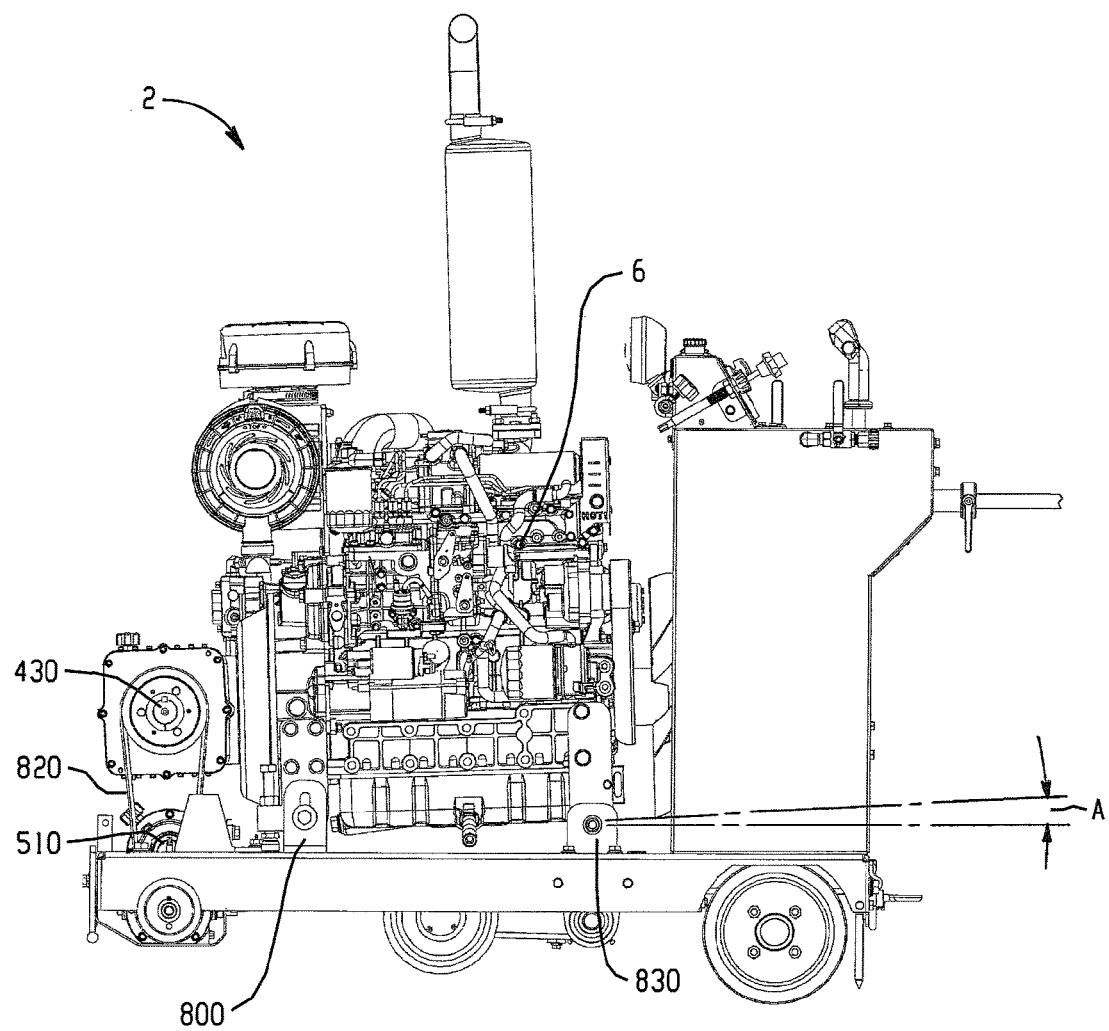
FIG. 35 is a side elevational view of the saw of FIG. 31 in a state in which the V-belts are untensioned.

FIGS. 34 and 35 illustrate the concrete saw 2 in an untensioned state of the V-belts 810 and 820. Referring to FIG. 35, it can be seen that the engine 6 is oriented at a slight inclination, and lower toward the front of the saw 2 than at a rear region. Specifically, the engine 6 is pivoted about the rear pivots 830 by an angle A which may range from about 0.5 to about 5 degrees. The present invention includes engine inclinations greater than or less than these representative angles.

Figure 36:
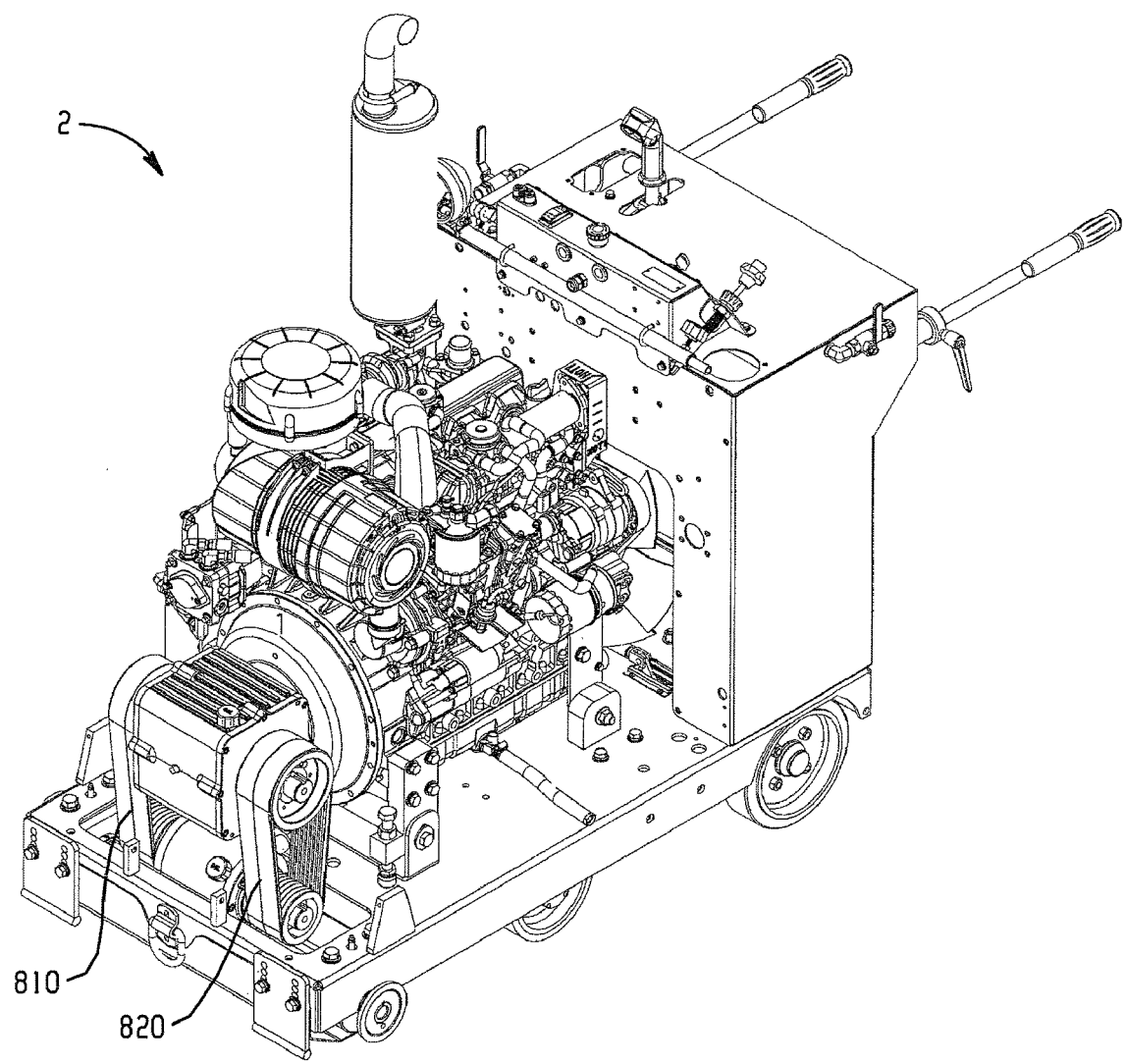
FIG. 36 is a perspective view of the saw of FIG. 31 in a state in which the V-belts are tensioned.
Figure 37:
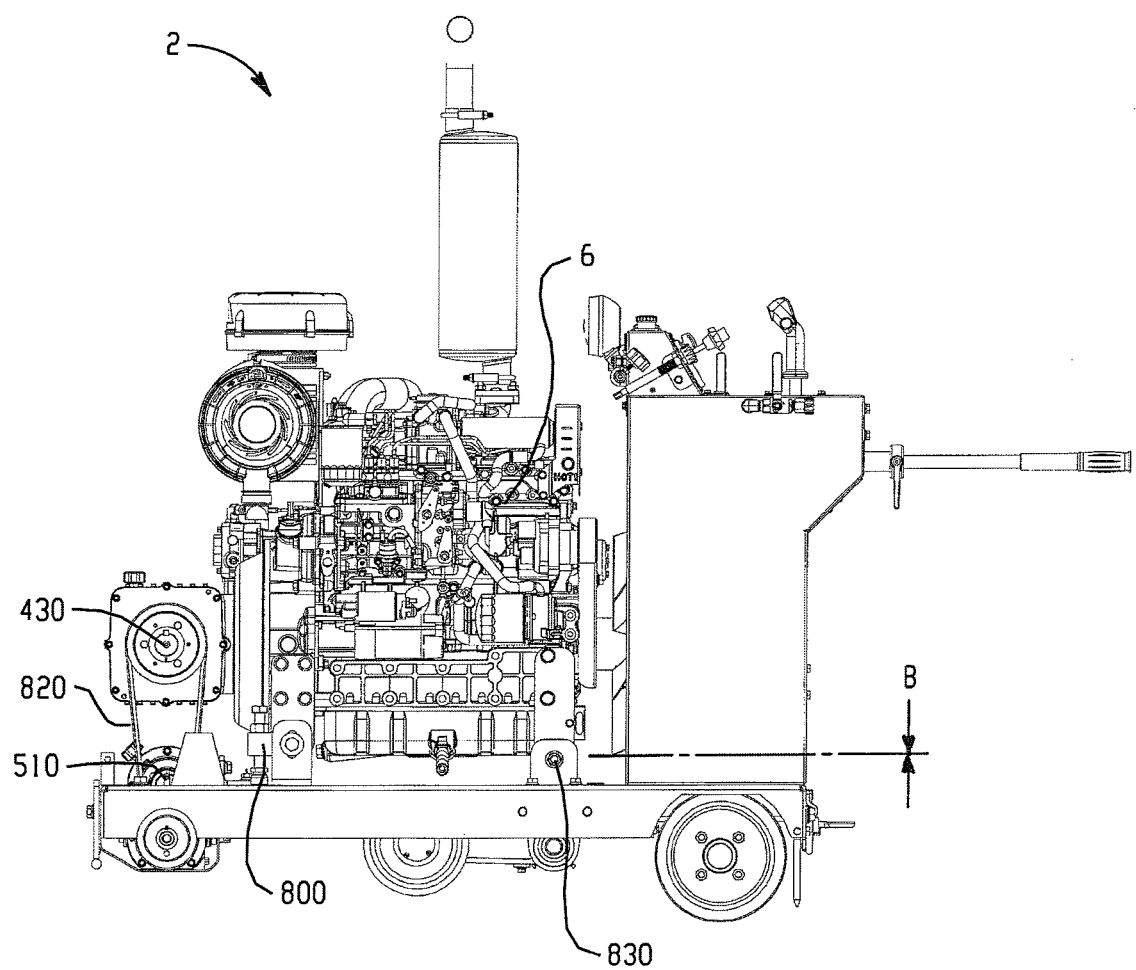
FIG. 37 is a side elevational view of the saw of FIG. 36 in which the V-belts are tensioned.

FIGS. 36 and 37 illustrate the concrete saw 2 in a tensioned state of the V-belts 810 and 820. This orientation results from increasing the spacing between the shafts 430 and 510, and thus of the spacing between the associated sheaves. This results in angle B being 0° or substantially so.

It will be understood that although the state depicted in FIG. 37 in which the V-belts 810 and 820 are tensioned, appears to also correspond to the engine 6 being horizontally oriented, it will be understood that the present invention is not limited to such. That is, the invention includes configurations in which the engine orientation is horizontal or substantially so, and yet the V-belts 810 and 820 are in an untensioned state.

The belt tensioner assembly can be used to facilitate replacement of a belt, such as the V-belts 810 and 820. By adjusting the jack bolt to thereby lower the front region of the engine, the spacing between the associated sheaves can be significantly reduced, thereby allowing easy removal of a belt and placement of a new belt about a corresponding pair of sheaves.

Figure 38:
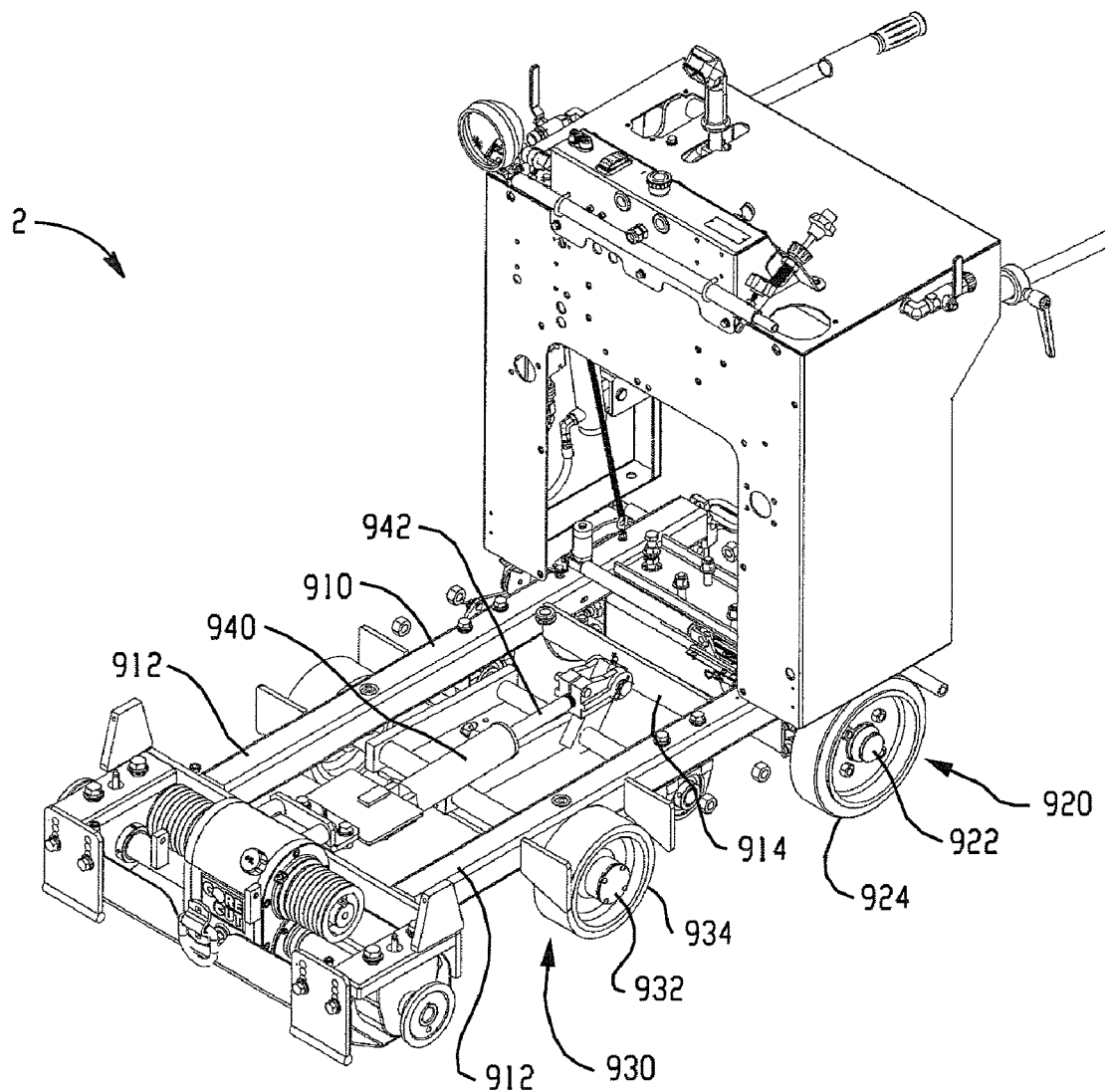
FIG. 38 is a perspective view of a saw frame assembly, raisable front wheel assembly, and a preferred embodiment wheel height indicating and control system, in accordance with the invention.
Figure 39:
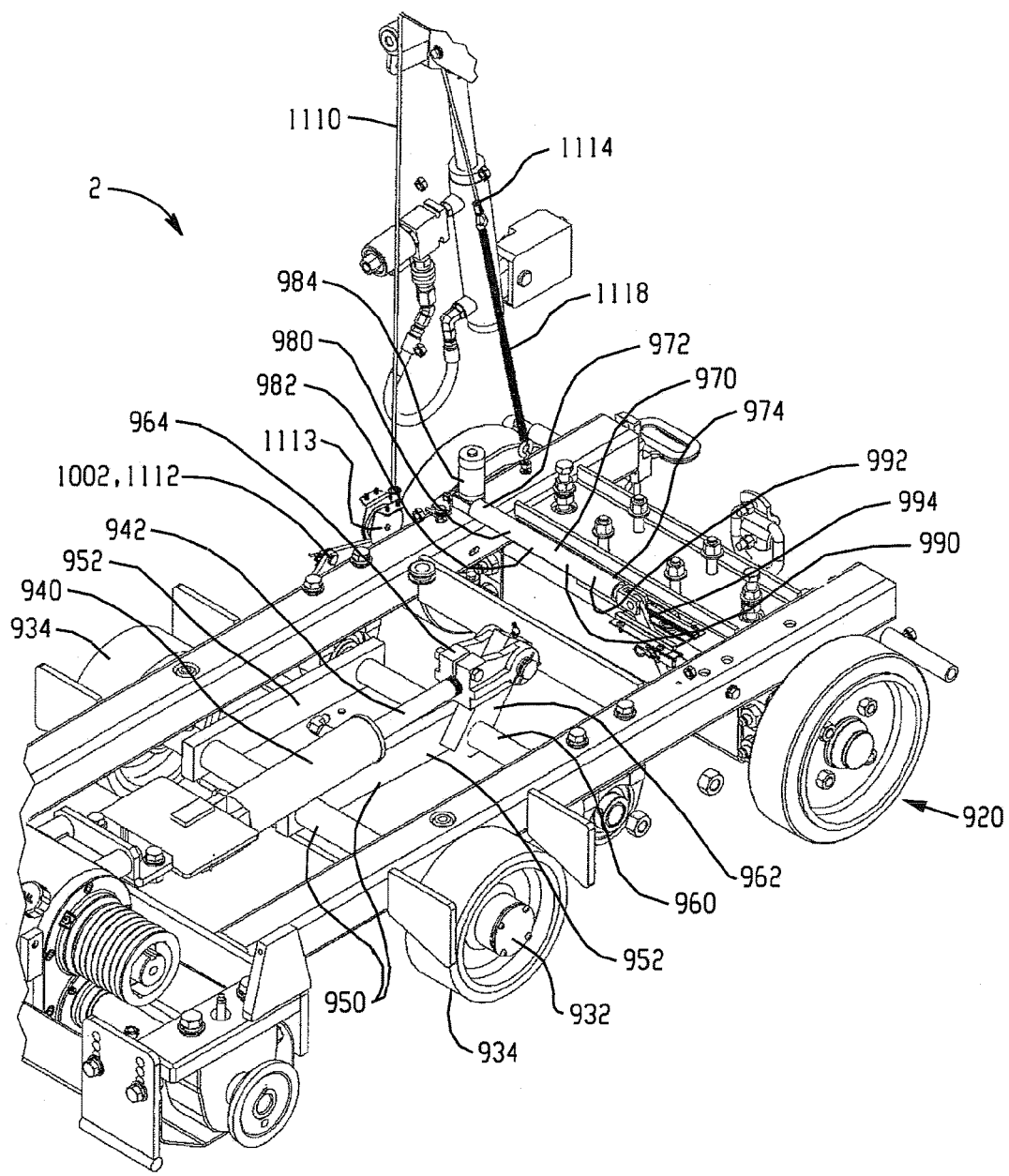
FIG. 39 is a detailed perspective view of the saw frame, front wheel assembly, and indicating and control system illustrated in FIG. 38.
Figure 40:
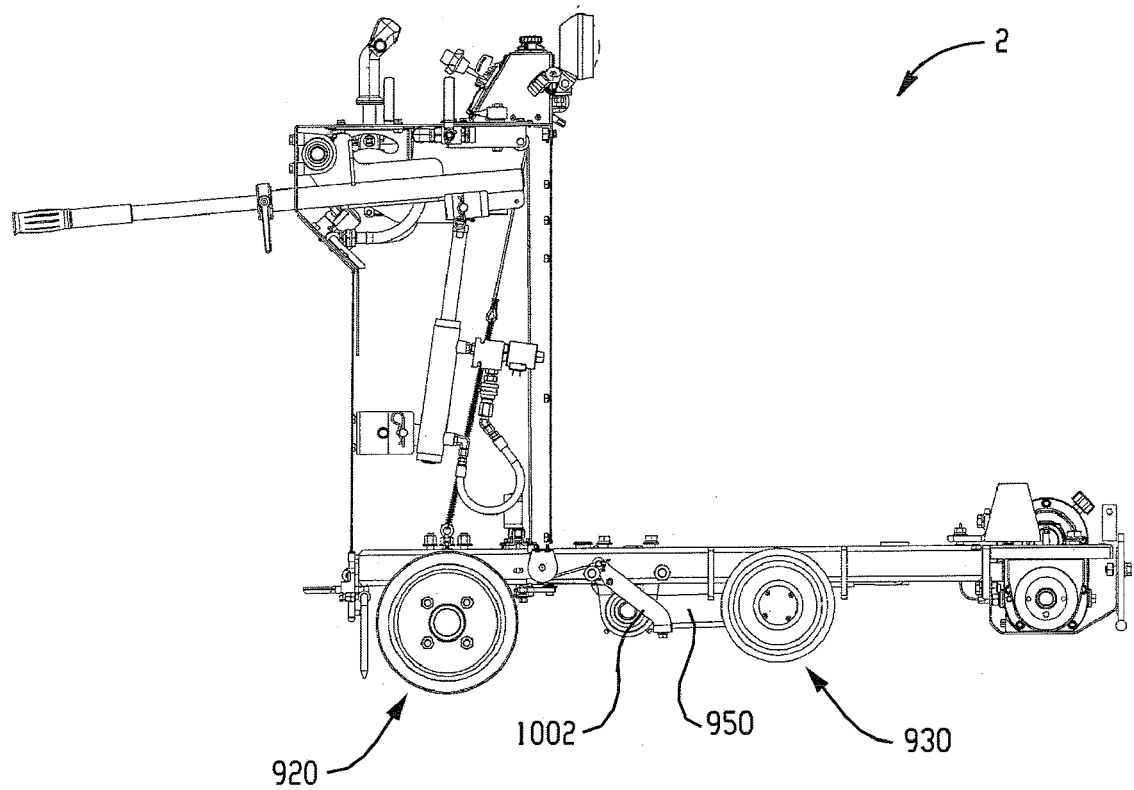
FIG. 40 is a side elevational view of the saw frame and associated components illustrated in FIG. 38, in a lowered position.

FIGS. 38-45 illustrate a wheel height and/or cutting blade depth indicator and control system in accordance with the present invention. Generally, this system provides indication to an operator as to the wheel position, and more particularly to the height position of a front wheel assembly in a concrete saw. As will be understood, wheel height governs the cutting depth of the saw blade. FIGS. 38 and 39 illustrate a concrete saw 2 having a lower frame assembly 910 generally comprising one or more longitudinal frame members 912 and one or more transverse frame members 914 extending therebetween.

Mounted to the frame 910 is a rear wheel assembly 920 generally including a rear axle 922 extending between a pair of rear wheels 924. The saw 2 and the frame 910 also include a selectively positionable front wheel assembly 930. The front wheel assembly 930 includes a front axle 932 extending between a pair of front wheels 934. The front wheel assembly 930 is mounted on a pivotable front carriage 950. The front carriage is secured to the frame 910 and pivotable about a carriage swing member 960 preferably oriented parallel with the transverse frame member(s) 934. The front axle 932 of the front wheel assembly 930 is engaged with the front carriage 950 by one or more axle support members 952.

The height of the front wheel assembly 930 relative to the frame 910 is selectively varied by pivoting the front carriage 950, and thus the front wheel assembly 930, about the carriage swing member 960. The carriage 950 is preferably pivoted by a hydraulic cylinder 940 and corresponding ram 942. The hydraulic cylinder and ram 942 are preferably oriented along the longitudinal axis of the frame 910 and transverse to the carriage swing member 960. One end of the hydraulic cylinder 940 is preferably mounted or otherwise supported by the frame 910, and a distal end of the ram 942 is coupled to an engagement joint 964. The engagement joint 964 is in operable association with a carriage push arm 962 that extends outward from the carriage swing member 960. Thus, upon extension of the ram 942 from the hydraulic cylinder 940, the carriage swing member 960 is rotated about its longitudinal axis by action of the ram displacing the carriage push arm 962. Rotation of the carriage swing member 960 results in displacement of the front wheel assembly 930 relative to the frame 910.

The present invention provides a wheel height and/or cutting depth indicator and control system that not only provides indication to an operator when a preselected front wheel height (which in turn dictates cutting blade depth) is reached, but also provides an interlock such as an electrical circuit switch or hydraulic valve which can be used to preclude or otherwise stop further change in front wheel height of the saw. Referring to FIGS. 39-42, the indicating assembly comprises a sensing enclosure 970, provided as shown, generally oriented transverse to the longitudinal axis of the frame 910. The sensing enclosure 970 is preferably in the form of a hollow tube or other similar shape, having a supported end 972 that is preferably affixed to a frame member, and an opposite distal end 974. The indicator assembly further comprises a linearly positionable actuator rod 980 slidably disposed within the interior of the enclosure 970. The rod 980 is selectively linearly positionable within the interior, and preferably along the longitudinal axis of the enclosure 970, which as previously noted is preferably in the form of a hollow tube. The rod 980 is in operable engagement with a positioning assembly (not shown) that is driven by an electric motor 984. Upon operation of the electric motor 984, the linear position of the rod 980 can be varied along the length or at least a portion thereof, of the sensing enclosure 970. Affixed to an end of the rod 980, i.e. a distal end of the rod 980 relative to the supported end 972 of the enclosure 970, is one or more magnets 982. Thus, upon selectively positioning the rod 980 along the length of the enclosure 970 and within the interior of the enclosure, the magnet 982 is also selectively positioned.

The indicator assembly further comprises a slidable member 992 also sized and configured for linear displacement along the length and within the hollow interior of the enclosure 970. The slidable member 992 is engaged at one end with an upper lever 994 that moves in response to a change in the position of the front carriage 950. The other end of the slidable member 992 includes a proximity sensor, and preferably a magnetic proximity sensor configured or otherwise adapted to sense the proximity of the magnet 982 also within the enclosure 970.

A wide variety of magnetic field proximity sensors can be used in the present invention. A preferred type of a magnetic field proximity sensor is commercially available from ZF Electronics GmbH, under the designation of Cherry MP2007. This sensor is a reed-based magnetic position sensor. The invention includes a wide array of other sensors and is not limited to magnetic field proximity sensors.

Figure 41:
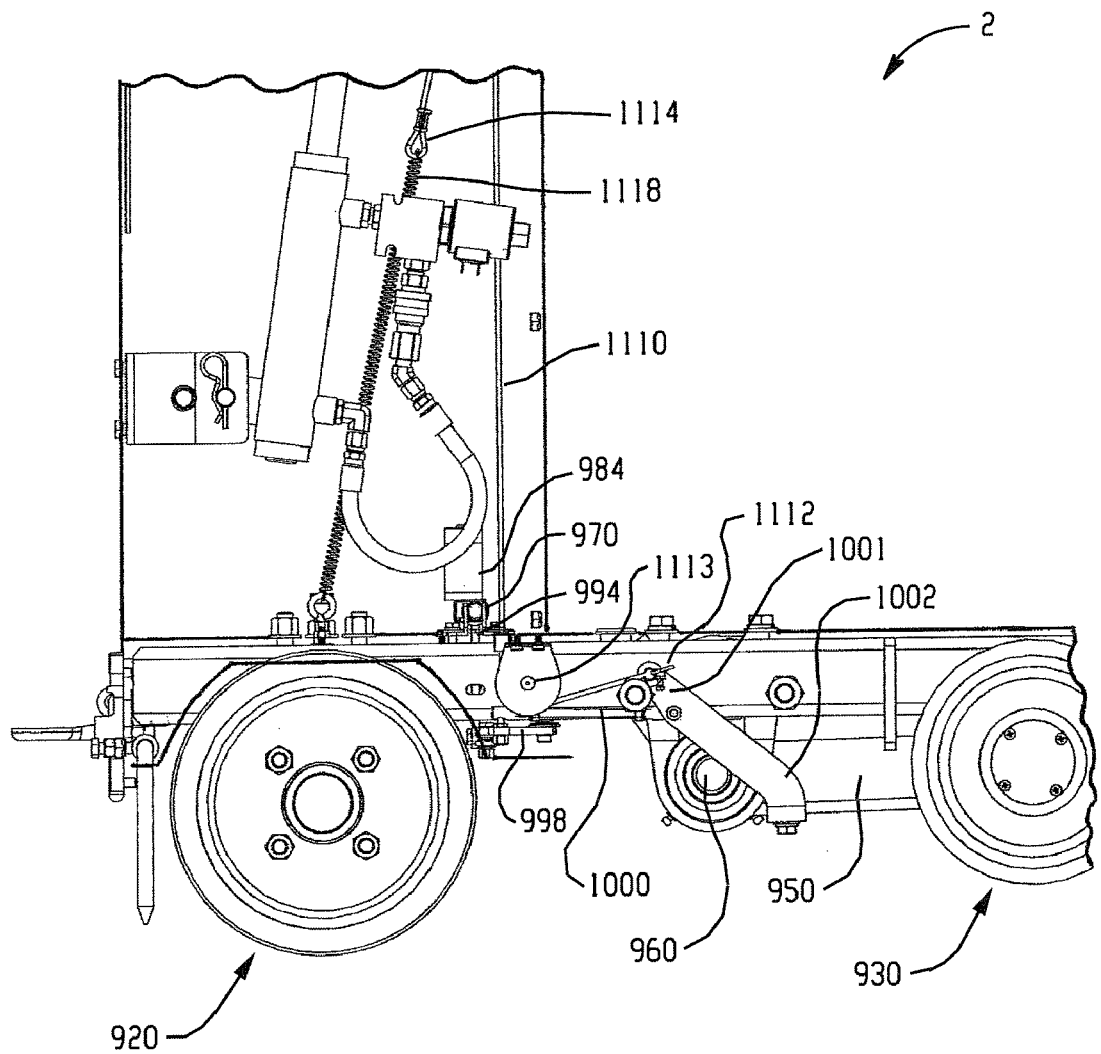
FIG. 41 is a detailed side view of a portion of the front wheel assembly, illustrating various components of the preferred embodiment wheel height indicating and control system.
Figure 42:
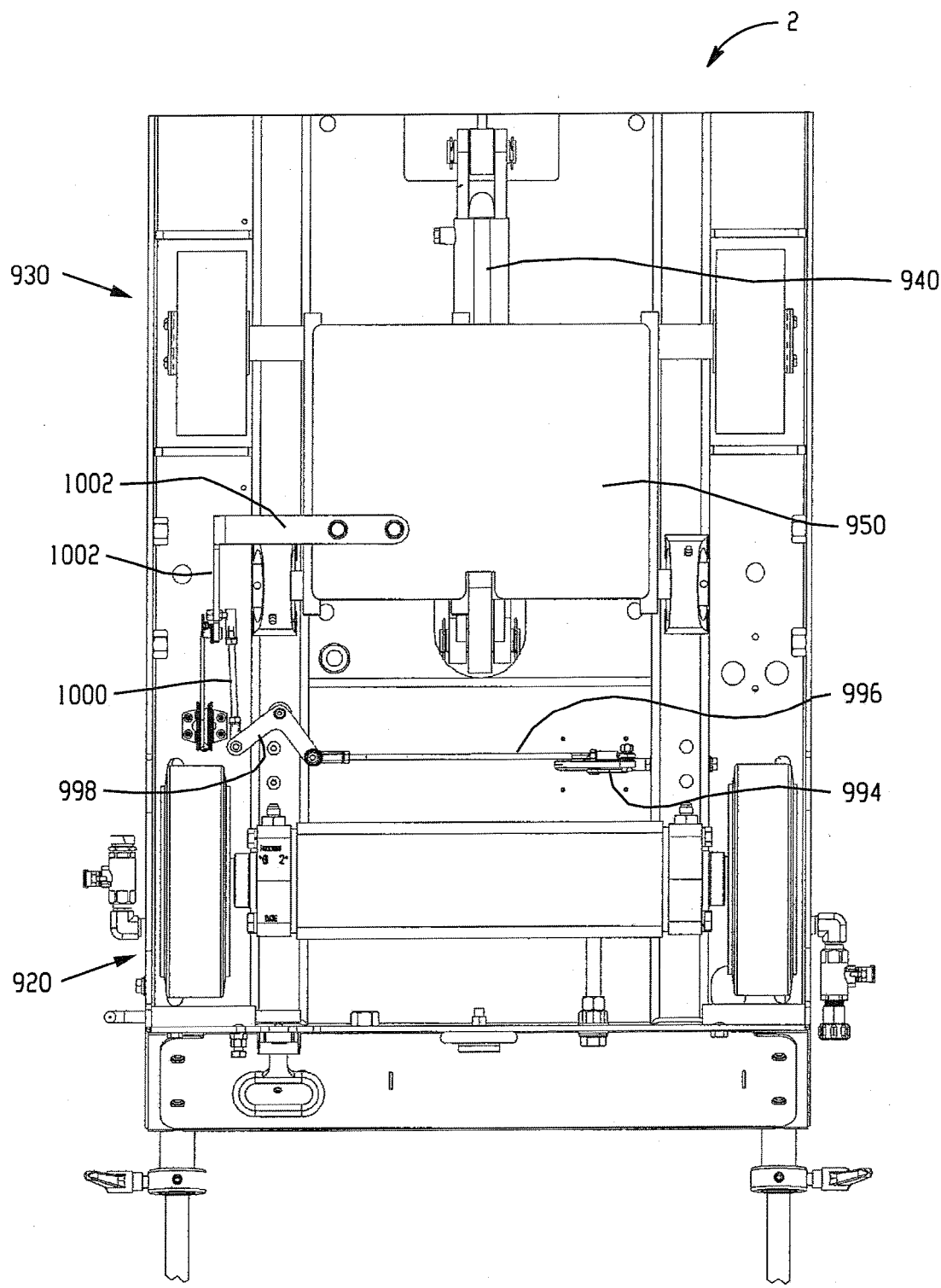
FIG. 42 is a detailed view of the underside of the saw frame, illustrating various components of the preferred embodiment wheel height indicating assembly and control system.

The upper lever 994 is preferably pivotally attached to the frame 910. As previously explained, one end of the lever 994 is engaged with the slide member 992, and another end, i.e. an end opposite the end attached to the slide member 992, is engaged with a lower transverse linkage member 996, as best shown in FIG. 42. The other end of the lower transverse linkage member 996 is engaged to a pivotable cross arm 998 that serves to translate longitudinal displacement of a lower longitudinal linkage member 1000 to transverse displacement of the linkage member 996. The linkage member 1000, as best shown in FIG. 41, engages an upper portion of a carriage bracket 1002. The carriage bracket 1002 is affixed or otherwise secured to the previously described front carriage 950.

Figure 43:
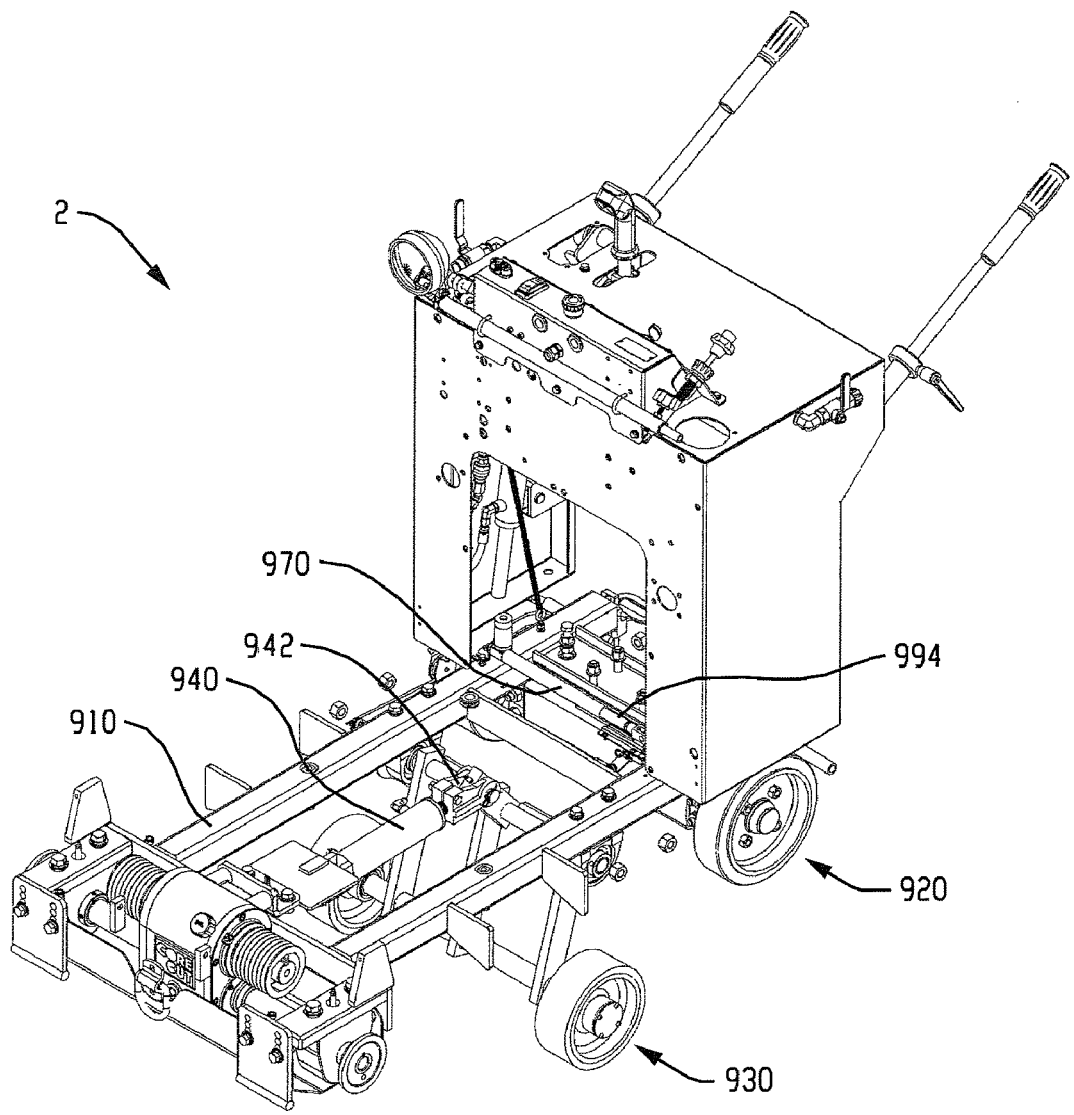
FIG. 43 is a perspective view of the saw frame and associated components of FIG. 38 in a raised position.
Figure 44:
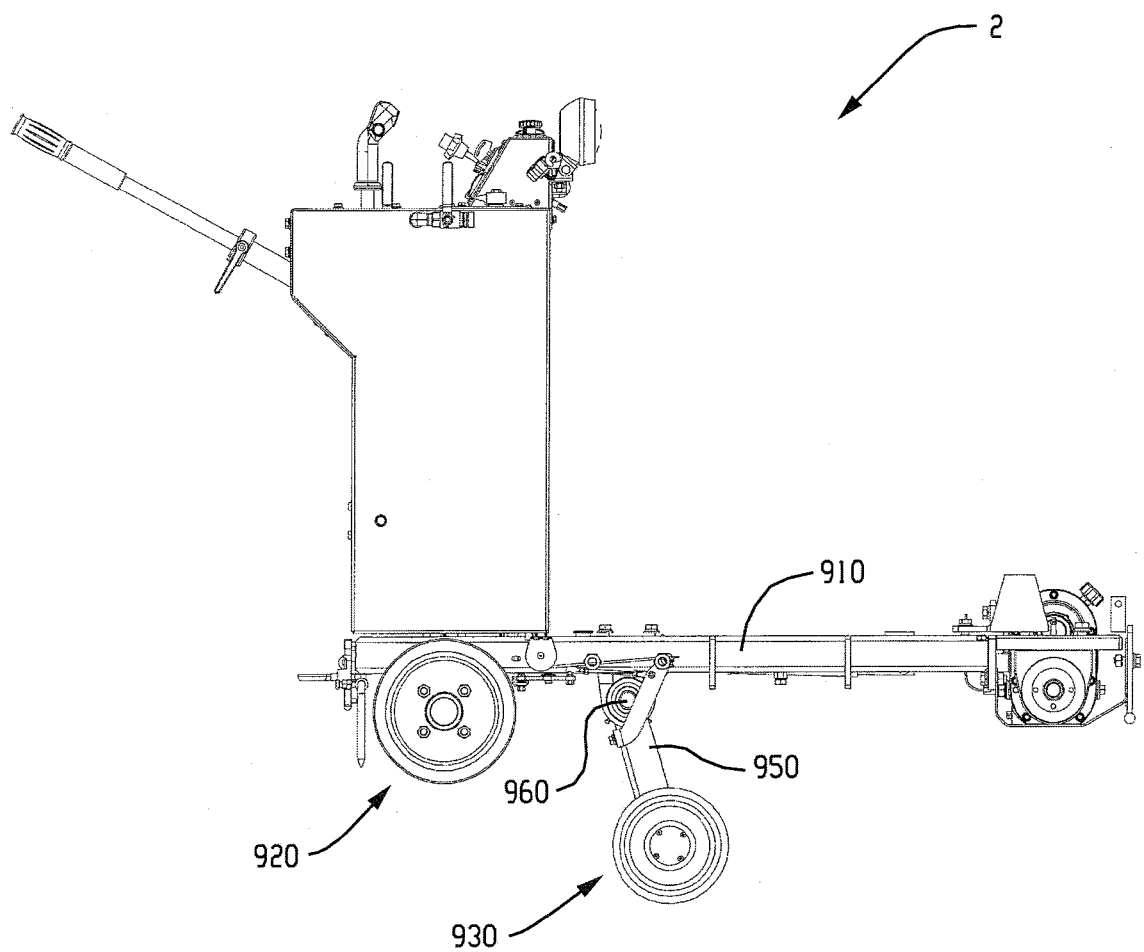
FIG. 44 is a side elevational view of the saw frame of FIG. 43.

FIGS. 43 and 44 illustrate the previously described saw 2 in a position in which the front wheel assembly 930 is in a raised position relative to the frame 910. As can be seen, the ram 942 is retracted into the hydraulic cylinder 940, and the carriage 950 is pivoted downward from the carriage swing member 960. In this position, it will be seen in FIG. 43 that the upper lever 994 is in a relatively spaced apart position from the sensing enclosure 970. In contrast, when the front wheels are in a lowered position as shown in FIG. 39, the upper lever 994 is positioned relatively close to the enclosure 970.

The operation of the front wheel height and/or blade depth indicating and control system is generally as follows. To set a specific depth for the cutting blade, an operator lowers the saw 2 by extending the hydraulic ram 942 from the cylinder 940, thereby bringing the front wheel assembly 930 into closer position to the frame 910. Upon reaching a desired front wheel height, and thus cutting blade depth, the operator then activates the electric motor 984 to thereby move the actuator rod 980 and magnet 982 within the sensing enclosure 970 toward the proximity sensor 990. Once the magnet 982 reaches the sensing range of the proximity switch, typically about 3/16 inches, the sensor 990 transmits a signal that discontinues further movement of the actuator rod 980 caused by electric motor 984, and also stops further operation of the hydraulic cylinder 940 and ram 942. Power is still available to raise the saw 2 which requires positioning of the front wheel assembly 930 away from the frame 910. This movement results in movement of the proximity sensor 990 away from the magnet 982. However, upon re-lowering of the saw, the hydraulic cylinder 940 and ram 942 will again stop at the previous position set by the operator, as a result of the proximity sensor 990 nearing the magnet 982, to thereby achieve the same depth. The operator can override or change a previously selected cutting depth by operating the electric motor 984 to retract the actuator rod 980 and the magnet 982 attached thereto. As the magnet 982 is retracted within the enclosure 970, i.e. positioned farther away from the proximity sensor 990, the saw will lower further.

Generally, the various positional relationships can be summarized as follows. In positioning the saw down, the front wheels are retracted upwards, the hydraulic ram is extended relative to the cylinder, and the proximity sensor is positioned relatively close to the magnet and actuator rod within the sensing enclosure. In positioning the saw up, the front wheels are extended down, the hydraulic ram is retracted into the cylinder, and the proximity sensor is positioned relatively far from the actuator rod and magnet.

Figure 45:
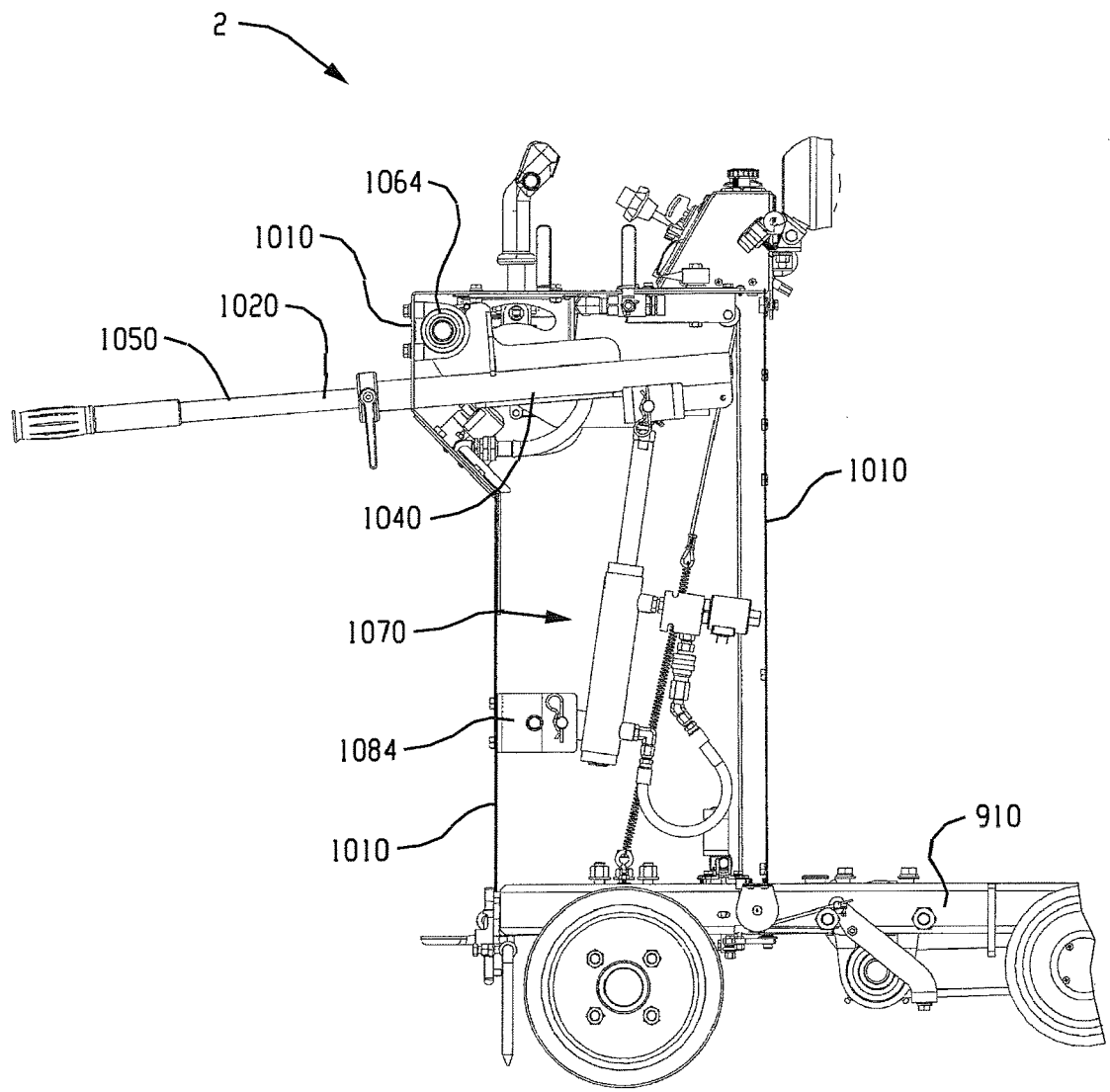
FIG. 45 is a partial side view of the saw frame illustrating a handle assembly and a preferred embodiment handle adjusting and locking system in accordance with the invention.
Figure 46:
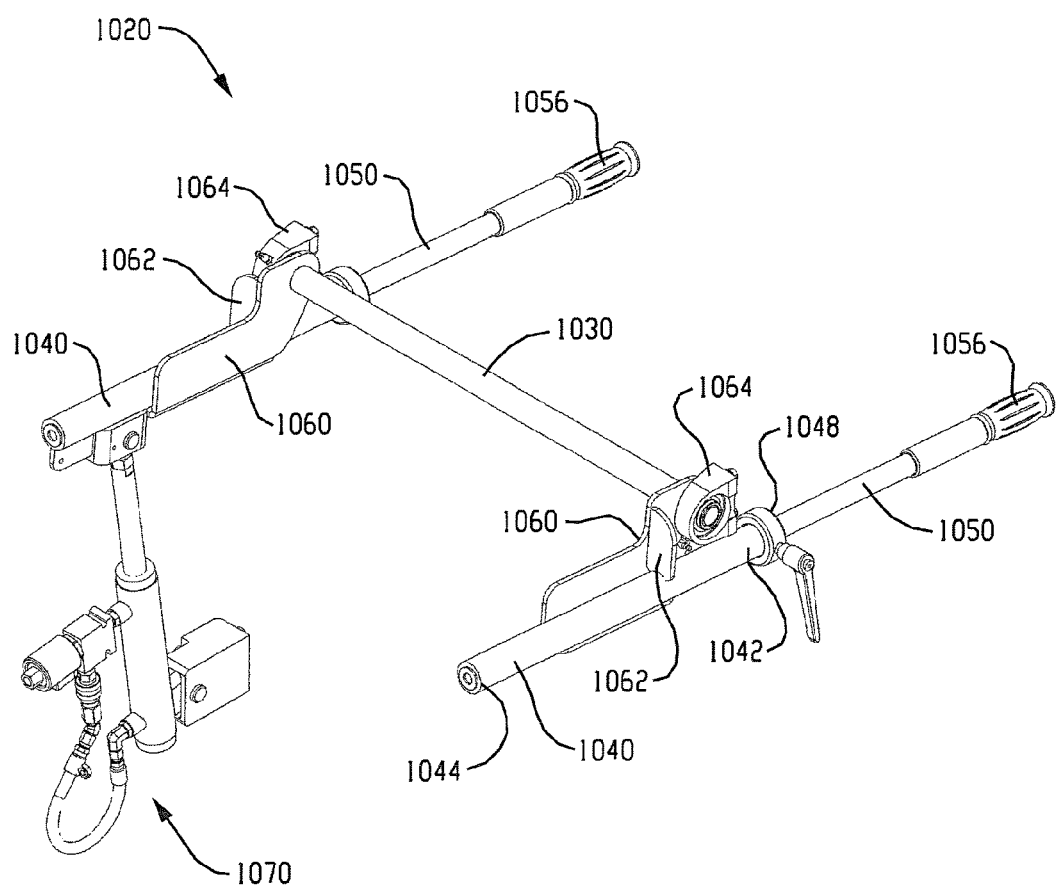
FIG. 46 is a perspective view of the handle assembly and adjusting and locking system viewed in isolation from the saw.
Figure 47:
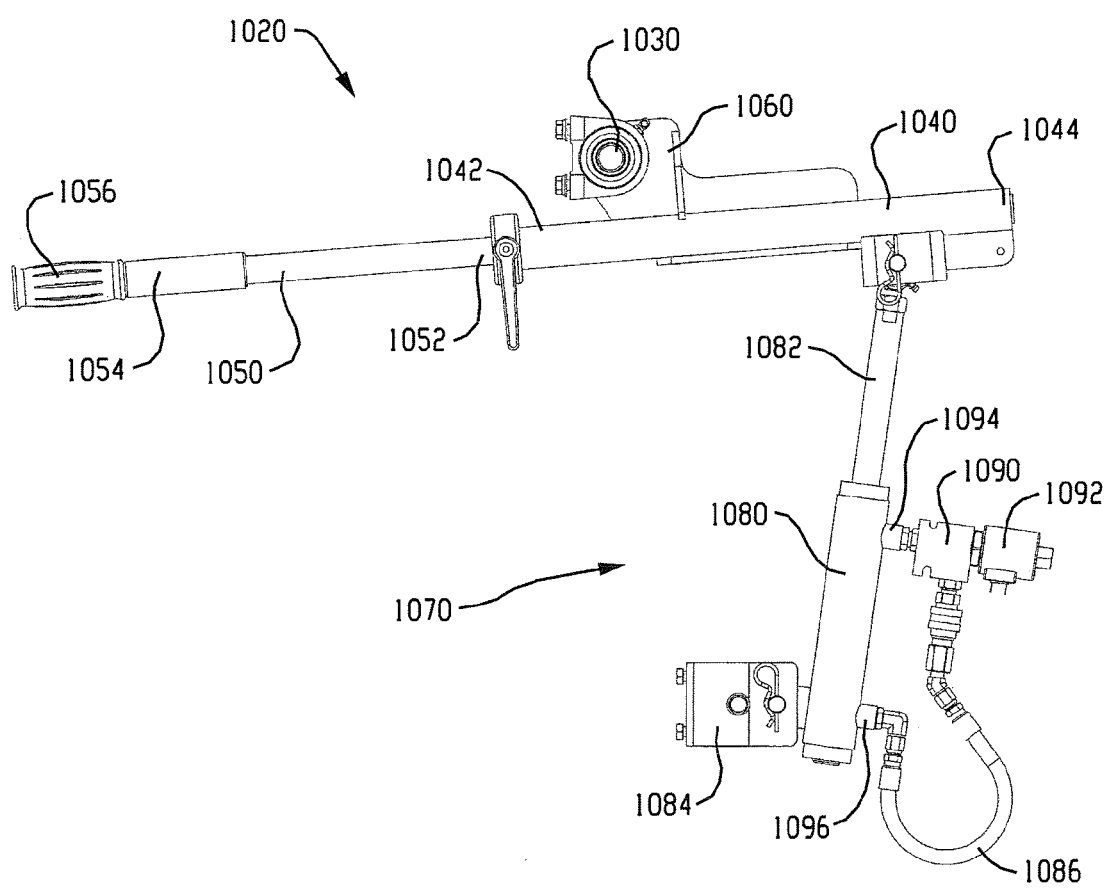
FIG. 47 is a side elevational view of the handle assembly and adjusting and locking system of FIG. 46.

The present invention also provides a handle position adjusting and locking system for a concrete saw. Referring to FIGS. 45-47, FIG. 45 is a partial side elevational view of a concrete saw 2 depicting a lower frame assembly 910 and upper frame assembly 1010 secured and engaged thereto. A positionable handle assembly 1020 is operably engaged with and generally retained within the upper frame assembly 1010. FIGS. 46 and 47 illustrate the preferred embodiment handle assembly 1020 in greater detail. Generally, the handle assembly 1020 comprises a pair of spaced handles oriented generally parallel to one another and a handle cross member extending between and preferably engaged with each of the handles. Each handle includes a primary handle member 1040 and a secondary handle member 1050 telescopingly received in the primary handle member 1040. A releasable engagement assembly 1048 is used to releasably secure the secondary handle member 1050 in a desired position with respect to its corresponding primary handle member 1040. Each handle includes a grip 1056 disposed at a distal end. The handles are pivotally retained and supported by one or more shoulder members 1060, which are affixed or otherwise supported by the upper frame assembly 1010. Each shoulder member 1060 includes a collar 1064 that rotatably engages the handle cross member 1030, and a stop 1062 which prevents pivoting of a handle beyond a generally horizontal orientation, i.e. such that the grip 1056 is prevented from being lowered below the cross member 1030. The pivotal position of the handles, i.e. the handle members 1040 and 1050, is governed by a preferred embodiment handle adjusting system 1070 as follows.

Referring primarily to FIG. 47, the handle adjusting system 1070 comprises a hydraulic cylinder 1080 and a corresponding ram 1082 slidably received therein. The handle adjusting system 1070 is preferably retained within and supported by the upper frame assembly 1010 of the concrete saw 2. Specifically, the hydraulic cylinder 1080 is supported by a cylinder support base 1084, which is affixed or otherwise mounted to the upper frame 1010. One end of the hydraulic ram 1082 is affixed or coupled to a distal end 1044 of the primary handle member 1040. The other end (not shown) of the ram 1082 is slidably disposed within the hydraulic cylinder 1080 by the provision of a positionable piston. The interior of the hydraulic cylinder 1080 defines a hollow interior generally extending between a first port 1094 and a second port 1096. The piston is positioned between the ports 1094 and 1096. A hydraulic flow line 1086 extends between the ports 1094 and 1096 and provides fluid communication therebetween. A valve 1090 is provided within the flow line 1086, and a corresponding valve actuator 1092 is in operable engagement with the valve 1090.

The interior chamber of the hydraulic cylinder 1080 and the piston provided on the ram 1082 and disposed within that chamber, are configured such that an equal amount of fluid is displaced in the flow line 1086 regardless of the direction of travel of the piston between the ports 1094 and 1096. This cylinder configuration is sometimes referred to in the art as a "double rod cylinder." It will be appreciated that the interior of the hydraulic cylinder 1080, the ports 1094 and 1096, the flow line 1086, and the valve 1090 generally form a closed loop for fluid flow.

Operation of the handle adjustment system 1070 is as follows. An operator opens the valve 1090 to allow fluid flow past the valve and within the flow line 1086, thereby enabling linear displacement of the ram 1082 relative to the hydraulic cylinder 1080. Movement of the ram 1082 thus enables pivotal movement of the handles and the cross member 1030 about the longitudinal axis of the handle cross member 1030. The operator can then selectively adjust the handle assembly 1020 to a desired position.

After placing the handle assembly 1020 in the desired position, the operator closes the valve 1090 by appropriately operating the valve actuator 1092. Once the valve 1090 is closed, fluid flow within the flow line 1086 is prevented. Blocked fluid flow in flow line 1086 prevents linear displacement of the piston and ram 1082 relative to the cylinder 1080, thereby resulting in locking of the handle assembly 1020 in its current position.

Figure 48:
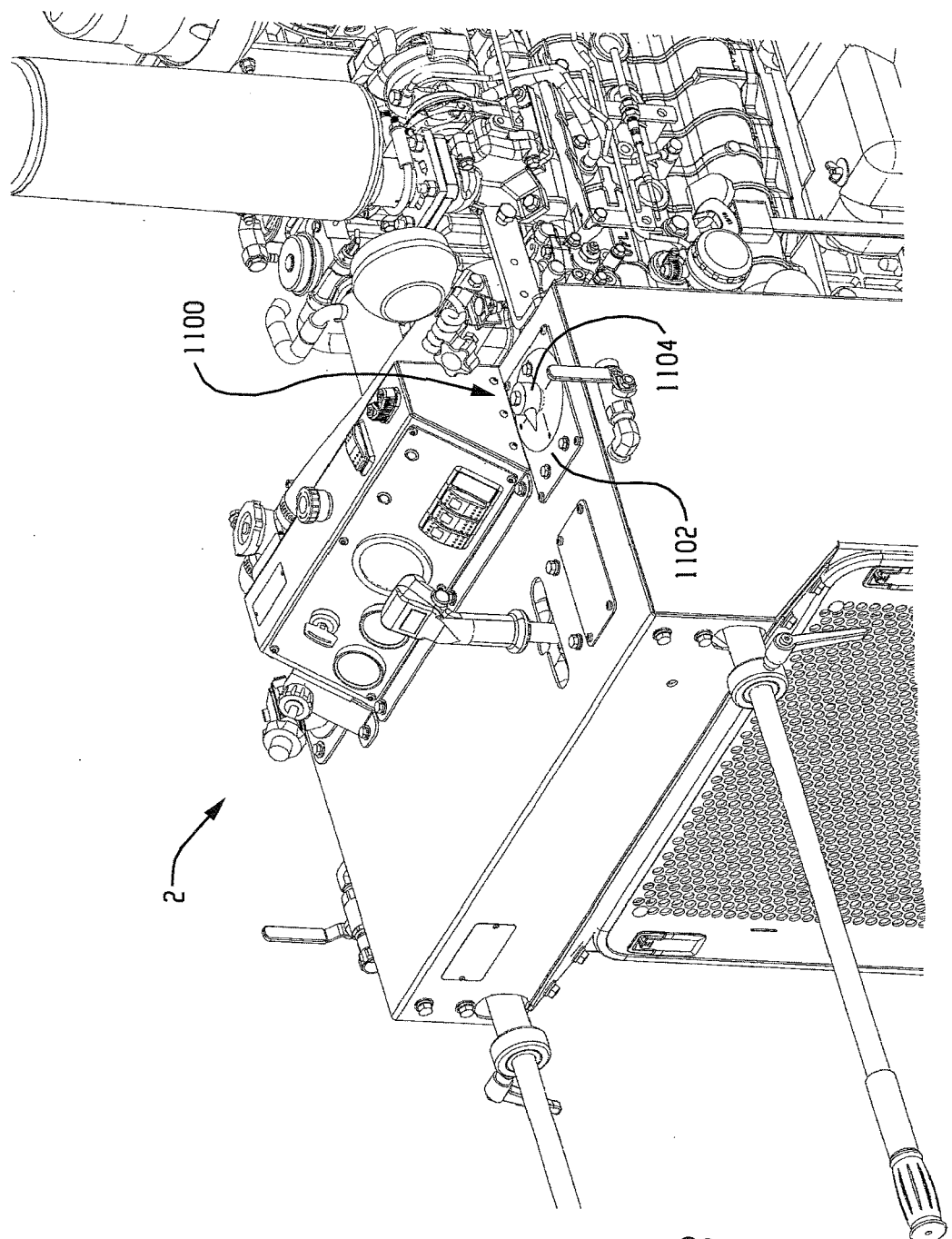
FIG. 48 is a perspective view illustrating a portion of the saw and a preferred embodiment blade water depth indicator and control system in accordance with the invention.
Figure 49:
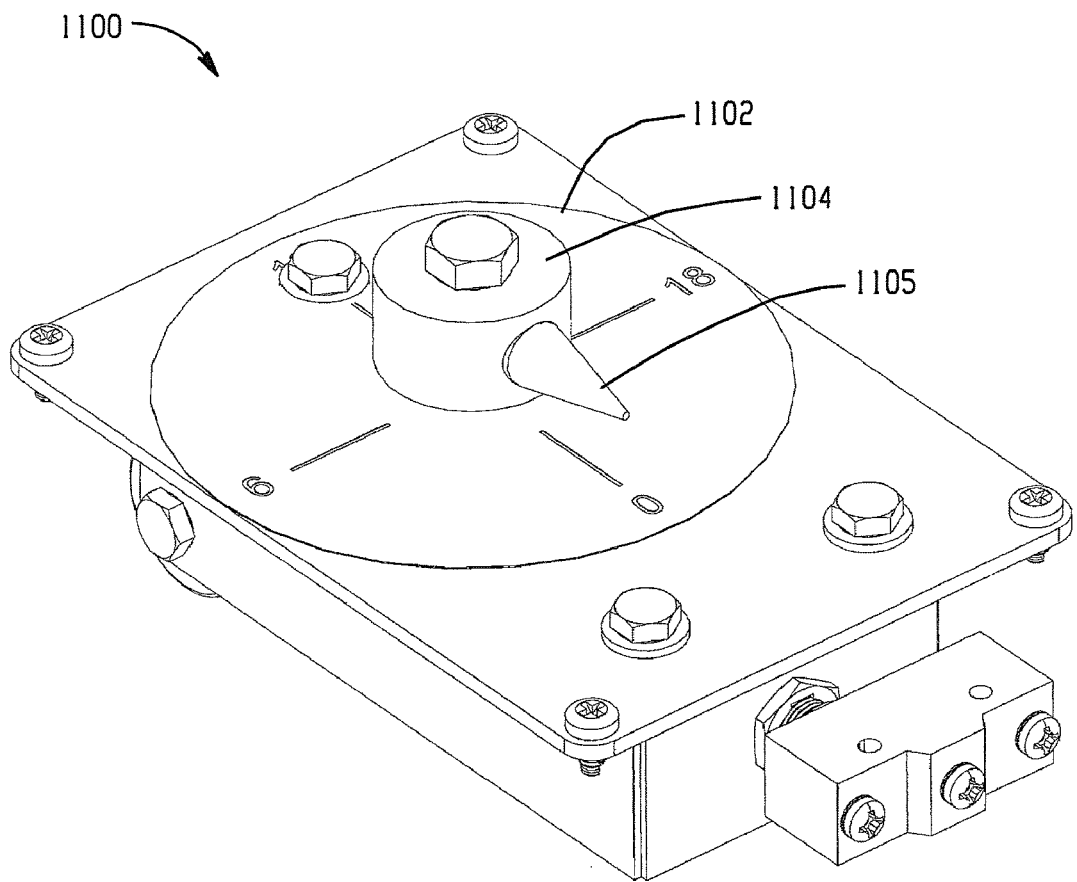
FIG. 49 is a perspective view of a controller used in the depth control and indicator system.

The present invention also provides an automatic water control system that enables or initiates dispensing of blade water once the cutting blade is lowered beyond a "zeroed" position, or that discontinues blade water flow once the cutting blade is raised above the zeroed position. FIG. 48 illustrates a portion of a blade water depth controller system 1100 that comprises a controller 1101 provided in the concrete saw 2. The controller 1101 includes a face plate 1102 with indicia or other markings and a rotatable knob 1104, described in greater detail herein. FIG. 49 illustrates the controller 1101 removed from the saw 2. The controller face plate 1102 preferably defines a dial with markings extending about the circumference, ranging for example, from 0 to 24 inches. This range represents the range of cutting depths of the blade. It will be understood that the invention includes the controller and related system used in conjunction with a wide range of saws and blade diameters, greater than or less than that described herein. The controller 1101 depicted in FIG. 49 depicts a range of blade cutting depths of 0 to 24 inches as indicated by the faceplate 1102. The knob 1104 preferably includes a selector 1105 to indicate the corresponding change in blade depth after zeroing.

Figure 50:
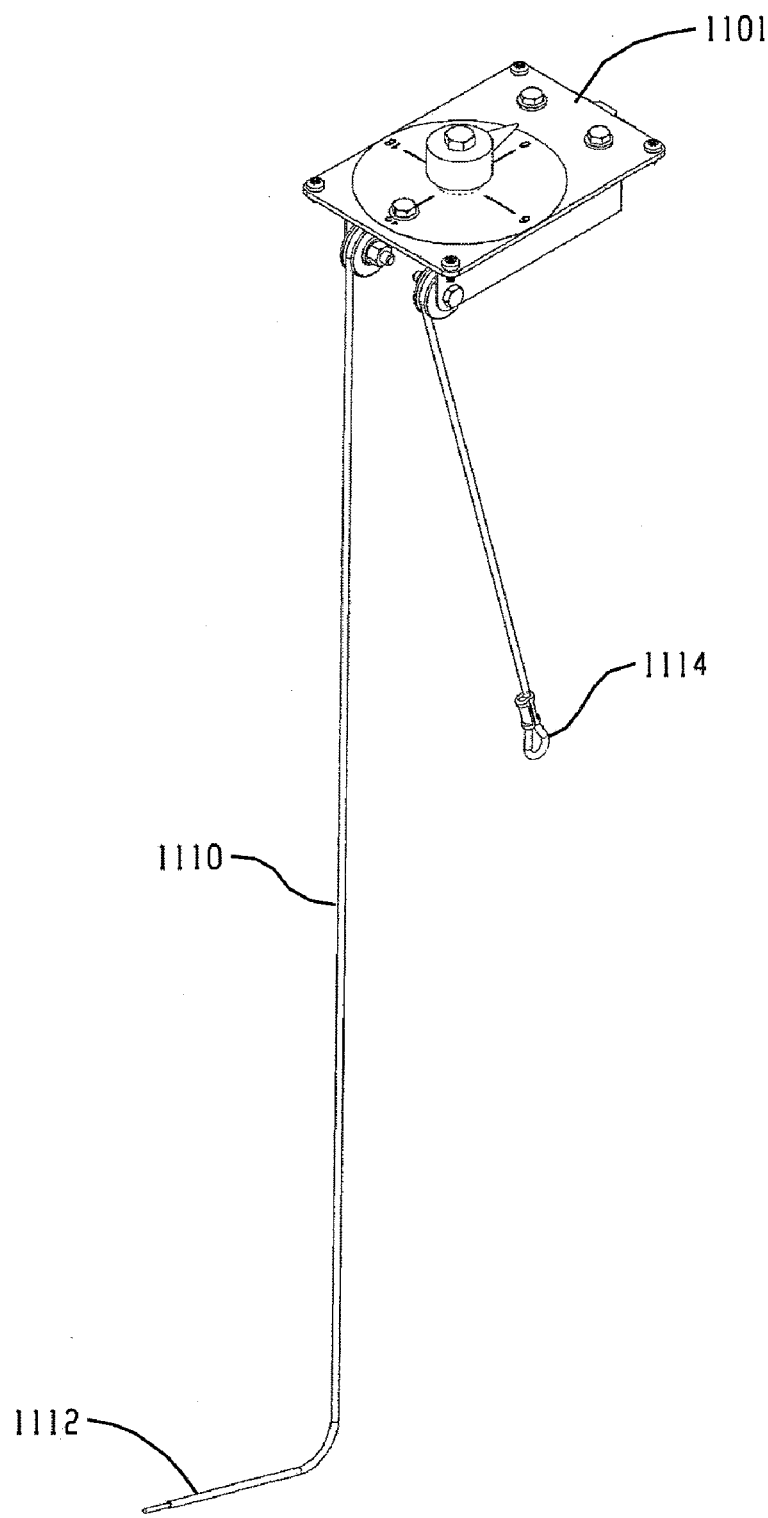
FIG. 50 is a perspective view of the controller and a cable used in the depth control and indicator system.

The blade water depth controller system 1100 also includes a cable 1110 or other similar member that is in operable engagement with the controller 1101. The cable 1110 transmits movement from other components of the saw 2 described herein, to the controller 1101, which in turn operates a switch, valve or other member for controlling flow of water in a water supply line to the blade. FIG. 50 illustrates the controller 1101 and the cable 1110 shown in isolation without any other components in the saw 2. The cable 1110 defines a movable end 1112 and a relatively stationary end 1114. The stationary end 1114 may be provided with a loop or other configuration to promote affixment to a component of the saw, such as a stationary frame member.

Figure 51:
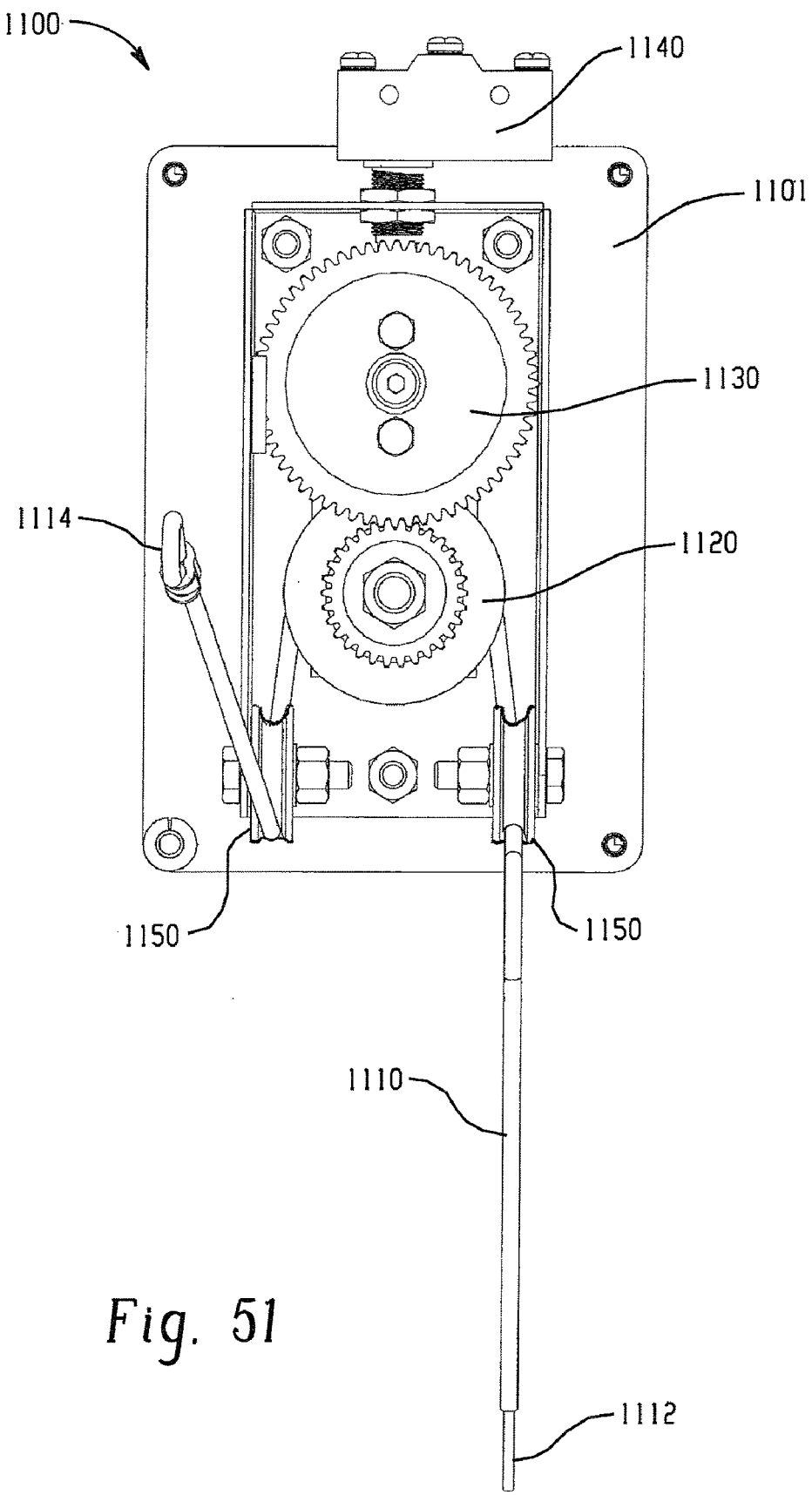
FIG. 51 is a cut away view revealing a portion of the interior of the controller.

FIG. 51 is a partial cut away view of the underside of the controller 1101 revealing its interior and engagement with the cable 1110. The controller 1101 includes a drive gear 1120 and a cam gear 1130, which collectively, actuate a switch, valve, or other component 1140. During raising or lowering of certain saw components, described in detail herein, the cable 1110 is at least partially wound about a receiving channel (not shown) in the drive gear 1120, which in turn causes rotation of the drive gear 1120. The drive gear 1120 is in geared engagement with the cam gear 1130 and thus causes rotation of that gear, however in an opposite direction. One or more guide pulleys 1150 or other members can be used to direct the cable 1110 into and out of the controller 1101.

Figure 52:
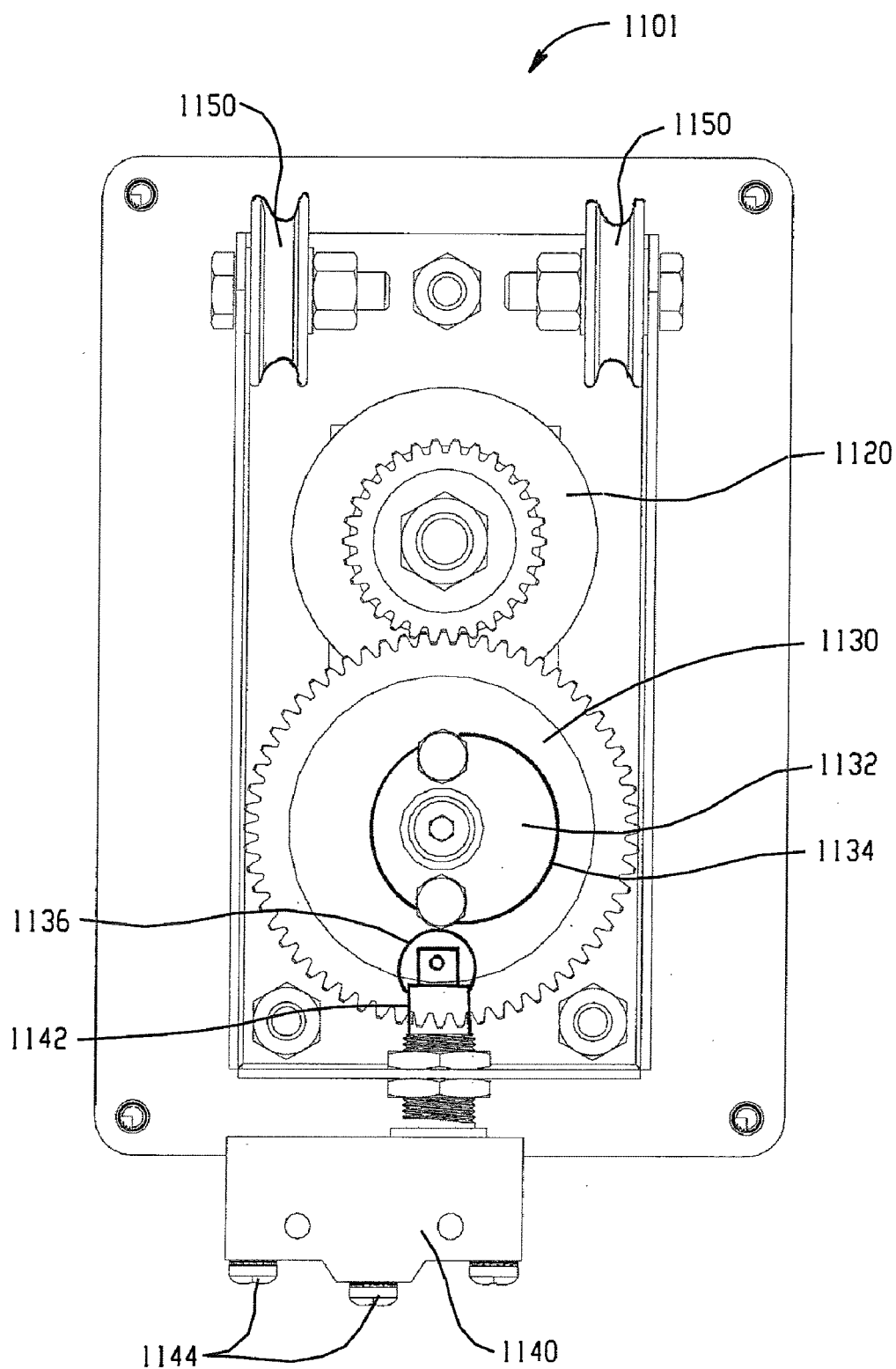
FIG. 52 is another cut away view revealing other aspects of the controller.

FIG. 52 illustrates another cut away view of the controller 1101, revealing a cam member 1132 affixed, formed or otherwise integral with the cam gear 1130. The cam member 1132 defines a cam surface 1134. The switch 1140 includes a displaceable member 1142 that carries a roller member 1136 in contact and operable engagement with the cam surface 1134 of the cam member 1132. As the cable 1110 moves, the drive gear 1120 rotates thereby causing rotation of the cam gear 1130. As cam gear 1130 rotates, the cam member 1132 also rotates and due to the action of the cam surface 1134, causes linear displacement of the roller member 1136 and the member 1142. Displacement of the member 1142 actuates the switch 1140. A plurality of electrical contacts 1144 are provided for establishing electrical communication with the switch 1140. As will be understood, the switch 1140 is incorporated in a switching circuit or control system that governs dispensing of blade water.

Figure 53:
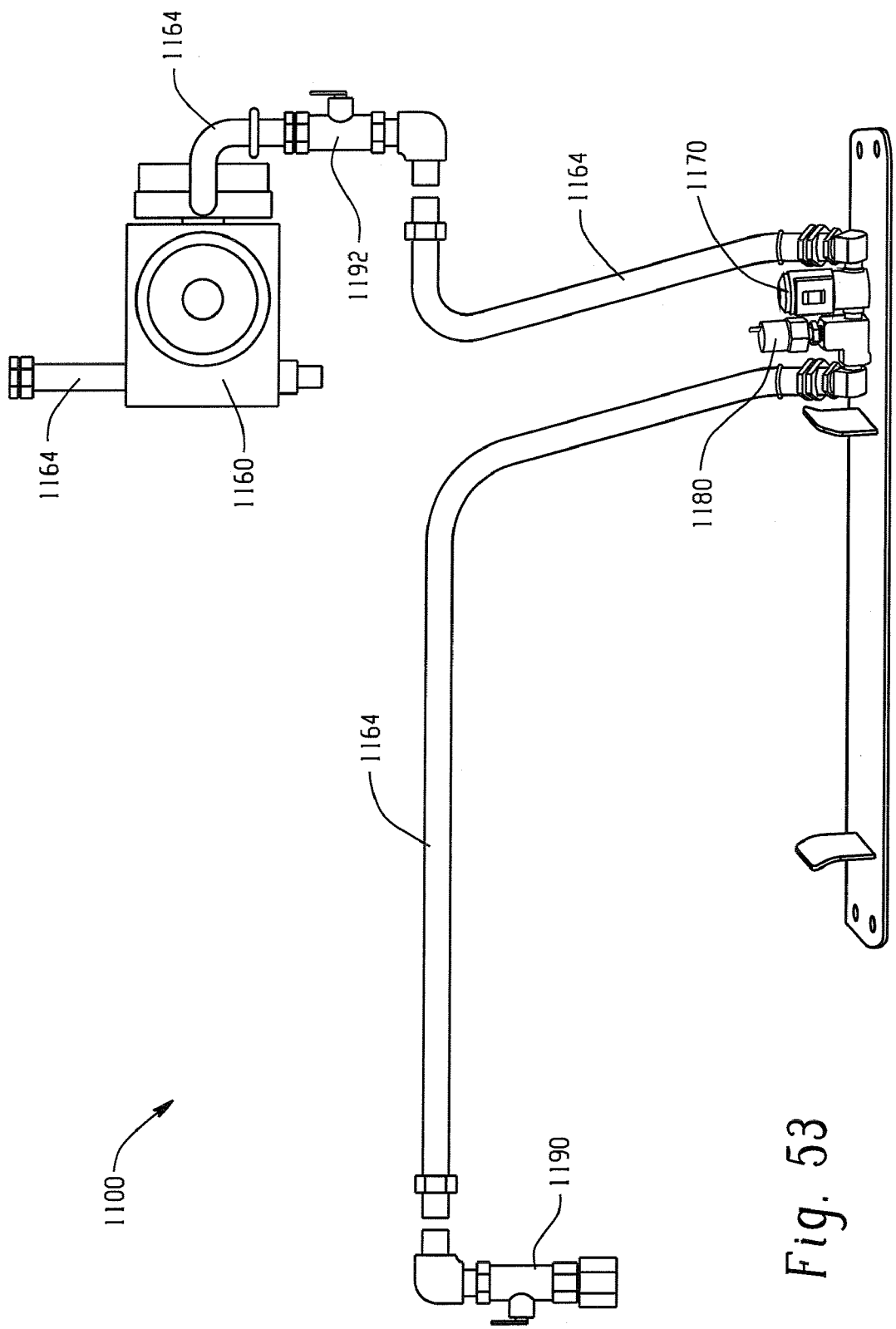
FIG. 53 illustrates additional components of the preferred blade water depth indicator and control system.

FIG. 53 illustrates additional components of the preferred embodiment blade water depth controller system 1100. The system 1100 also comprises one or more of a water pump 1160, a solenoid and valve assembly 1170, a pressure switch 1180, and one or more manual valves 1190 and 1192, and flow lines 1164 providing flow communication between the various components. Although the blade water depth controller system 1100 can be configured in a variety of different ways, it is generally preferred that the switch 1140 previously described in conjunction with the controller 1101 be used to electrically control operation of the pump 1160 and/or the solenoid and valve assembly 1170. It is contemplated that other components of the saw 2 may govern control of blade water, and thus also influence operation of the pump 1160 and the inline solenoid and valve assembly 1170. The controller system 1100 may also comprise the pressure switch 1180 that may provide a signal used in the operation of the pump 1160 and/or the valve 1170. The pressure switch 1180 is typically used to detect a low water pressure condition, indicative of no water, a faulty pump, or other malfunction.

Figure 54:
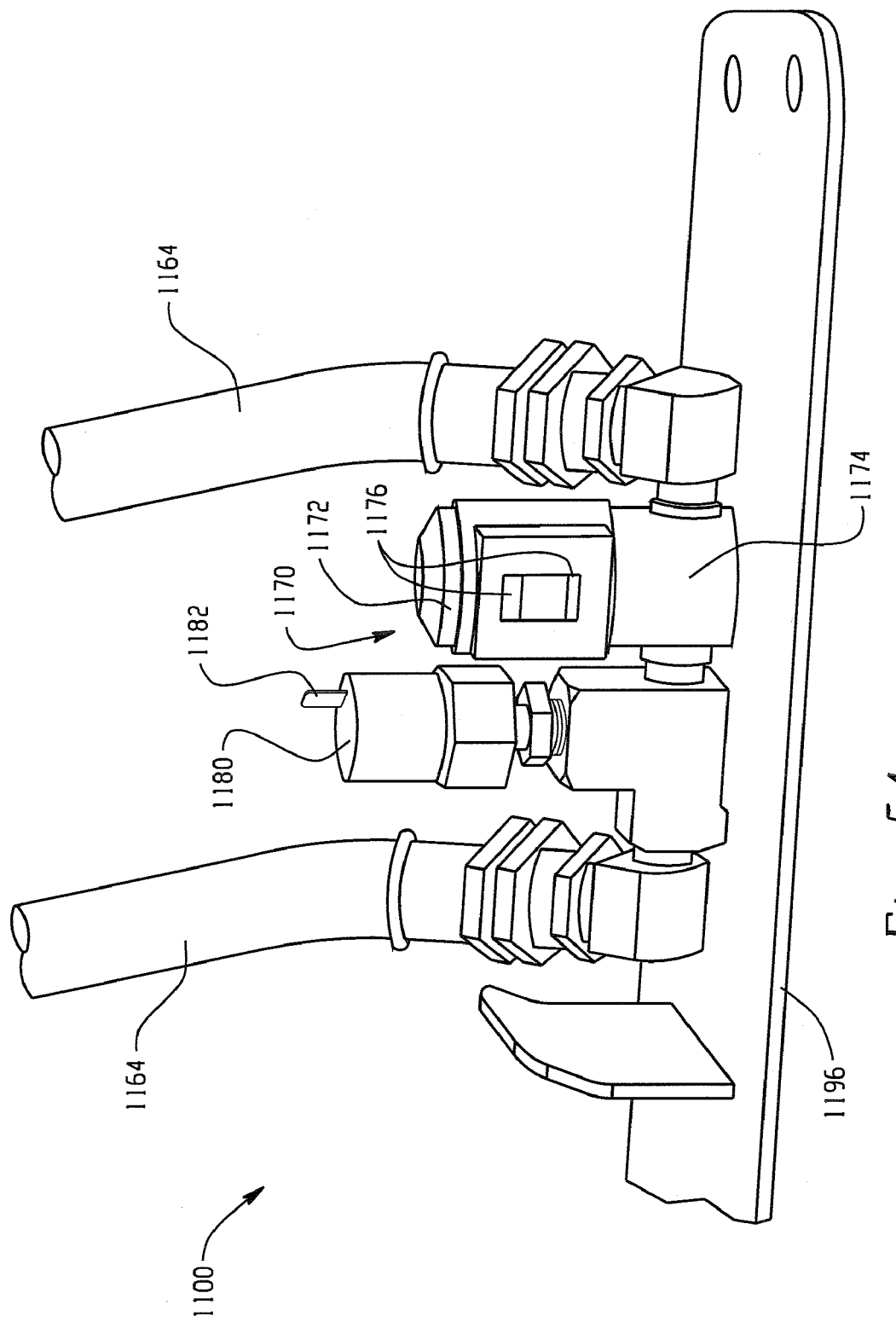
FIG. 54 is a detailed view of several additional components of the preferred blade water depth indicator and control system.

FIG. 54 is a detailed view of the solenoid and valve assembly 1170 including a solenoid unit 1172 and an in-line valve 1174. As will be understood, upon electrical actuation of the solenoid unit 1172 at contacts 1176, the solenoid unit 1172 operates or otherwise positions a valve member (not shown) within the valve 1174. And, the pressure switch 1180 includes a pressure transducer (not shown) which provides an electrical signal as to detected pressure at one or more contacts 1182. The various components are preferably mounted upon a support member 1196 which in turn is preferably supported by a frame member of the saw 2.

Figure 55:
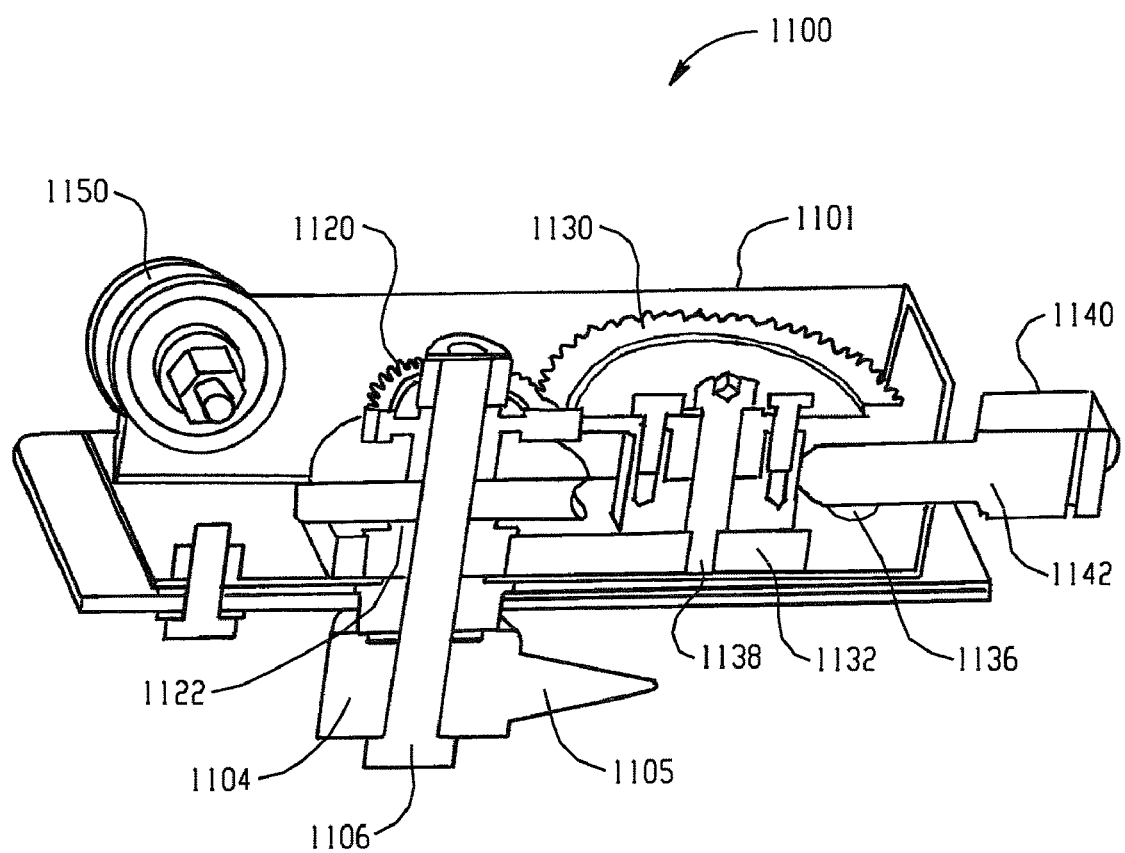
FIG. 55 is a cross sectional view of the controller.

FIG. 55 is a cross sectional view taken across the longitudinal axis of the controller 1101, to further reveal the interior configuration of the controller. The rotatable knob 1104 is keyed or otherwise engaged with a selector shaft 1106 upon which a cable guide member 1122 and the drive gear 1120 are mounted. During operator "zeroing" of blade depth, the knob 1104 and the shaft 1106 are rotated to a zero position relative to the faceplate 1102 (not shown in FIG. 55). The cable guide member 1122 slips past the cable disposed in its channel, as the knob 1104, shaft 1106, and drive gear 1120 are rotated (which in turn also rotates the cam gear 1130 and its components). The assembly of the knob 1104, the shaft 1106, the drive gear 1120, the cam gear 1130, and the cam member 1132, are configured such that setting the knob to a position of "0" on the faceplate 1102, represents a transition to either an open or a closed state of the switch 1140. Thus, "zeroing" the controller sets the relative rotational position of the drive gear 1130 and cams (and thus of the switch 1140), to the linear position of the cable 1110.

As previously explained, as the saw blade is raised or lowered, the cable 1110 is moved, and typically displaced along its longitudinal axis. Referring to previously addressed FIGS. 39 and 41, the configuration between the cable and saw components is illustrated. As will be recalled, the saw blade is raised or lowered by lowering or raising, respectively, the front wheel assembly 930. As previously explained, the front wheel assembly 930 is supported by a pivotable carriage 950. Affixed to the carriage 950 is a carriage bracket 1002. Thus, as best illustrated in FIG. 41, as the carriage 950 is pivoted about the carriage swing member 960, the carriage bracket 1002 is also displaced about the longitudinal axis of the swing member 960. Affixed to a distal end 1001 of the carriage bracket 1002 is the movable end 1112 of the cable 1110. A pulley 1113 mounted on a frame member can be used to facilitate a change in direction of the cable 1110. As previously illustrated in FIG. 50, the cable 1110 extends into, through, and out of the controller 1101. Referring to FIGS. 39 and 41, the stationary end 1114 of the cable 1110 can be attached to a stationary frame member. Preferably, the stationary end 1114 of the cable 1110 is affixed to a biasing member 1118 such as spring, in order to maintain a tension on the cable 1110.

A preferred operation of the blade water depth controller system is as follows. The saw blade is lowered until it is just clear of the pavement or other region to be cut. The rotary knob 1104 is manually rotated by the operator to the zero ("0") position. As the saw 2 lowers the blade into the cut, the water turns on and the knob 1104 points to the number of inches of blade cutting depth 1", 2", 3" and so on. As will be recalled, the knob rotation results from cable 1110 that attaches to the front wheel assembly, and specifically to the carriage 950. Raising the saw blade reverses the knob rotation and upon reaching the zero point turns the water off and remains off if the blade is raised even further beyond the zero point (-1", ", -3" etc.).

Many other benefits will no doubt become apparent from future application and development of this technology.

All patents, published applications, and articles noted herein are hereby incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims. Moreover, it will be understood that the invention includes combinations of one or more of the various features and embodiments described herein with any one or more other features and embodiments described herein.

What is claimed:

1. A concrete saw drive system comprising:
a blade shaft gear assembly including a rotatable blade shaft having provisions for driving a cutting blade, a rotatable jack shaft oriented parallel to the blade shaft, and a plurality of gears operably engaging the blade shaft and the jack shaft, the jack shaft including at least one jack shaft sheave engaged with the jack shaft;
a drive shaft gear assembly including a rotatable drive shaft, a motor shaft oriented transversely to the drive shaft, and a plurality of gears operably engaging the drive shaft and the motor shaft, the drive shaft including at least one drive shaft sheave engaged with the drive shaft; and
a belt extending between and in operable engagement with the drive shaft sheave and the jack shaft sheave such that rotation of the drive shaft imparts rotation to the blade shaft;
wherein the drive shaft sheave is aligned with the jack shaft sheave.

2. A concrete saw drive system comprising:
a blade shaft gear assembly including a rotatable blade shaft having provisions for driving a cutting blade, a rotatable jack shaft oriented parallel to the blade shaft, and a plurality of gears operably engaging the blade shaft and the jack shaft, the jack shaft including two jack shaft sheaves, each engaged with the jack shaft and located on opposite sides of the plurality of gears operably engaging the blade shaft with the jack shaft; and
a drive shaft gear assembly including a rotatable drive shaft, a motor shaft oriented transversely to the drive shaft, and a plurality of gears operably engaging the drive shaft and the motor shaft, the drive shaft including two drive shaft sheaves, each engaged with the drive shaft and located on opposite sides of the plurality of gears operably engaging the drive shaft with the motor shaft;
wherein the drive shaft sheaves are aligned with the jack shaft sheaves.

3. The concrete saw drive system of claim 1 wherein the motor shaft of the drive shaft gear assembly is oriented transverse to the blade shaft of the blade shaft gear assembly.

4. The concrete saw drive system of claim 1 wherein the blade shaft gear assembly includes two jack shaft sheaves, each engaged with the jack shaft and located on opposite sides of the plurality of gears operably engaging the blade shaft with the jack shaft.

5. The concrete saw drive system of claim 1 wherein the drive shaft gear assembly includes two drive shaft sheaves, each engaged with the drive shaft and located on opposite sides of the plurality of gears operably engaging the drive shaft with the motor shaft.

6. The concrete saw drive system of claim 1 wherein the plurality of gears of the blade shaft gear assembly includes:
a jack shaft spur gear engaged with the jack shaft and rotatable therewith about a shared axis of rotation; and
a blade shaft spur gear engaged with the blade shaft and rotatable therewith about a shared axis of rotation;
wherein the jack shaft spur gear and the blade shaft spur gear are in meshed engagement with one another.

7. The concrete saw drive system of claim 1 wherein the plurality of gears of the drive shaft gear assembly includes:
a pinion gear engaged with the motor shaft and rotatable therewith about a shared axis of rotation; and
a bevel gear engaged with the drive shaft and rotatable therewith about a shared axis of rotation;
wherein the pinion gear and the bevel gear are in meshed engagement with one another.

8. The concrete saw drive system of claim 1 wherein the plurality of gears operably engaging the jack shaft and the blade shaft includes a transmission assembly.

9. A concrete saw drive system comprising:
a blade shaft gear assembly including a rotatable blade shaft having provisions for driving a cutting blade, a rotatable jack shaft oriented parallel to the blade shaft, and a plurality of gears operably engaging the blade shaft and the lack shaft, the jack shaft including at least one jack shaft sheave engaged with the jack shaft; and
a drive shaft gear assembly including a rotatable drive shaft including at least one drive shaft sheave engaged with the drive shaft, a motor shaft oriented transversely to the drive shaft, an upper transmission shaft, an upper transmission spur gear engaged with the upper transmission shaft and rotatable therewith about a shared axis of rotation, a lower transmission shaft, and a lower transmission gear engaged with the lower transmission shaft and rotatable therewith about a shared axis of rotation;

wherein the upper transmission shaft is in operable engagement with the lower transmission shaft such that rotation of the upper transmission shaft imparts rotation to the lower transmission shaft, the upper transmission shaft also being in operable engagement with the jack shaft, the lower transmission shaft being in operable engagement with the blade shaft, and the drive shaft sheave is aligned with the jack shaft sheave.

10. The concrete saw drive system of claim 9, the transmission assembly further including:
   an intermediate spur gear;
   wherein the jack shaft spur gear and the upper transmission spur gear are in meshed engagement with the intermediate spur gear.

11. The concrete saw drive system of claim 9 wherein the upper transmission shaft and the lower transmission shaft are oriented parallel with each other.

12. The concrete saw drive system of claim 9 wherein the transmission assembly further includes:
   a lower intermediate spur gear in operable engagement with the lower transmission shaft and the blade shaft wherein the lower intermediate spur gear transfers rotary motion from the lower transmission shaft to the blade shaft.

13. The concrete saw drive system of claim 12 wherein the lower intermediate spur gear is in meshed engagement with the lower transmission gear.

14. The concrete saw drive system of claim 12 wherein the lower intermediate spur gear is in meshed engagement with the blade shaft spur gear.

15. The concrete saw drive system of claim 1 wherein the blade shaft gear assembly further includes:
   a clutch in selectively operable engagement with the jack shaft.

16. The concrete saw drive system of claim 9 wherein the transmission assembly further includes:
   an upper removable spur gear engaged with the upper transmission shaft and rotatable therewith about a shared axis of rotation; and
   a lower removable spur gear engaged with the lower transmission shaft and rotatable therewith about a shared axis of rotation;
   wherein the upper removable spur gear and the lower removable spur gear are in meshed engagement with one another, and transfer rotary motion of the upper transmission shaft to the lower transmission shaft.

17. The concrete saw drive system of claim 9 wherein the blade shaft gear assembly further includes:
   a clutch in selectively operable engagement with the jack shaft.

18. The concrete saw drive system of claim 1 further comprising a housing for substantially enclosing the blade shaft gear assembly such that the at least one jack shaft sheave is protected from exposure to debris associated with a cutting operation.

19. The concrete saw drive system of claim 1 further comprising a housing for substantially enclosing the drive shaft gear assembly such that the at least one drive shaft sheave is protected from exposure to debris associated with a cutting operation.

20. The concrete saw drive system of claim 1 wherein the blade shaft is free of a sheave or other belt-engaging component.

* * * * *